(12) United States Patent
Konaganti et al.

(10) Patent No.: US 11,046,843 B2
(45) Date of Patent: Jun. 29, 2021

(54) ETHYLENE COPOLYMERS AND FILMS WITH EXCELLENT SEALING PROPERTIES

(71) Applicant: NOVA Chemicals (International) S.A., Fribourg (CH)

(72) Inventors: Vinod Konaganti, Calgary (CA); Sepideh Kasiri, Calgary (CA); Shivendra Goyal, Calgary (CA); Monika Kleczek, Calgary (CA); Fazle Sibtain, Calgary (CA); Marzieh Ebrahimi, Calgary (CA)

(73) Assignee: NOVA Chemicals (International) S.A., Fribourg (CH)

(*) Notice: Subject to any disclaimer, the term of this patent is extended or adjusted under 35 U.S.C. 154(b) by 154 days.

(21) Appl. No.: 16/524,600

(22) Filed: Jul. 29, 2019

(65) Prior Publication Data

US 2021/0032450 A1 Feb. 4, 2021

(51) Int. Cl.
*C08L 23/00* (2006.01)
*C08L 23/16* (2006.01)
(Continued)

(52) U.S. Cl.
CPC .......... *C08L 23/0815* (2013.01); *C08F 4/022* (2013.01); *C08F 4/65927* (2013.01);
(Continued)

(58) Field of Classification Search
CPC .. C08L 23/16; C08L 23/0815; C08L 2201/10; C08L 2203/16; C08L 2203/162;
(Continued)

(56) References Cited

U.S. PATENT DOCUMENTS

| 5,198,401 A | 3/1993 | Turner et al. |
| 5,382,630 A | 1/1995 | Stehling et al. |

(Continued)

*Primary Examiner* — Rip A Lee
(74) *Attorney, Agent, or Firm* — Thomas J. Styslinger

(57) ABSTRACT

An ethylene copolymer composition comprises: a first ethylene copolymer having a density of from 0.855 to 0.913 g/cm$^3$, a molecular weight distribution, $M_w/M_n$ of from 1.7 to 2.3, and a melt index, $I_2$ of from 0.1 to 20 g/10 min; a second ethylene copolymer having a density of from 0.875 to 0.936 g/cm$^3$, a molecular weight distribution, $M_w/M_n$ of from 2.3 to 6.0, and a melt index, $I_2$ of from 0.3 to 100 g/10 min; and optionally a third ethylene copolymer; where the first ethylene copolymer has more short chain branches per thousand carbon atoms than the second ethylene copolymer and the density of the second ethylene copolymer is equal to or higher than the density of the first ethylene copolymer. The ethylene copolymer composition has a density of from 0.865 to 0.913 g/cm$^3$; a melt index, $I_2$ of from 0.5 to 10 g/10 min; and a fraction eluting at from 90 to 105° C., having an integrated area of greater than 4 weight percent in a CTREF analysis; and at least 0.0015 parts per million (ppm) of hafnium.

Blown film made from the ethylene copolymer composition has a hot tack window (HTW) of at least 45° C. (at a film thickness of about 2 mil) and a seal initiation temperature (SIT) of less than 95° C. (at a film thickness of about 2 mil).

60 Claims, 12 Drawing Sheets

(51) Int. Cl.
   *C08L 23/08* (2006.01)
   *C08F 4/02* (2006.01)
   *C08F 4/6592* (2006.01)
   *C08F 210/14* (2006.01)
   *C08F 210/16* (2006.01)
   *C08F 4/659* (2006.01)
   *C08F 2/00* (2006.01)

(52) U.S. Cl.
   CPC .......... *C08F 210/14* (2013.01); *C08F 210/16* (2013.01); *C08F 2/001* (2013.01); *C08F 4/65908* (2013.01); *C08F 2500/10* (2013.01); *C08L 23/16* (2013.01); *C08L 2201/10* (2013.01); *C08L 2203/16* (2013.01); *C08L 2203/162* (2013.01); *C08L 2205/02* (2013.01); *C08L 2205/03* (2013.01); *C08L 2207/066* (2013.01)

(58) Field of Classification Search
   CPC .............. C08L 2205/02; C08L 2205/03; C08F 210/16; C08F 210/14; C08F 2500/10; C08F 4/022; C08F 4/65927; C08F 4/65908
   USPC ........................................................ 525/240
   See application file for complete search history.

(56) References Cited

U.S. PATENT DOCUMENTS

| | | |
|---|---|---|
| 5,382,631 A | 1/1995 | Stehling et al. |
| 5,408,004 A | 4/1995 | Lai et al. |
| 5,519,091 A | 5/1996 | Tsutsui et al. |
| 5,530,065 A | 6/1996 | Farley et al. |
| 5,571,880 A | 11/1996 | Alt et al. |
| 5,663,249 A | 9/1997 | Ewen et al. |
| 5,674,342 A | 10/1997 | Obijeski et al. |
| 5,677,383 A | 10/1997 | Chum et al. |
| 5,685,128 A | 11/1997 | Chum et al. |
| 5,747,594 A | 5/1998 | deGroot et al. |
| 5,767,208 A | 6/1998 | Turner et al. |
| 5,773,106 A | 6/1998 | deGroot et al. |
| 5,792,534 A | 8/1998 | deGroot et al. |
| 5,844,045 A | 12/1998 | Kolthammer et al. |
| 5,847,053 A | 12/1998 | Chum et al. |
| 5,874,139 A | 2/1999 | Bosiers et al. |
| 6,111,023 A | 8/2000 | Chum et al. |
| 6,121,185 A | 9/2000 | Rosen et al. |
| 6,221,982 B1 | 4/2001 | Debras et al. |
| 6,262,195 B1 | 7/2001 | Dall'Occo et al. |
| 6,300,433 B1 | 10/2001 | Rodriguez et al. |
| 6,306,969 B1 | 10/2001 | Patel et al. |
| 6,313,240 B1 | 11/2001 | Hasegawa et al. |
| 6,316,549 B1 | 11/2001 | Chum et al. |
| 6,388,017 B1 | 5/2002 | McDaniel et al. |
| 6,392,076 B1 | 5/2002 | Strauss et al. |
| 6,403,717 B1 | 6/2002 | Adams et al. |
| 6,416,833 B1 | 7/2002 | Climenhage et al. |
| 6,433,095 B1 | 8/2002 | Laurent |
| 6,441,116 B1 | 8/2002 | Shikuma et al. |
| 6,448,341 B1 | 9/2002 | Kolthammer et al. |
| 6,462,135 B1 | 10/2002 | Rohde et al. |
| 6,462,136 B1 | 10/2002 | Saito et al. |
| 6,469,103 B1 | 10/2002 | Jain et al. |
| 6,486,088 B1 | 11/2002 | Crowther et al. |
| 6,489,427 B1 | 12/2002 | Clutton et al. |
| 6,506,867 B1 | 1/2003 | Lai et al. |
| 6,518,385 B1 | 2/2003 | Chai |
| 6,534,612 B1 | 3/2003 | Lai et al. |
| 6,562,919 B2 | 5/2003 | Crowther et al. |
| 6,569,948 B2 | 5/2003 | Laurent |
| 6,579,922 B2 | 6/2003 | Laurent |
| 6,642,339 B1 | 11/2003 | Chai et al. |
| 6,683,149 B2 | 1/2004 | Jain et al. |
| 6,723,398 B1 | 4/2004 | Chum et al. |
| 6,806,220 B2 | 10/2004 | Crowther et al. |
| 6,844,398 B2 | 1/2005 | Shikuma et al. |
| 6,870,010 B1 | 3/2005 | Lue et al. |
| 6,908,968 B2 | 6/2005 | Jain et al. |
| 6,916,883 B2 | 7/2005 | Parikh et al. |
| 6,921,795 B2 | 7/2005 | Wang et al. |
| 6,969,741 B2 | 11/2005 | Lustiger et al. |
| 6,982,311 B2 | 1/2006 | Karande et al. |
| 7,022,770 B2 | 4/2006 | Lustiger et al. |
| 7,041,617 B2 | 5/2006 | Jensen et al. |
| 7,101,939 B2 | 9/2006 | Nowlin et al. |
| 7,125,933 B2 | 10/2006 | German et al. |
| 7,148,304 B2 | 12/2006 | Kimberley et al. |
| 7,166,676 B2 | 1/2007 | Jacobsen et al. |
| 7,250,473 B2 | 7/2007 | Schramm et al. |
| 7,250,474 B2 | 7/2007 | Maziers |
| 7,300,983 B2 | 11/2007 | Degroot et al. |
| 7,396,881 B2 | 7/2008 | Lustiger et al. |
| 7,439,306 B2 | 10/2008 | Davis |
| 7,456,243 B2 | 11/2008 | Jensen et al. |
| 7,514,504 B2 | 4/2009 | Van Sinoy et al. |
| 7,645,835 B2 | 1/2010 | Van Dun et al. |
| 7,659,343 B2 | 2/2010 | Wooster et al. |
| 7,714,073 B2 | 5/2010 | Jacobsen et al. |
| 7,846,552 B2 | 12/2010 | Weeks |
| 7,858,702 B2 | 12/2010 | Jaker |
| 7,868,092 B2 | 1/2011 | Kwalk et al. |
| 7,968,659 B2 | 6/2011 | Chai |
| 7,999,039 B2 | 8/2011 | DeGroot et al. |
| 8,039,554 B2 | 10/2011 | Iseki et al. |
| RE43,004 E | 12/2011 | DeGroot et al. |
| 8,076,428 B2 | 12/2011 | Shim et al. |
| 8,101,685 B2 | 1/2012 | Jiang et al. |
| 8,101,687 B2 | 1/2012 | Schramm et al. |
| 8,227,564 B2 | 7/2012 | Loveday et al. |
| 8,410,217 B2 | 4/2013 | Tse et al. |
| 8,426,525 B2 | 4/2013 | Nozue et al. |
| 8,475,898 B2 | 7/2013 | Wang et al. |
| 8,475,899 B2 | 7/2013 | Yang et al. |
| 8,481,647 B2 | 7/2013 | Jiang et al. |
| 8,895,466 B2 | 11/2014 | Busico et al. |
| 8,933,175 B2 | 1/2015 | Yu et al. |
| 8,962,755 B2* | 2/2015 | Wang .................... C08F 210/16 525/53 |
| 9,068,033 B2 | 6/2015 | Fiscus et al. |
| 9,102,819 B2 | 8/2015 | Kapur et al. |
| 9,115,275 B2 | 8/2015 | Kupar et al. |
| 9,371,442 B2* | 6/2016 | Wang .................... C08L 23/08 |
| 9,512,282 B2 | 12/2016 | Li et al. |
| 9,540,457 B1 | 1/2017 | Ding et al. |
| 9,540,459 B2 | 1/2017 | Ebisawa et al. |
| 10,538,654 B2* | 1/2020 | Wang ...................... C08J 5/18 |
| 10,882,987 B2* | 1/2021 | Zhang .................. C08F 210/16 |
| 2002/0177677 A1 | 11/2002 | Kanamori et al. |
| 2003/0114595 A1 | 6/2003 | Van Dun et al. |
| 2003/0149181 A1 | 8/2003 | Kolthammer et al. |
| 2005/0119413 A1 | 6/2005 | Maziers |
| 2006/0036041 A1 | 2/2006 | Kwalk |
| 2012/0065335 A1 | 3/2012 | Kipke et al. |
| 2012/0252989 A1 | 10/2012 | Dewachter et al. |
| 2012/0309910 A1 | 12/2012 | Dewachter et al. |
| 2013/0085231 A1 | 4/2013 | Lue et al. |
| 2016/0108221 A1 | 4/2016 | Sibtain et al. |
| 2016/0229996 A1 | 8/2016 | Yamane et al. |
| 2017/0073482 A1 | 3/2017 | Ward et al. |
| 2018/0305531 A1 | 10/2018 | Zhang et al. |
| 2018/0305532 A1 | 10/2018 | Zheng et al. |
| 2021/0032450 A1* | 2/2021 | Konaganti ............ C08F 210/16 |

* cited by examiner

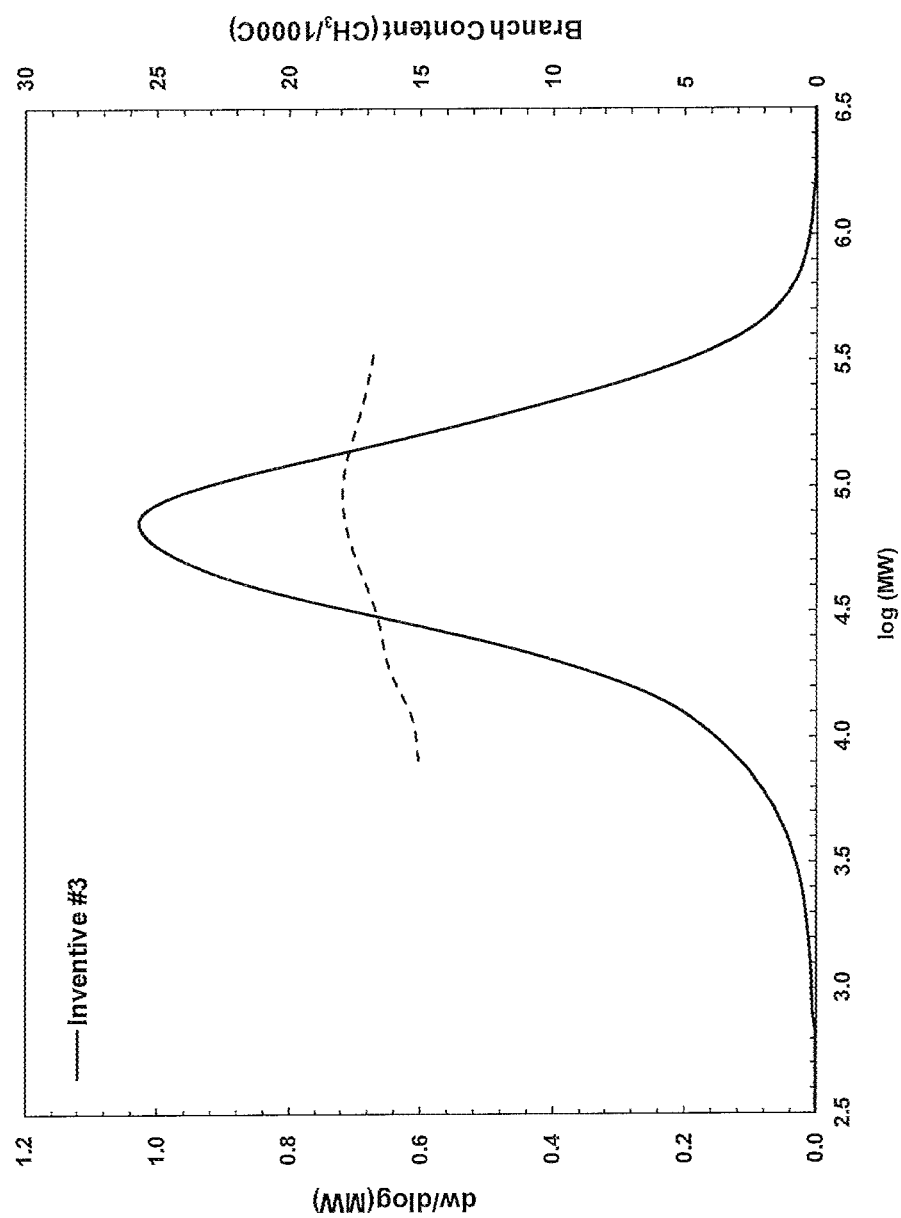

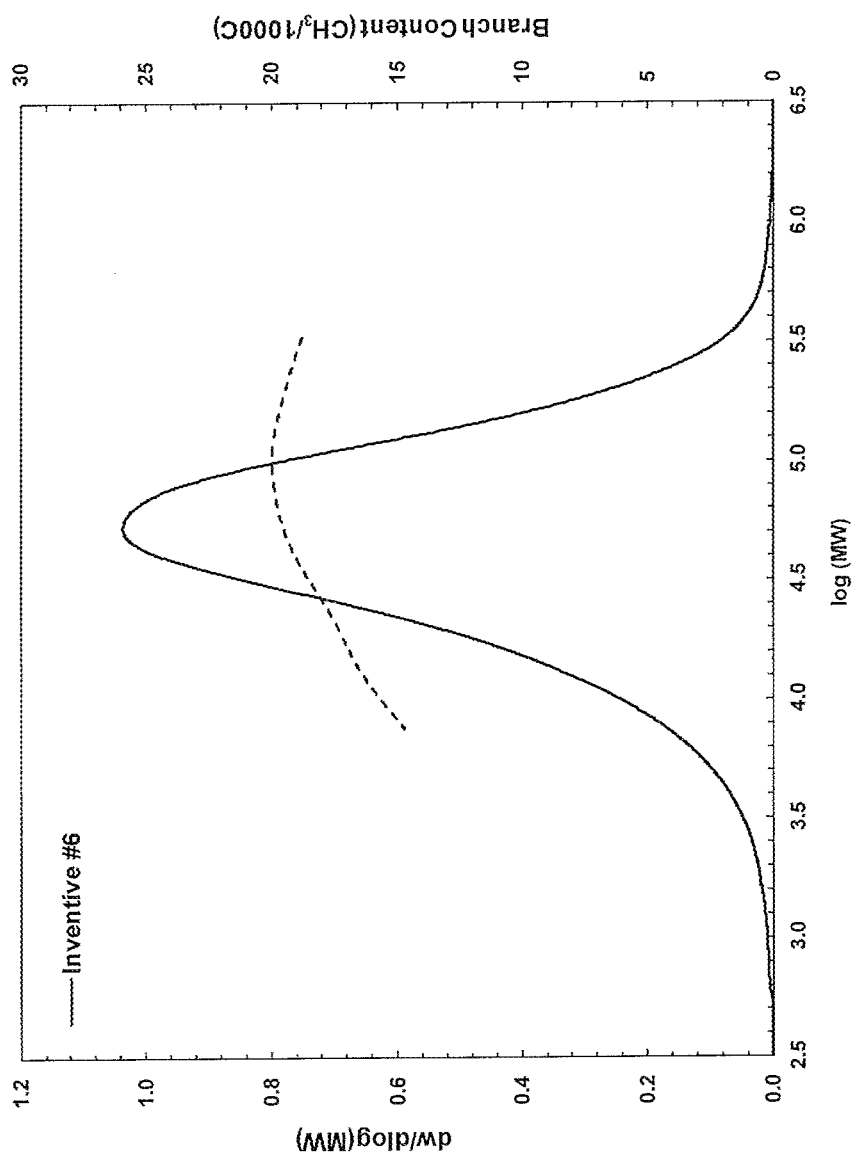

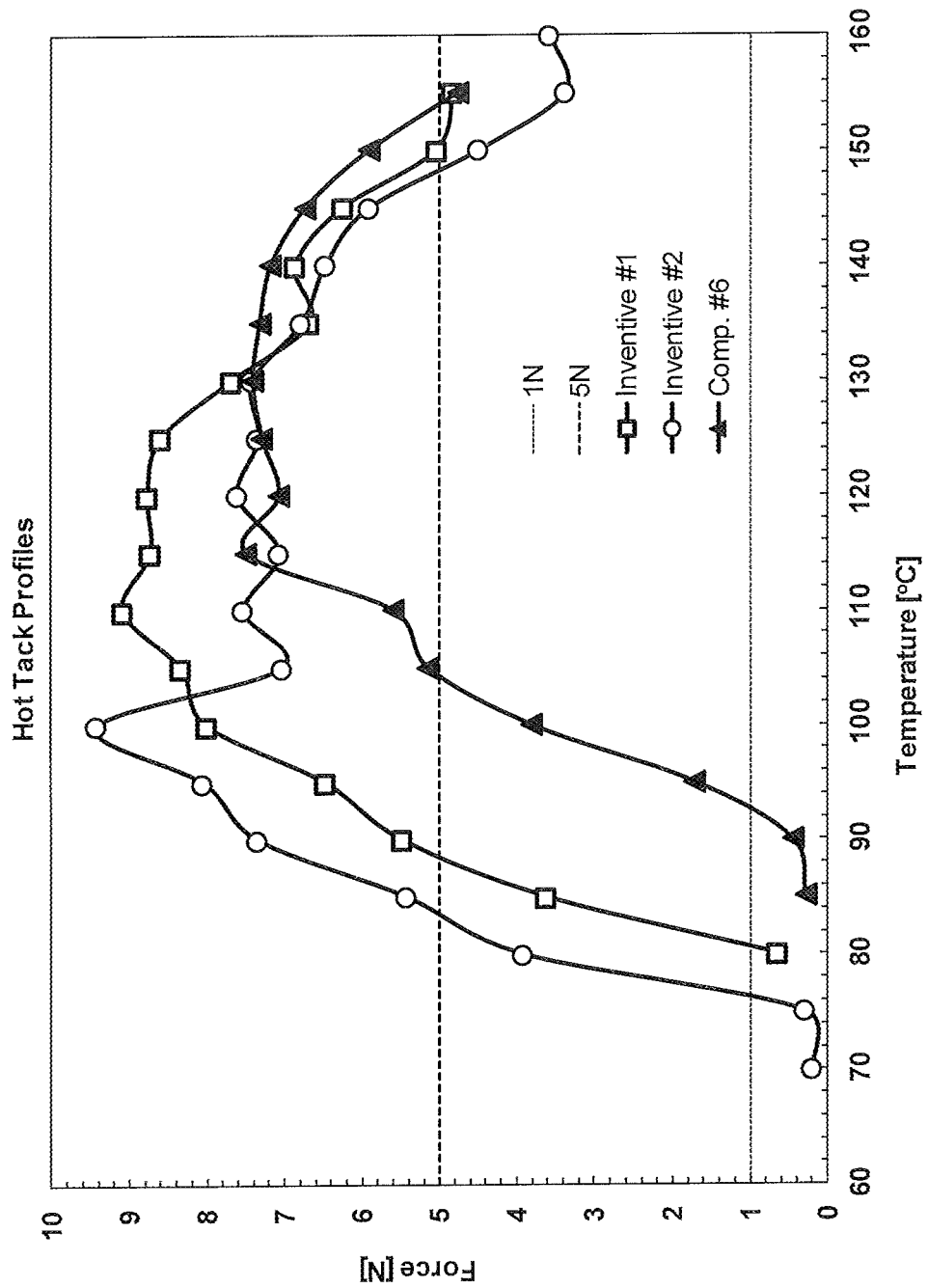

ETHYLENE COPOLYMERS AND FILMS WITH EXCELLENT SEALING PROPERTIES

The present disclosure provides ethylene copolymer compositions having a density of from 0.865 to 0.913 g/cm³ which when blown into film have excellent sealability. The ethylene copolymer compositions include a first ethylene copolymer which may be made with a single site polymerization catalyst, a second ethylene copolymer which may be made with a multi-site polymerization catalyst; and optionally a third ethylene copolymer.

Multicomponent polyethylene compositions are well known in the art. One method to access multicomponent polyethylene compositions is to use two or more distinct polymerization catalysts in one or more polymerization reactors. For example, the use of single site and Ziegler-Natta type polymerization catalysts in at least two distinct solution polymerization reactors is known. Such reactors may be configured in series or in parallel.

Solution polymerization processes are generally carried out at temperatures above the melting point of the ethylene homopolymer or copolymer product being made. In a typical solution polymerization process, catalyst components, solvent, monomers and hydrogen are fed under pressure to one or more reactors.

For solution phase ethylene polymerization, or ethylene copolymerization, reactor temperatures can range from about 80° C. to about 300° C. while pressures generally range from about 3 MPag to about 45 MPag. The ethylene homopolymer or copolymer produced remains dissolved in the solvent under reactor conditions. The residence time of the solvent in the reactor is relatively short, for example, from about 1 second to about 20 minutes. The solution process can be operated under a wide range of process conditions that allow the production of a wide variety of ethylene polymers. Post reactor, the polymerization reaction is quenched to prevent further polymerization, by adding a catalyst deactivator, and optionally passivated, by adding an acid scavenger. Once deactivated (and optionally passivated), the polymer solution is passed to a polymer recovery operation (a devolatilization system) where the ethylene homopolymer or copolymer is separated from process solvent, unreacted residual ethylene and unreacted optional α-olefin(s).

Regardless of the manner of production, there remains a need to improve the performance of multicomponent polyethylene compositions in film applications.

An embodiment in an ethylene copolymer composition including:

(i) from 20 to 80 weight percent of a first ethylene copolymer having a density of from 0.855 to 0.913 g/cm³; a molecular weight distribution, $M_w/M_n$ of from 1.8 to 2.3; and a melt index, $I_2$ of from 0.1 to 20 g/10 min;

(ii) from 80 to 20 weight percent of a second ethylene copolymer having a density of from 0.875 to 0.936 g/cm³; a molecular weight distribution, $M_w/M_n$ of from 2.3 to 6.0; and a melt index, $I_2$ of from 0.3 to 100 g/10 min; and (iii) from 0 to 40 weight percent of a third ethylene copolymer;

wherein the number of short chain branches per thousand carbon atoms in the first ethylene copolymer (SCB1) is greater than the number of short chain branches per thousand carbon atoms in the second ethylene copolymer (SCB2);

wherein the density of the second ethylene copolymer is equal to or greater than the density of the first ethylene copolymer;

wherein the ethylene copolymer composition has a density of from 0.865 to 0.913 g/cm³; a melt index, $I_2$ of from 0.5 to 10 g/10 min; and a fraction eluting at from 90 to 105° C., having an integrated area of greater than 4 weight percent, in a CTREF analysis;

wherein the ethylene copolymer composition has at least about 0.0015 parts per million (ppm) of hafnium;

wherein the weight percent of the first, second or third ethylene copolymer is defined as the weight of the first, second or the third ethylene copolymer divided by the weight of the sum of (i) the first ethylene copolymer, (ii) the second ethylene copolymer and (iii) the third ethylene copolymer, multiplied by 100%.

An embodiment is a film layer including an ethylene copolymer composition, the ethylene copolymer composition including:

(i) from 20 to 80 weight percent of a first ethylene copolymer having a density of from 0.855 to 0.913 g/cm³; a molecular weight distribution, $M_w/M_n$ of from 1.8 to 2.3; and a melt index, $I_2$ of from 0.1 to 20 g/10 min;

(ii) from 80 to 20 weight percent of a second ethylene copolymer having a density of from 0.875 to 0.936 g/cm³; a molecular weight distribution, $M_w/M_n$ of from 2.3 to 6.0; and a melt index, $I_2$ of from 0.3 to 100 g/10 min; and (iii) from 0 to 40 weight percent of a third ethylene copolymer;

wherein the number of short chain branches per thousand carbon atoms in the first ethylene copolymer (SCB1) is greater than the number of short chain branches per thousand carbon atoms in the second ethylene copolymer (SCB2);

wherein the density of the second ethylene copolymer is equal to or greater than the density of the first ethylene copolymer;

wherein the ethylene copolymer composition has a density of from 0.865 to 0.913 g/cm³; a melt index, $I_2$ of from 0.5 to 10 g/10 min; and a fraction eluting at from 90 to 105° C., having an integrated area of greater than 4 weight percent, in a CTREF analysis;

wherein the ethylene copolymer composition has at least about 0.0015 parts per million (ppm) of hafnium;

wherein the weight percent of the first, second or third ethylene copolymer is defined as the weight of the first, second or the third ethylene copolymer divided by the weight of the sum of (i) the first ethylene copolymer, (ii) the second ethylene copolymer and (iii) the third ethylene copolymer, multiplied by 100%.

In an embodiment, a film layer is a blown film layer.

In an embodiment, a blown film layer has a hot tack window (HTW) of at least 45° C. when measured at a film thickness of about 2 mil.

In an embodiment, a blown film layer has a seal initiation temperature (SIT) of less than 95° C. when measured at a film thickness of about 2 mil.

In an embodiment, a blown film layer has a hot tack onset temperature (HTOT) of less than 88° C. when measured at a film thickness of about 2 mil.

In an embodiment, a blown film layer has a dart impact strength of at least 800 g/mil when measured at a film thickness of about 1 mil.

In an embodiment, a blown film layer has a slow puncture resistance value of at least 100 J/mm when measured at a film thickness of about 1 mil.

In an embodiment, a blown film layer has a haze value of less than 6% when measured at a film thickness of about 1 mil.

In an embodiment, a film layer is a cast film layer.

In an embodiment, a multilayer cast film structure has a seal initiation temperature (SIT) of less than 90° C. when measured at a film thickness of about 2 mil.

An embodiment is a multilayer film structure including at least one film layer including an ethylene copolymer composition, the ethylene copolymer composition including:

(i) from 20 to 80 weight percent of a first ethylene copolymer having a density of from 0.855 to 0.913 g/cm$^3$; a molecular weight distribution, $M_w/M_n$ of from 1.8 to 2.3; and a melt index, $I_2$ of from 0.1 to 20 g/10 min;

(ii) from 80 to 20 weight percent of a second ethylene copolymer having a density of from 0.875 to 0.936 g/cm$^3$; a molecular weight distribution, $M_w/M_n$ of from 2.3 to 6.0; and a melt index, $I_2$ of from 0.3 to 100 g/10 min; and (iii) from 0 to 40 weight percent of a third ethylene copolymer;

wherein the number of short chain branches per thousand carbon atoms in the first ethylene copolymer (SCB1) is greater than the number of short chain branches per thousand carbon atoms in the second ethylene copolymer (SCB2);

wherein the density of the second ethylene copolymer is equal to or greater than the density of the first ethylene copolymer;

wherein the ethylene copolymer composition has a density of from 0.865 to 0.913 g/cm$^3$; a melt index, $I_2$ of from 0.5 to 10 g/10 min; and a fraction eluting at from 90 to 105° C., having an integrated area of greater than 4 weight percent, in a CTREF analysis;

wherein the ethylene copolymer composition has at least about 0.0015 parts per million (ppm) of hafnium;

wherein the weight percent of the first, second or third ethylene copolymer is defined as the weight of the first, second or the third ethylene copolymer divided by the weight of the sum of (i) the first ethylene copolymer, (ii) the second ethylene copolymer and (iii) the third ethylene copolymer, multiplied by 100%.

An embodiment is a multilayer film structure including a sealant layer, the sealant layer including an ethylene copolymer composition, the ethylene copolymer composition including:

(i) from 20 to 80 weight percent of a first ethylene copolymer having a density of from 0.855 to 0.913 g/cm$^3$; a molecular weight distribution, $M_w/M_n$ of from 1.8 to 2.3; and a melt index, $I_2$ of from 0.1 to 20 g/10 min;

(ii) from 80 to 20 weight percent of a second ethylene copolymer having a density of from 0.875 to 0.936 g/cm$^3$; a molecular weight distribution, $M_w/M_n$ of from 2.3 to 6.0; and a melt index, $I_2$ of from 0.3 to 100 g/10 min; and (iii) from 0 to 40 weight percent of a third ethylene copolymer;

wherein the number of short chain branches per thousand carbon atoms in the first ethylene copolymer (SCB1) is greater than the number of short chain branches per thousand carbon atoms in the second ethylene copolymer (SCB2);

wherein the density of the second ethylene copolymer is equal to or greater than the density of the first ethylene copolymer;

wherein the ethylene copolymer composition has a density of from 0.865 to 0.913 g/cm$^3$; a melt index, $I_2$ of from 0.5 to 10 g/10 min; and a fraction eluting at from 90 to 105° C., having an integrated area of greater than 4 weight percent, in a CTREF analysis;

wherein the ethylene copolymer composition has at least about 0.0015 parts per million (ppm) of hafnium;

wherein the weight percent of the first, second or third ethylene copolymer is defined as the weight of the first, second or the third ethylene copolymer divided by the weight of the sum of (i) the first ethylene copolymer, (ii) the second ethylene copolymer and (iii) the third ethylene copolymer, multiplied by 100%.

In an embodiment, a multilayer film structure has at least three film layers.

In an embodiment, a multilayer film structure has at least five film layers.

In an embodiment, a multilayer film structure has at least seven film layers.

In an embodiment, a multilayer film structure has at least nine film layers.

In an embodiment, a multilayer film structure has nine film layers.

BRIEF DESCRIPTION OF THE DRAWINGS

FIGS. 2A-2F show the gel permeation chromatographs with Fourier transform infra-red (GPC-FTIR) detection obtained for ethylene copolymer compositions made according to the present disclosure. The comonomer content, shown as the number of short chain branches per 1000 backbone carbons (y-axis), is given relative to the copolymer molecular weight (x-axis). The upwardly sloping dashed line (from left to right) is the short chain branching (in short chain branches per 1000 carbons atoms) determined by FTIR. As can be seen in the FIGS. 2A-2F, for Inventive Examples 1-6, the number of short chain branches initially increases at higher molecular weights and then decreases again at still higher molecular weights, and hence the comonomer incorporation is said to be "partially reversed" with a peak or maximum present.

In FIG. 3, $T^P_{CTREF}$ is the peak elution temperature of the first ethylene copolymer in the CTREF chromatogram.

FIG. 4A shows the hot tack profiles for monolayer blown films made using the ethylene copolymer compositions made according to the present disclosure, while

FIG. 6 shows the hot tack profiles for multilayer blown films in which a sealant layer was made with an ethylene copolymer composition made according to the present disclosure or with a comparative polyethylene.

DEFINITION OF TERMS

Figure 1:
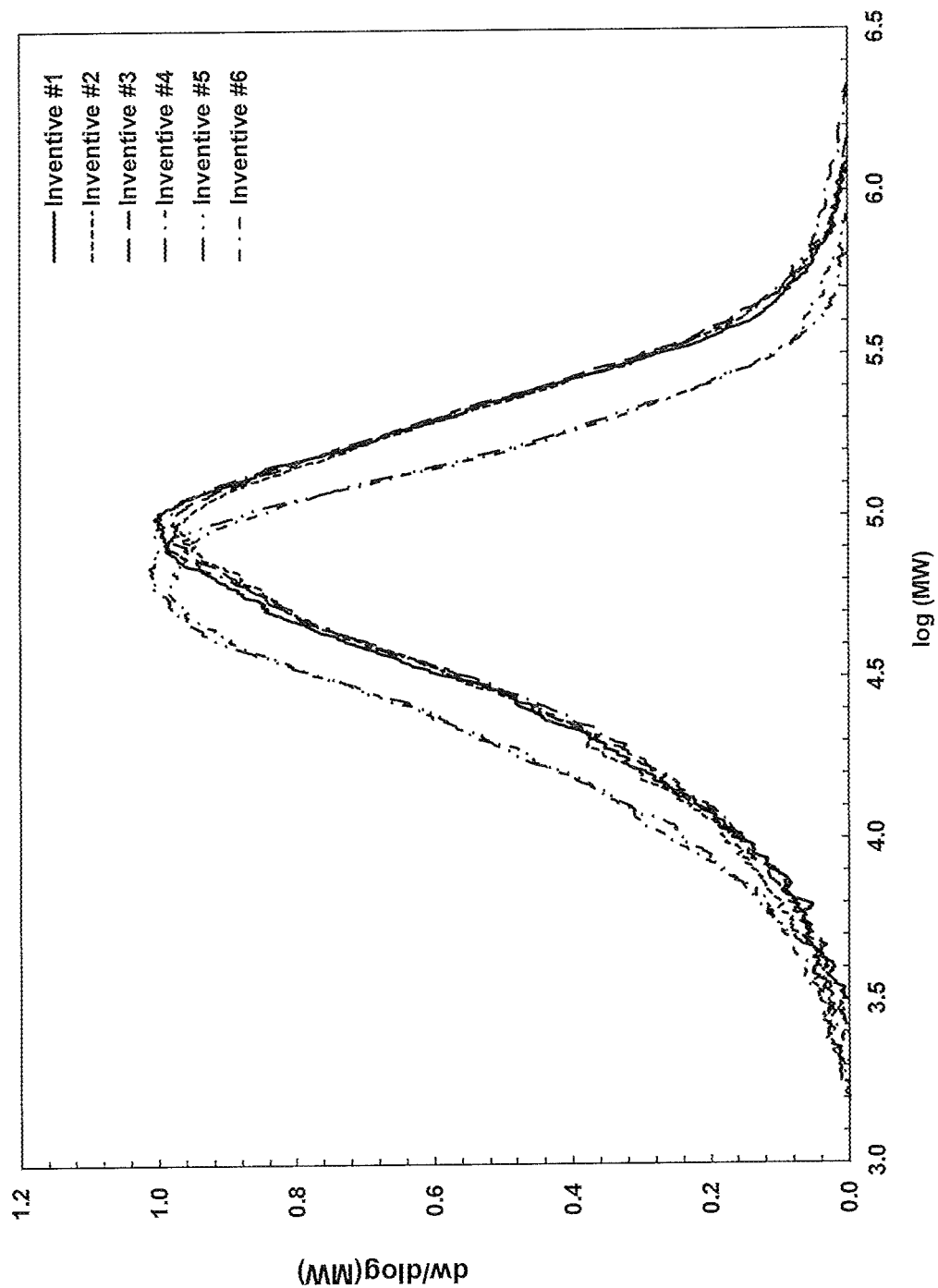
FIG. 1 shows the gel permeation chromatographs (GPC) with refractive index detection of ethylene copolymer compositions made according to the present disclosure.
Figure 2A:
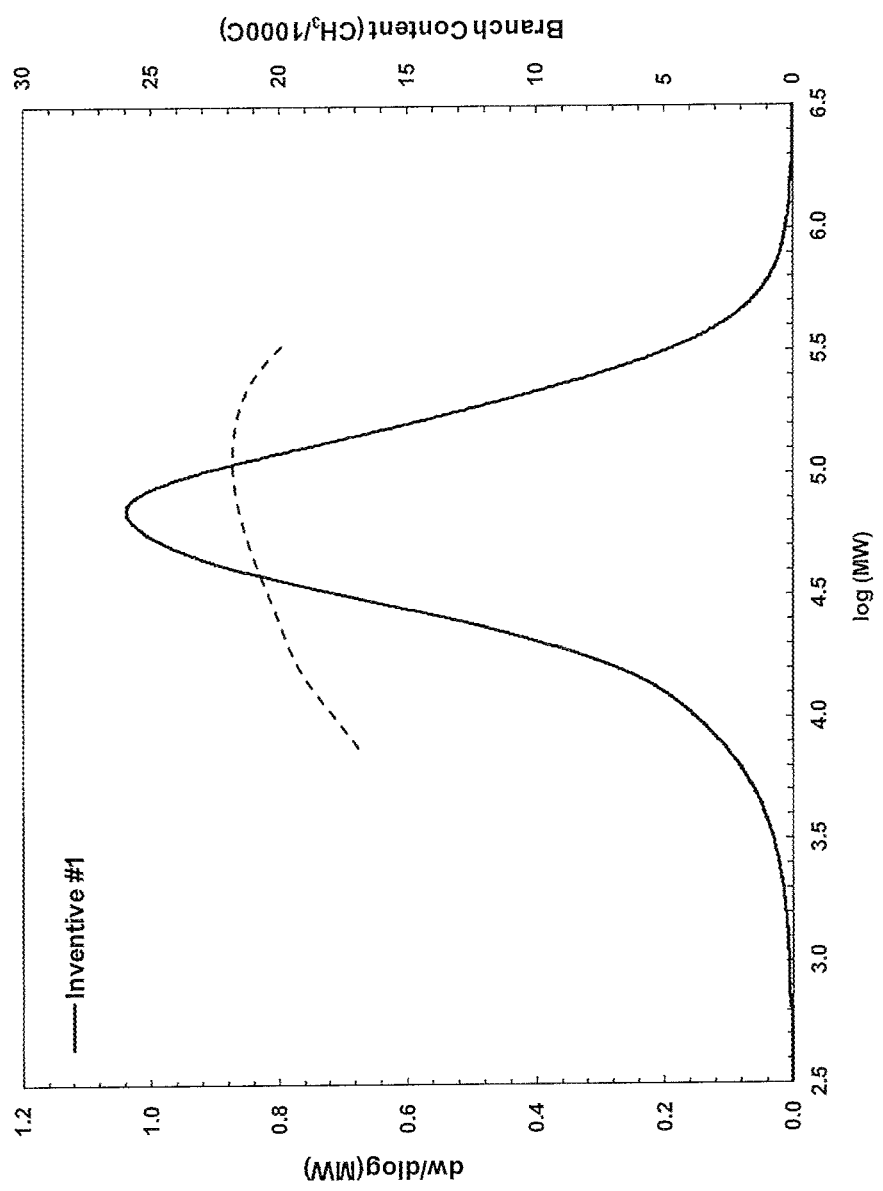
Figure 2B:
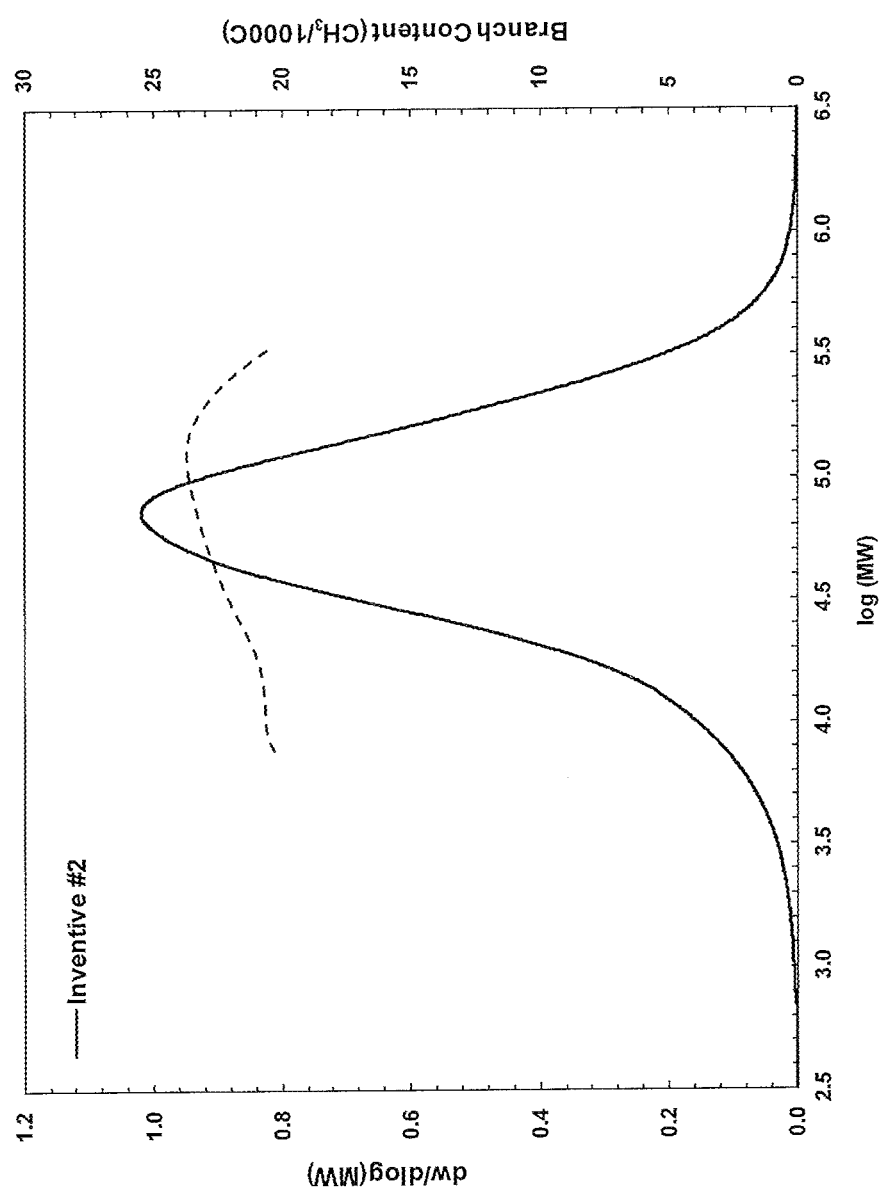
Figure 2D:
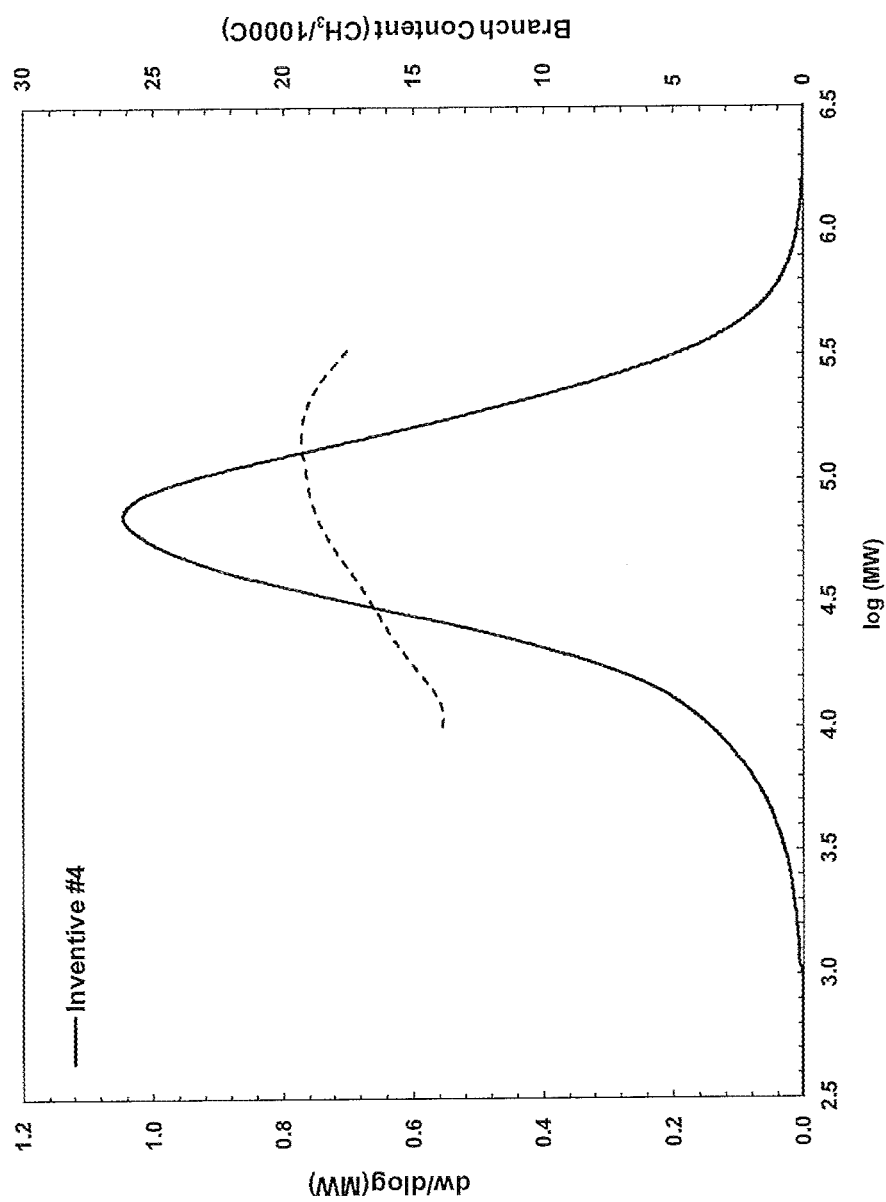
Figure 2E:
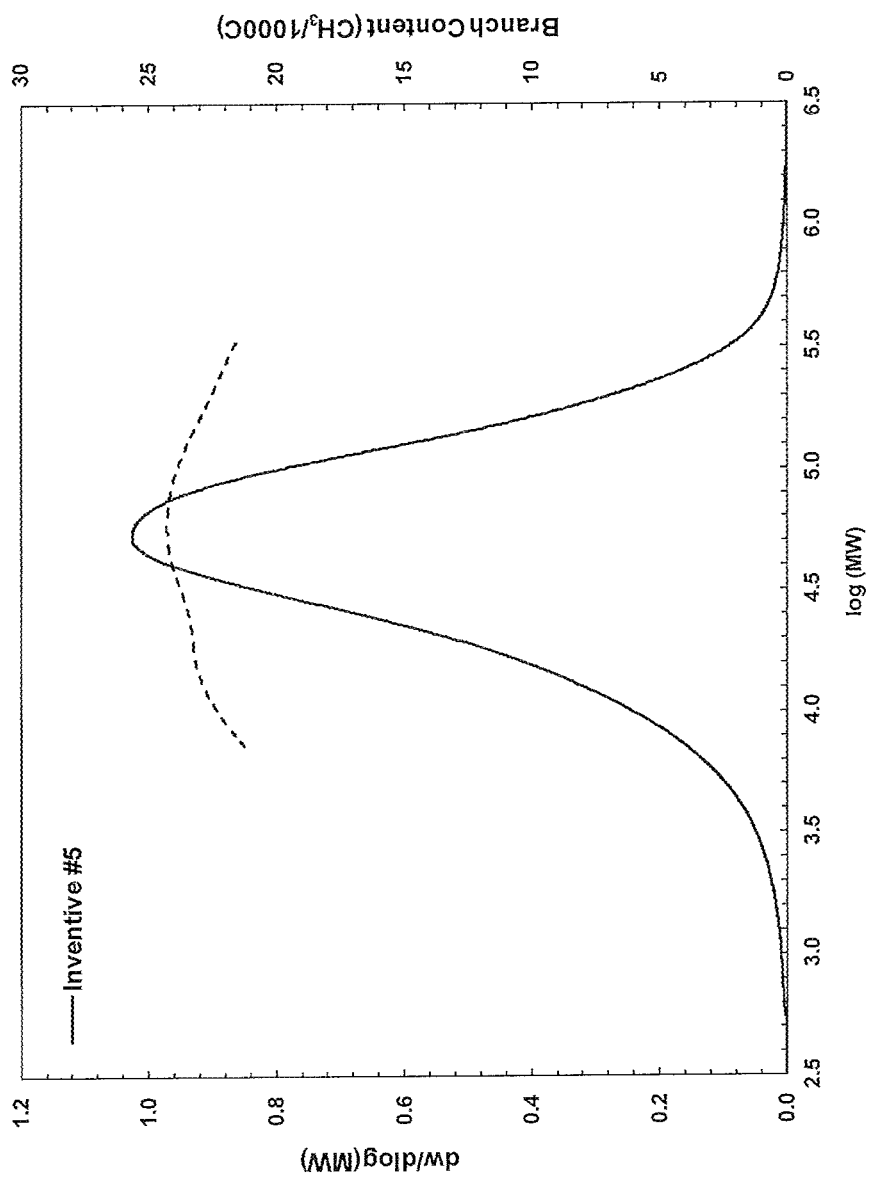

Other than in the examples or where otherwise indicated, all numbers or expressions referring to quantities of ingredients, extrusion conditions, etc., used in the specification and claims are to be understood as modified in all instances by the term "about." Accordingly, unless indicated to the contrary, the numerical parameters set forth in the following specification and attached claims are approximations that can vary depending upon the desired properties that the various embodiments desire to obtain. At the very least, and not as an attempt to limit the application of the doctrine of equivalents to the scope of the claims, each numerical parameter should at least be construed in light of the number of reported significant digits and by applying ordinary rounding techniques. The numerical values set forth in the specific examples are reported as precisely as possible. Any numerical values, however, inherently contain certain errors necessarily resulting from the standard deviation found in their respective testing measurements.

It should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

In order to form a more complete understanding of this disclosure the following terms are defined and should be used with the accompanying figures and the description of the various embodiments throughout.

As used herein, the term "monomer" refers to a small molecule that may chemically react and become chemically bonded with itself or other monomers to form a polymer.

As used herein, the term "α-olefin" or "alpha-olefin" is used to describe a monomer having a linear hydrocarbon chain containing from 3 to 20 carbon atoms having a double bond at one end of the chain; an equivalent term is "linear α-olefin".

As used herein, the term "polyethylene" or "ethylene polymer", refers to macromolecules produced from ethylene monomers and optionally one or more additional monomers; regardless of the specific catalyst or specific process used to make the ethylene polymer. In the polyethylene art, the one or more additional monomers are called "comonomer(s)" and often include α-olefins. The term "homopolymer" refers to a polymer that contains only one type of monomer. An "ethylene homopolymer" is made using only ethylene as a polymerizable monomer. The term "copolymer" refers to a polymer that contains two or more types of monomer. An "ethylene copolymer" is made using ethylene and one or more other types of polymerizable monomer. Common polyethylenes include high density polyethylene (HDPE), medium density polyethylene (MDPE), linear low density polyethylene (LLDPE), very low density polyethylene (VLDPE), ultralow density polyethylene (ULDPE), plastomer and elastomers. The term polyethylene also includes polyethylene terpolymers which may include two or more comonomers in addition to ethylene. The term polyethylene also includes combinations of, or blends of, the polyethylenes described above.

The term "heterogeneously branched polyethylene" refers to a subset of polymers in the ethylene polymer group that are produced using a heterogeneous catalyst system; non-limiting examples of which include Ziegler-Natta or chromium catalysts, both of which are well known in the art.

The term "homogeneously branched polyethylene" refers to a subset of polymers in the ethylene polymer group that are produced using single-site catalysts; non-limiting examples of which include metallocene catalysts, phosphinimine catalysts, and constrained geometry catalysts all of which are well known in the art.

Typically, homogeneously branched polyethylenes have narrow molecular weight distributions, for example gel permeation chromatography (GPC) $M_w/M_n$ values of less than about 2.8, especially less than about 2.3, although exceptions may arise; $M_w$ and $M_n$ refer to weight and number average molecular weights, respectively. In contrast, the $M_w/M_n$ of heterogeneously branched ethylene polymers are typically greater than the $M_w/M_n$ of homogeneous polyethylene. In general, homogeneously branched ethylene polymers also have a narrow composition distribution, i.e. each macromolecule within the molecular weight distribution has a similar comonomer content. Frequently, the composition distribution breadth index "CDBI" is used to quantify how the comonomer is distributed within an ethylene polymer, as well as to differentiate ethylene polymers produced with different catalysts or processes. The "$CDBI_{50}$" is defined as the percent of ethylene polymer whose composition is within 50 weight percent (wt. %) of the median comonomer composition; this definition is consistent with that described in WO 93/03093 assigned to Exxon Chemical Patents Inc. The $CDBI_{50}$ of an ethylene copolymer can be calculated from TREF curves (Temperature Rising Elution Fractionation); the TREF method is described in Wild, et al., J. Polym. Sci., Part B, Polym. Phys., Vol. 20 (3), pages 441-455. Typically, the $CDBI_{50}$ of homogeneously branched ethylene polymers are greater than about 70% or greater than about 75%. In contrast, the $CDBI_{50}$ of α-olefin containing heterogeneously branched ethylene polymers are generally lower than the $CDBI_{50}$ of homogeneous ethylene polymers. For example, the $CDBI_{50}$ of a heterogeneously branched ethylene polymer may be less than about 75%, or less than about 70%.

It is well known to those skilled in the art, that homogeneously branched ethylene polymers are frequently further subdivided into "linear homogeneous ethylene polymers" and "substantially linear homogeneous ethylene polymers". These two subgroups differ in the amount of long chain branching: more specifically, linear homogeneous ethylene polymers have less than about 0.01 long chain branches per 1000 carbon atoms; while substantially linear ethylene polymers have greater than about 0.01 to about 3.0 long chain branches per 1000 carbon atoms. A long chain branch is macromolecular in nature, i.e. similar in length to the macromolecule that the long chain branch is attached to. Hereafter, in this disclosure, the term "homogeneously branched polyethylene" or "homogeneously branched ethylene polymer" refers to both linear homogeneous ethylene polymers and substantially linear homogeneous ethylene polymers.

The term "thermoplastic" refers to a polymer that becomes liquid when heated, will flow under pressure and solidify when cooled. Thermoplastic polymers include ethylene polymers as well as other polymers used in the plastic industry; non-limiting examples of other polymers commonly used in film applications include barrier resins (EVOH), tie resins, polyethylene terephthalate (PET), polyamides and the like.

As used herein the term "monolayer film" refers to a film containing a single layer of one or more thermoplastics.

As used herein the term "multilayer film" or "multilayer film structure" refers to a film including more than one thermoplastic layer, or optionally non-thermoplastic layers. Non-limiting examples of non-thermoplastic materials include metals (foil) or cellulosic (paper) products. One or more of the thermoplastic layers within a multilayer film (or film structure) may include more than one thermoplastic.

As used herein, the term "tie resin" refers to a thermoplastic that when formed into an intermediate layer, or a "tie layer" within a multilayer film structure, promotes adhesion between adjacent film layers that are dissimilar in chemical composition.

As used herein, the term "sealant layer" refers to a layer of thermoplastic film that is capable of being attached to a second substrate, forming a leak proof seal. A "sealant layer" may be a skin layer or the innermost layer in a multilayer film structure.

As used herein, the term "adhesive lamination" and the term "extrusion lamination" describes continuous processes through which two or more substrates, or webs of material, are combined to form a multilayer product or sheet; wherein the two or more webs are joined using an adhesive or a molten thermoplastic film, respectively.

As used herein, the term "extrusion coating" describes a continuous process through which a molten thermoplastic layer is combined with, or deposited on, a moving solid web or substrate. Non-limiting examples of substrates include paper, paperboard, foil, monolayer plastic film, multilayer plastic film or fabric. The molten thermoplastic layer could be monolayer or multilayer.

As used herein, the terms "hydrocarbyl", "hydrocarbyl radical" or "hydrocarbyl group" refers to linear or cyclic, aliphatic, olefinic, acetylenic and aryl (aromatic) radicals including hydrogen and carbon that are deficient by one hydrogen.

As used herein, an "alkyl radical" includes linear, branched and cyclic paraffin radicals that are deficient by one hydrogen radical; non-limiting examples include methyl ($-CH_3$) and ethyl ($-CH_2CH_3$) radicals. The term "alkenyl radical" refers to linear, branched and cyclic hydrocarbons containing at least one carbon-carbon double bond that is deficient by one hydrogen radical.

As used herein, the term "aryl" group includes phenyl, naphthyl, pyridyl and other radicals whose molecules have an aromatic ring structure; non-limiting examples include naphthylene, phenanthrene and anthracene. An "arylalkyl" group is an alkyl group having an aryl group pendant there from; non-limiting examples include benzyl, phenethyl and tolylmethyl; an "alkylaryl" is an aryl group having one or more alkyl groups pendant there from; non-limiting examples include tolyl, xylyl, mesityl and cumyl.

As used herein, the phrase "heteroatom" includes any atom other than carbon and hydrogen that can be bound to carbon. A "heteroatom-containing group" is a hydrocarbon radical that contains a heteroatom and may contain one or more of the same or different heteroatoms. In one embodiment, a heteroatom-containing group is a hydrocarbyl group containing from 1 to 3 atoms chosen from boron, aluminum, silicon, germanium, nitrogen, phosphorous, oxygen and sulfur. Non-limiting examples of heteroatom-containing groups include radicals of imines, amines, oxides, phosphines, ethers, ketones, oxoazolines heterocyclics, oxazolines, thioethers, and the like. The term "heterocyclic" refers to ring systems having a carbon backbone that include from 1 to 3 atoms chosen from boron, aluminum, silicon, germanium, nitrogen, phosphorous, oxygen and sulfur.

As used herein the term "unsubstituted" means that hydrogen radicals are bounded to the molecular group that follows the term unsubstituted. The term "substituted" means that the group following this term possesses one or more moieties (non hydrogen radicals) that have replaced one or more hydrogen radicals in any position within the group; non-limiting examples of moieties include halogen radicals (F, Cl, Br), hydroxyl groups, carbonyl groups, carboxyl groups, silyl groups, amine groups, phosphine groups, alkoxy groups, phenyl groups, naphthyl groups, $C_1$ to $C_{30}$ alkyl groups, $C_2$ to $C_{30}$ alkenyl groups, and combinations thereof. Non-limiting examples of substituted alkyls and aryls include acyl radicals, alkyl silyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals and combinations thereof.

In the present disclosure, an ethylene copolymer composition will include a first ethylene copolymer having a density, d1; a second ethylene copolymer having a density, d2; and optionally a third ethylene copolymer having a density, d3; wherein the density of the second ethylene copolymer is equal to or greater than the density of the first ethylene copolymer. Each of these ethylene copolymer components and the ethylene copolymer composition of which they are a part are further described below.

The First Ethylene Copolymer

In an embodiment of the disclosure, the first ethylene copolymer is made with a single site catalyst, non-limiting examples of which include phosphinimine catalysts, metallocene catalysts, and constrained geometry catalysts, all of which are well known in the art.

In an embodiment of the disclosure, the first ethylene copolymer is made with a single site catalyst, having hafnium, Hf as the active metal center.

In embodiments of the disclosure, alpha-olefins which may be copolymerized with ethylene to make the first ethylene copolymer may be selected from the group including 1-propene, 1-butene, 1-pentene, 1-hexene and 1-octene and mixtures thereof.

In an embodiment of the disclosure, the first ethylene copolymer is a homogeneously branched ethylene copolymer.

In an embodiment of the disclosure, the first ethylene copolymer is an ethylene/1-octene copolymer.

In an embodiment of the disclosure, the first ethylene copolymer is made with a metallocene catalyst.

In an embodiment of the disclosure, the first ethylene copolymer is made with a bridged metallocene catalyst.

In an embodiment of the disclosure, the first ethylene copolymer is made with a bridged metallocene catalyst having the formula I:

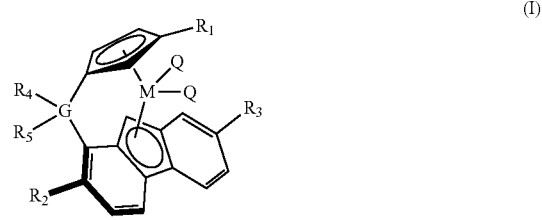

In Formula (I): M is a group 4 metal selected from titanium, zirconium or hafnium; G is a group 14 element selected from carbon, silicon, germanium, tin or lead; $R_1$ is a hydrogen atom, a $C_{1-20}$ hydrocarbyl radical, a $C_{1-20}$ alkoxy radical or a $C_{6-10}$ aryl oxide radical; $R_2$ and $R_3$ are independently selected from a hydrogen atom, a $C_{1-20}$ hydrocarbyl radical, a $C_{1-20}$ alkoxy radical or a $C_{6-10}$ aryl oxide radical; $R_4$ and $R_5$ are independently selected from a hydrogen atom, an unsubstituted $C_{1-20}$ hydrocarbyl radical, a substituted $C_{1-20}$ hydrocarbyl radical, a $C_{1-20}$ alkoxy radical or a $C_{6-10}$ aryl oxide radical; and Q is independently an activatable leaving group ligand.

In an embodiment, $R_4$ and $R_5$ are independently an aryl group.

In an embodiment, $R_4$ and $R_5$ are independently a phenyl group or a substituted phenyl group.

In an embodiment, $R_4$ and $R_5$ are a phenyl group.

In an embodiment, $R_4$ and $R_5$ are independently a substituted phenyl group.

In an embodiment, $R_4$ and $R_5$ are a substituted phenyl group, wherein the phenyl group is substituted with a substituted silyl group.

In an embodiment, $R_4$ and $R_5$ are a substituted phenyl group, wherein the phenyl group is substituted with a trialkyl silyl group.

In an embodiment, $R_4$ and $R_5$ are a substituted phenyl group, wherein the phenyl group is substituted at the para position with a trialkylsilyl group. In an embodiment, $R^1$ and $R^2$ are a substituted phenyl group, wherein the phenyl group is substituted at the para position with a trimethylsilyl group. In an embodiment, $R^1$ and $R^2$ are a substituted phenyl group, wherein the phenyl group is substituted at the para position with a triethylsilyl group.

In an embodiment, $R_4$ and $R_5$ are independently an alkyl group.

In an embodiment, $R_4$ and $R_5$ are independently an alkenyl group.

In an embodiment, $R_1$ is hydrogen.
In an embodiment, $R_1$ is an alkyl group.
In an embodiment, $R_1$ is an aryl group.
In an embodiment, $R_1$ is an alkenyl group.
In an embodiment, $R_2$ and $R_3$ are independently a hydrocarbyl group having from 1 to 30 carbon atoms.

In an embodiment, $R_2$ and $R_3$ are independently an aryl group.

In an embodiment, $R_2$ and $R_3$ are independently an alkyl group.

In an embodiment, $R_2$ and $R_3$ are independently an alkyl group having from 1 to 20 carbon atoms.

In an embodiment, $R_2$ and $R_3$ are independently a phenyl group or a substituted phenyl group.

In an embodiment, $R_2$ and $R_3$ are a tert-butyl group.
In an embodiment, $R_2$ and $R_3$ are hydrogen.
In an embodiment M is hafnium, Hf.
In an embodiment of the disclosure, the first ethylene copolymer is made with a bridged metallocene catalyst having the formula I:

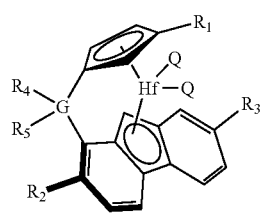

(I)

In Formula (I): G is a group 14 element selected from carbon, silicon, germanium, tin or lead; $R_1$ is a hydrogen atom, a $C_{1-20}$ hydrocarbyl radical, a $C_{1-20}$ alkoxy radical or a $C_{6-10}$ aryl oxide radical; $R_2$ and $R_3$ are independently selected from a hydrogen atom, a $C_{1-20}$ hydrocarbyl radical, a $C_{1-20}$ alkoxy radical or a $C_{6-10}$ aryl oxide radical; $R_4$ and $R_5$ are independently selected from a hydrogen atom, an unsubstituted $C_{1-20}$ hydrocarbyl radical, a substituted $C_{1-20}$ hydrocarbyl radical, a $C_{1-20}$ alkoxy radical or a $C_{6-10}$ aryl oxide radical; and Q is independently an activatable leaving group ligand.

In the current disclosure, the term "activatable", means that the ligand Q may be cleaved from the metal center M via a protonolysis reaction or abstracted from the metal center M by suitable acidic or electrophilic catalyst activator compounds (also known as "co-catalyst" compounds) respectively, examples of which are described below. The activatable ligand Q may also be transformed into another ligand which is cleaved or abstracted from the metal center M (e.g. a halide may be converted to an alkyl group). Without wishing to be bound by any single theory, protonolysis or abstraction reactions generate an active "cationic" metal center which can polymerize olefins.

In embodiments of the present disclosure, the activatable ligand, Q is independently chosen from a hydrogen atom; a halogen atom; a $C_{1-20}$ hydrocarbyl radical, a $C_{1-20}$ alkoxy radical, and a $C_{6-10}$ aryl or aryloxy radical, where each of the hydrocarbyl, alkoxy, aryl, or aryl oxide radicals may be un-substituted or further substituted by one or more halogen or other group; a $C_{1-8}$ alkyl; a $C_{1-8}$ alkoxy; a O6-10 aryl or aryloxy; an amido or a phosphido radical, but where Q is not a cyclopentadienyl. Two Q ligands may also be joined to one another and form for example, a substituted or unsubstituted diene ligand (e.g. 1,3-butadiene); or a delocalized heteroatom containing group such as an acetate or acetamidinate group. In a convenient embodiment of the disclosure, each Q is independently chosen from a halide atom, a $C_{1-4}$ alkyl radical and a benzyl radical. Particularly suitable activatable ligands Q are monoanionic such as a halide (e.g. chloride) or a hydrocarbyl (e.g. methyl, benzyl).

In an embodiment of the disclosure, the single site catalyst used to make the first ethylene copolymer is diphenylmethylene(cyclopentadienyl)(2,7-di-t-butylfuorenyl)hafnium dichloride having the molecular formula: [(2,7-tBu$_2$Flu)Ph$_2$C(Cp)HfCl$_2$].

In an embodiment of the disclosure the single site catalyst used to make the first ethylene copolymer is diphenylmethylene(cyclopentadienyl)(2,7-di-t-butylfuorenyl)hafnium dimethyl having the molecular formula [(2,7-tBu$_2$Flu)Ph$_2$C(Cp)HfMe$_2$].

In addition to the single site catalyst molecule per se, an active single site catalyst system may further include one or more of the following: an alkylaluminoxane co-catalyst and an ionic activator. The single site catalyst system may also optionally include a hindered phenol.

Although the exact structure of alkylaluminoxane is uncertain, subject matter experts generally agree that it is an oligomeric species that contain repeating units of the general formula:

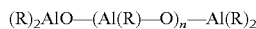

(R)$_2$AlO—(Al(R)—O)$_n$—Al(R)$_2$ where the R groups may be the same or different linear, branched or cyclic hydrocarbyl radicals containing 1 to 20 carbon atoms and n is from 0 to about 50. A non-limiting example of an alkylaluminoxane is methylaluminoxane (or MAO) wherein each R group is a methyl radical.

In an embodiment of the disclosure, R of the alkylaluminoxane, is a methyl radical and m is from 10 to 40.

In an embodiment of the disclosure, the co-catalyst is modified methylaluminoxane (MMAO).

It is well known in the art, that the alkylaluminoxane can serve dual roles as both an alkylator and an activator. Hence, an alkylaluminoxane co-catalyst is often used in combination with activatable ligands such as halogens.

In general, ionic activators include a cation and a bulky anion; wherein the latter is substantially non-coordinating. Non-limiting examples of ionic activators are boron ionic activators that are four coordinate with four ligands bonded to the boron atom. Non-limiting examples of boron ionic activators include the following formulas shown below;

where B represents a boron atom, $R^5$ is an aromatic hydrocarbyl (e.g. triphenyl methyl cation) and each $R^7$ is independently selected from phenyl radicals which are unsubstituted or substituted with from 3 to 5 substituents selected from fluorine atoms, $C_{1-4}$ alkyl or alkoxy radicals which are unsubstituted or substituted by fluorine atoms; and a silyl radical of formula $—Si(R^9)_3$, where each $R^9$ is independently selected from hydrogen atoms and $C_{1-4}$ alkyl radicals, and

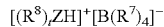

where B is a boron atom, H is a hydrogen atom, Z is a nitrogen or phosphorus atom, t is 2 or 3 and $R^8$ is selected from $C_{1-8}$ alkyl radicals, phenyl radicals which are unsubstituted or substituted by up to three $C_{1-4}$ alkyl radicals, or one $R^8$ taken together with the nitrogen atom may form an anilinium radical and $R^7$ is as defined above.

In both formula a non-limiting example of $R^7$ is a pentafluorophenyl radical. In general, boron ionic activators may be described as salts of tetra(perfluorophenyl) boron; non-limiting examples include anilinium, carbonium, oxonium, phosphonium and sulfonium salts of tetra(perfluorophenyl)boron with anilinium and trityl (or triphenylmethylium). Additional non-limiting examples of ionic activators include: triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra(pentafluorophenyl)boron, tri(n-butyl)ammonium tetra(o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra(phenyl)boron, triphenylphosphonium tetra(phenyl)boron, tri(methylphenyl)phosphonium tetra(phenyl)boron, tri(dimethylphenyl)phosphonium tetra(phenyl)boron, tropillium tetrakispentafluorophenyl borate, triphenylmethylium tetrakispentafluorophenyl borate, benzene(diazonium)tetrakispentafluorophenyl borate, tropillium tetrakis(2,3,5,6-tetrafluorophenyl)borate, triphenylmethylium tetrakis(2,3,5,6-tetrafluorophenyl) borate, benzene(diazonium) tetrakis(3,4,5-trifluorophenyl)borate, tropillium tetrakis(3,4,5-trifluorophenyl)borate, benzene(diazonium) tetrakis(3,4,5-trifluorophenyl)borate, tropillium tetrakis(1,2,2-trifluoroethenyl)borate, triphenylmethylium tetrakis(1,2,2-trifluoroethenyl)borate, benzene(diazonium) tetrakis(1,2,2-trifluoroethenyl)borate, tropillium tetrakis(2,3,4,5-tetrafluorophenyl)borate, triphenylmethylium tetrakis(2,3,4,5-tetrafluorophenyl)borate, and benzene(diazonium) tetrakis (2,3,4,5 tetrafluorophenyl)borate. Readily available commercial ionic activators include N,N-dimethylanilinium tetrakispentafluorophenyl borate, and triphenylmethylium tetrakispentafluorophenyl borate.

Non-limiting examples of hindered phenols include butylated phenolic antioxidants, butylated hydroxytoluene, 2,6-di-tertiarybutyl-4-ethyl phenol, 4,4'-methylenebis (2,6-di-tertiary-butylphenol), 1,3,5-trimethyl-2,4,6-tris (3,5-di-tert-butyl-4-hydroxybenzyl) benzene and octadecyl-3-(3',5'-di-tert-butyl-4'-hydroxyphenyl) propionate.

To produce an active single site catalyst system, the quantity and mole ratios of the three or four components: the single site catalyst, the alkylaluminoxane, the ionic activator, and the optional hindered phenol are optimized.

In an embodiment of the disclosure, the single site catalyst used to make the first ethylene copolymer produces no long chain branches, and/or the first ethylene copolymer will contain no measurable amounts of long chain branches.

In an embodiment of the disclosure, the single site catalyst used to make the first ethylene copolymer produces long chain branches, and the first ethylene copolymer will contain long chain branches, hereinafter 'LCB'. LCB is a well-known structural phenomenon in ethylene copolymers and well known to those of ordinary skill in the art. Traditionally, there are three methods for LCB analysis, namely, nuclear magnetic resonance spectroscopy (NMR), for example see J. C. Randall, J Macromol. Sci., Rev. Macromol. Chem. Phys. 1989, 29, 201; triple detection SEC equipped with a DRI, a viscometer and a low-angle laser light scattering detector, for example see W. W. Yau and D. R. Hill, Int. J. Polym. Anal. Charact. 1996; 2:151; and rheology, for example see W. W. Graessley, Acc. Chem. Res. 1977, 10, 332-339. In this disclosure, a long chain branch is macromolecular in nature, i.e., long enough to be seen in an NMR spectra, triple detector SEC experiments or rheological experiments.

In an embodiment of the disclosure, the first ethylene copolymer contains long chain branching characterized by the LCBF disclosed herein. In embodiments of the disclosure, the upper limit on the LCBF of the first ethylene copolymer may be about 0.5, in other cases about 0.4 and in still other cases about 0.3 (dimensionless). In embodiments of the disclosure, the lower limit on the LCBF of the first ethylene copolymer may be about 0.001, in other cases about 0.0015 and in still other cases about 0.002 (dimensionless).

The first ethylene copolymer may contain catalyst residues that reflect the chemical composition of the catalyst formulation used to make it. Those skilled in the art will understand that catalyst residues are typically quantified by the parts per million of metal, in for example the first ethylene copolymer (or the ethylene copolymer composition; see below), where the metal present originates from the metal in the catalyst formulation used to make it. Non-limiting examples of the metal residue which may be present include Group 4 metals, titanium, zirconium and hafnium. In embodiments of the disclosure, the upper limit on the ppm of metal in the first ethylene copolymer may be about 3.0 ppm, in other cases about 2.0 ppm and in still other cases about 1.5 ppm. In embodiments of the disclosure, the lower limit on the ppm of metal in the first ethylene copolymer may be about 0.03 ppm, in other cases about 0.09 ppm and in still other cases about 0.15 ppm.

In an embodiment of the disclosure, the first ethylene copolymer has a density of from 0.855 to 0.926 g/cm$^3$, a molecular weight distribution, $M_w/M_n$ of from 1.7 to 2.3, and a melt index, $I_2$ of from 0.1 to 20 g/10 min.

In an embodiment of the disclosure, the first ethylene copolymer has a density of from 0.855 to 0.913 g/cm$^3$, a molecular weight distribution, $M_w/M_n$ of from 1.7 to 2.3, and a melt index, $I_2$ of from 0.1 to 20 g/10 min.

In embodiments of the disclosure, the upper limit on the molecular weight distribution, $M_w/M_n$ of the first ethylene copolymer may be about 2.8, or about 2.5, or about 2.4, or about 2.3, or about 2.2. In embodiments of the disclosure, the lower limit on the molecular weight distribution, $M_w/M_n$ of the first ethylene copolymer may be about 1.6, or about 1.7, or about 1.8, or about 1.9.

In embodiments of the disclosure, the first ethylene copolymer has a molecular weight distribution, $M_w/M_n$ of <2.3, or ≤2.3, or <2.1, or ≤2.1, or <2.0, or ≤2.0, or about 2.0. In embodiments of the disclosure, the first ethylene copolymer has a molecular weight distribution, $M_w/M_n$ of from about 1.7 to about 2.3, or from about 1.8 to about 2.3 or from about 1.8 to about 2.2.

In an embodiment of the disclosure, the first ethylene copolymer has from 1 to 150 short chain branches per thousand carbon atoms (SCB1). In further embodiments, the first ethylene copolymer has from 3 to 100 short chain branches per thousand carbon atoms (SCB1), or from 5 to 100 short chain branches per thousand carbon atoms (SCB1), or from 5 to 75 short chain branches per thousand carbon atoms (SCB1), or from 10 to 75 short chain branches per thousand carbon atoms (SCB1), or from 5 to 50 short chain branches per thousand carbon atoms (SCB1), or from 10 to 50 short chain branches per thousand carbon atoms (SCB1), or from 15 to 75 short chain branches per thousand carbon atoms (SCB1). In still further embodiments, the first ethylene copolymer has from 15 to 50 short chain branches per thousand carbon atoms (SCB1), or from 20 to 75 short chain branches per thousand carbon atoms (SCB1), or from 20 to 50 short chain branches per thousand carbon atoms (SCB1), or from 5 to 40 short chain branches per thousand carbon atoms (SCB1), or from 10 to 40 short chain branches per thousand carbon atoms (SCB1), or from 15 to 40 short chain branches per thousand carbon atoms (SCB1), or from 20 to 35 short chain branches per thousand carbon atoms (SCB1).

The short chain branching (i.e. the short chain branching per thousand backbone carbon atoms, SCB1) is the branching due to the presence of an alpha-olefin comonomer in the ethylene copolymer and will for example have two carbon atoms for a 1-butene comonomer, or four carbon atoms for a 1-hexene comonomer, or six carbon atoms for a 1-octene comonomer, etc.

In an embodiment of the disclosure, the number of short chain branches per thousand carbon atoms in the first ethylene copolymer (SCB1), is greater than the number of short chain branches per thousand carbon atoms in the second ethylene copolymer (SCB2).

In an embodiment of the disclosure, the number of short chain branches per thousand carbon atoms in the first ethylene copolymer (SCB1), is greater than the number of short chain branches per thousand carbon atoms in the third ethylene copolymer (SCB3).

In an embodiment of the disclosure, the number of short chain branches per thousand carbon atoms in the first ethylene copolymer (SCB1), is greater than the number of short chain branches per thousand carbon atoms in each of the second ethylene copolymer (SCB2) and the third ethylene copolymer (SCB3).

In embodiments of the disclosure, the upper limit on the density, d1 of the first ethylene copolymer may be about 0.941 g/cm³; in some cases about 0.936 g/cm³; in other cases about 0.931 g/cm³, in still other cases about 0.926 g/cm³, in yet still other cases about 0.921 g/cm³, or about 0.918 g/cm³, or about 0.913 g/cm³, or about 0.912 g/cm³, or about 0.910 g/cm³. In embodiments of the disclosure, the lower limit on the density, d1 of the first ethylene copolymer may be about 0.855 g/cm³, in some cases about 0.865 g/cm³, and; in other cases, about 0.875 g/cm³.

In embodiments of the disclosure, the density, d1 of the first ethylene copolymer may be from about 0.855 g/cm³ to about 0.941 g/cm³, or from about 0.855 g/cm³ to about 0.936 g/cm³, or from about 0.855 g/cm³ to about 0.931 g/cm³, or from about 0.855 g/cm³ to about 0.926 g/cm³, or from about 0.855 g/cm³ to about 0.921 g/cm³, or from about 0.855 g/cm³ to about 0.914 g/cm³, or from about 0.855 g/cm³ to about 0.913 g/cm³, or from about 0.855 g/cm³ to about 0.912 g/cm³, or from about 0.855 g/cm³ to about 0.910 g/cm³, or from about 0.855 g/cm³ to about 0.906 g/cm³, or from about 0.865 g/cm³ to about 0.941 g/cm³, or from about 0.865 g/cm³ to about 0.936 g/cm³, or from about 0.865 g/cm³ to about 0.931 g/cm³, or from about 0.865 g/cm³ to about 0.926 g/cm³, or from about 0.865 g/cm³ to about 0.921 g/cm³, or from about 0.865 g/cm³ to about 0.914 g/cm³, or from about 0.865 g/cm³ to about 0.913 g/cm³, or from about 0.865 g/cm³ to about 0.912 g/cm³, or from about 0.865 g/cm³ to about 0.910 g/cm³, or from about 0.865 g/cm³ to about 0.906 g/cm³, or from about 0.875 g/cm³ to about 0.941 g/cm³, or from about 0.875 g/cm³ to about 0.936 g/cm³, or from about 0.875 g/cm³ to about 0.931 g/cm³, or from about 0.875 g/cm³ to about 0.926 g/cm³, or from about 0.875 g/cm³ to about 0.921 g/cm³, or from about 0.875 g/cm³ to about 0.914 g/cm³, or from about 0.875 g/cm³ to about 0.913 g/cm³, or from about 0.875 g/cm³ to about 0.912 g/cm³, or from about 0.875 g/cm³ to about 0.910 g/cm³, or from about 0.875 g/cm³ to about 0.906 g/cm³, or from about 0.885 g/cm³ to about 0.941 g/cm³, or from about 0.885 g/cm³ to about 0.936 g/cm³, or from about 0.885 g/cm³ to about 0.931 g/cm³, or from about 0.885 g/cm³ to about 0.926 g/cm³, or from about 0.885 g/cm³ to about 0.921 g/cm³, or from about 0.885 g/cm³ to about 0.914 g/cm³, or from about 0.885 g/cm³ to about 0.913 g/cm³, or from about 0.885 g/cm³ to about 0.912 g/cm³, or from about 0.885 g/cm³ to about 0.910 g/cm³, or from about 0.885 g/cm³ to about 0.906 g/cm³.

In an embodiment of the disclosure, the density of the first ethylene copolymer, d1 is equal to or less than the density of the second ethylene copolymer, d2.

In an embodiment of the disclosure, the density of the first ethylene copolymer, d1 is less than the density of the second ethylene copolymer, d2.

In embodiments of the disclosure, the upper limit on the $CDBI_{50}$ of the first ethylene copolymer may be about 98 weight %, in other cases about 95 wt. % and in still other cases about 90 wt. %. In embodiments of the disclosure, the lower limit on the $CDBI_{50}$ of the first ethylene copolymer may be about 70 weight %, in other cases about 75 wt. % and in still other cases about 80 wt. %.

In embodiments of the disclosure the melt index of the first ethylene copolymer $I_2^1$ may be from about 0.01 dg/min to about 100 dg/min, or from about 0.01 dg/min to about 75 dg/min, or from about 0.1 dg/min to about 100 dg/min, or from about 0.1 dg/min to about 70 dg/min, or from about 0.01 dg/min to about 50 dg/min, or from about 0.1 dg/min to about 50 dg/min, or from about 0.1 dg/min to about 25 dg/min, or from about 0.1 dg/min to about 20 dg/min, or from about 0.1 dg/min to about 15 dg/min, or from about 0.1 to about 10 dg/min, or about 0.1 to about 5 dg/min, or from about 0.1 to 2.5 dg/min, or less than about 5 dg/min, or less than about 3 dg/min, or less than about 1.0 dg/min, or less than about 0.75 dg/min.

In an embodiment of the disclosure, the first ethylene copolymer has a weight average molecular weight, $M_w$ of from about 50,000 to about 300,000, or from about 50,000 to about 250,000, or from about 60,000 to about 250,000, or from about 70,000 to about 250,000, or from about 75,000 to about 200,000, or from about 75,000 to about 175,000; or from about 70,000 to about 175,000, or from about 75,000 to about 150,000.

In an embodiment of the disclosure, the first ethylene copolymer has a weight average molecular weight, $M_w$ which is greater than the weight average molecular weight, $M_w$ of the second ethylene copolymer.

In embodiments of the disclosure, the upper limit on the weight percent (wt. %) of the first ethylene copolymer in the ethylene copolymer composition (i.e. the weight percent of the first ethylene copolymer based on the total weight of the first, the second and the third ethylene copolymer) may be about 80 wt. %, or about 75 wt. %, or about 70 wt. %, or about 65 wt. %, or about 60 wt. %, or about 55 wt. %, or about 50 wt. %, or about 45 wt. %, or about 40 wt. %. In embodiments of the disclosure, the lower limit on the wt. % of the first ethylene copolymer in the ethylene copolymer composition may be about 5 wt. %, or about 10 wt. %, or about 15 wt. %, or about 20 wt. %, or about 25 wt. %, or about 30 wt. %, or in other cases about 35 wt. %.

The Second Ethylene Copolymer

In an embodiment of the disclosure, the second ethylene copolymer is made with a multi-site catalyst system, non-limiting examples of which include Ziegler-Natta catalysts and chromium catalysts, both of which are well known in the art.

In embodiments of the disclosure, alpha-olefins which may be copolymerized with ethylene to make the second ethylene copolymer may be selected from the group including 1-propene, 1-butene, 1-pentene, 1-hexene and 1-octene and mixtures thereof.

In an embodiment of the disclosure, the second ethylene copolymer is a heterogeneously branched ethylene copolymer.

In an embodiment of the disclosure, the second ethylene copolymer is an ethylene/1-octene copolymer.

In an embodiment of the disclosure, the second ethylene copolymer is made with a Ziegler-Natta catalyst system.

Ziegler-Natta catalyst systems are well known to those skilled in the art. A Ziegler-Natta catalyst may be an in-line Ziegler-Natta catalyst system or a batch Ziegler-Natta catalyst system. The term "in-line Ziegler-Natta catalyst system" refers to the continuous synthesis of a small quantity of an active Ziegler-Natta catalyst system and immediately injecting this catalyst into at least one continuously operating reactor, wherein the catalyst polymerizes ethylene and one or more optional α-olefins to form an ethylene polymer. The terms "batch Ziegler-Natta catalyst system" or "batch Ziegler-Natta procatalyst" refer to the synthesis of a much larger quantity of catalyst or procatalyst in one or more mixing vessels that are external to, or isolated from, the continuously operating solution polymerization process. Once prepared, the batch Ziegler-Natta catalyst system, or batch Ziegler-Natta procatalyst, is transferred to a catalyst storage tank. The term "procatalyst" refers to an inactive catalyst system (inactive with respect to ethylene polymerization); the procatalyst is converted into an active catalyst by adding an alkyl aluminum co-catalyst. As needed, the procatalyst is pumped from the storage tank to at least one continuously operating reactor, wherein an active catalyst polymerizes ethylene and one or more optional α-olefins to form a ethylene copolymer. The procatalyst may be converted into an active catalyst in the reactor or external to the reactor, or on route to the reactor.

A wide variety of compounds can be used to synthesize an active Ziegler-Natta catalyst system. The following describes various compounds that may be combined to produce an active Ziegler-Natta catalyst system. Those skilled in the art will understand that the embodiments in this disclosure are not limited to the specific compounds disclosed.

An active Ziegler-Natta catalyst system may be formed from: a magnesium compound, a chloride compound, a metal compound, an alkyl aluminum co-catalyst and an aluminum alkyl. As will be appreciated by those skilled in the art, Ziegler-Natta catalyst systems may contain additional components; a non-limiting example of an additional component is an electron donor, e.g. amines or ethers.

A non-limiting example of an active in-line (or batch) Ziegler-Natta catalyst system can be prepared as follows. In the first step, a solution of a magnesium compound is reacted with a solution of a chloride compound to form a magnesium chloride support suspended in solution. Non-limiting examples of magnesium compounds include $Mg(R^1)_2$; wherein the $R^1$ groups may be the same or different, linear, branched or cyclic hydrocarbyl radicals containing 1 to 10 carbon atoms. Non-limiting examples of chloride compounds include $R^2Cl$; wherein $R^2$ represents a hydrogen atom, or a linear, branched or cyclic hydrocarbyl radical containing 1 to 10 carbon atoms. In the first step, the solution of magnesium compound may also contain an aluminum alkyl. Non-limiting examples of aluminum alkyl include $Al(R^3)_3$, wherein the $R^3$ groups may be the same or different, linear, branched or cyclic hydrocarbyl radicals containing from 1 to 10 carbon atoms. In the second step a solution of the metal compound is added to the solution of magnesium chloride and the metal compound is supported on the magnesium chloride. Non-limiting examples of suitable metal compounds include $M(X)_n$ or $MO(X)_n$; where M represents a metal selected from Group 4 through Group 8 of the Periodic Table, or mixtures of metals selected from Group 4 through Group 8; O represents oxygen, and; X represents chloride or bromide; n is an integer from 3 to 6 that satisfies the oxidation state of the metal. Additional non-limiting examples of suitable metal compounds include Group 4 to Group 8 metal alkyls, metal alkoxides (which may be prepared by reacting a metal alkyl with an alcohol) and mixed-ligand metal compounds that contain a mixture of halide, alkyl and alkoxide ligands. In the third step a solution of an alkyl aluminum co-catalyst is added to the metal compound supported on the magnesium chloride. A wide variety of alkyl aluminum co-catalysts are suitable, as expressed by formula:

$$Al(R^4)_p(OR^9)_q(X)_r$$

wherein the $R^4$ groups may be the same or different, hydrocarbyl groups having from 1 to 10 carbon atoms; the $OR^9$ groups may be the same or different, alkoxy or aryloxy groups wherein $R^9$ is a hydrocarbyl group having from 1 to 10 carbon atoms bonded to oxygen; X is chloride or bromide, and; (p+q+r)=3, with the proviso that p is greater than 0. Non-limiting examples of commonly used alkyl aluminum co-catalysts include trimethyl aluminum, triethyl aluminum, tributyl aluminum, dimethyl aluminum methoxide, diethyl aluminum ethoxide, dibutyl aluminum butoxide, dimethyl aluminum chloride or bromide, diethyl aluminum chloride or bromide, dibutyl aluminum chloride or bromide and ethyl aluminum dichloride or dibromide.

The process described in the paragraph above, to synthesize an active in-line (or batch) Ziegler-Natta catalyst system, can be carried out in a variety of solvents; non-limiting examples of solvents include linear or branched $C_5$ to $C_{12}$ alkanes or mixtures thereof.

In an embodiment of the disclosure, the second ethylene copolymer has a density of from 0.875 to 0.936 g/cm$^3$; a molecular weight distribution, $M_w/M_n$ of from 2.3 to 6.0; and a melt index, $I_2$ of from 0.3 to 100 g/10 min.

In embodiments of the disclosure, the second ethylene copolymer has a molecular weight distribution, $M_w/M_n$ of ≥2.3, or >2.3, or ≥2.5, or >2.5, or ≥2.7, or >2.7, or ≥2.9, or >2.9, or ≥3.0, or 3.0. In embodiments of the disclosure, the second ethylene copolymer has a molecular weight distribution, $M_w/M_n$ of from 2.3 to 6.0, or from 2.3 to 5.5, or from 2.3 to 5.0, or from 2.3 to 4.5, or from 2.3 to 4.0, or from 2.3 to 3.5, or from 2.3 to 3.0, or from 2.5 to 5.0, or from 2.5 to 4.5, or from 2.5 to 4.0, or from 2.5 to 3.5, or from 2.7 to 5.0, or from 2.7 to 4.5, or from 2.7 to 4.0, or from 2.7 to 3.5, or from 2.9 to 5.0, or from 2.9 to 4.5, or from 2.9 to 4.0, or from 2.9 to 3.5.

In an embodiment of the disclosure, the second ethylene copolymer has from 1 to 100 short chain branches per thousand carbon atoms (SCB2). In further embodiments, the second ethylene copolymer has from 1 to 50 short chain branches per thousand carbon atoms (SCB2), or from 1 to 30 short chain branches per thousand carbon atoms (SCB2), or from 1 to 25 short chain branches per thousand carbon atoms (SCB2), or from 3 to 50 short chain branches per thousand carbon atoms (SCB2), or from 5 to 50 short chain branches per thousand carbon atoms (SCB2), or from 3 to 30 short chain branches per thousand carbon atoms (SCB2), or from 5 to 30 short chain branches per thousand carbon atoms (SCB2), or from 3 to 25 short chain branches per thousand carbon atoms (SCB2), or from 5 to 25 short chain branches per thousand carbon atoms (SCB2).

The short chain branching (i.e. the short chain branching per thousand backbone carbon atoms, SCB2), is the branching due to the presence of alpha-olefin comonomer in the ethylene copolymer and will for example have two carbon atoms for a 1-butene comonomer, or four carbon atoms for a 1-hexene comonomer, or six carbon atoms for a 1-octene comonomer, etc.

In embodiments of the disclosure, the upper limit on the density, d2 of the second ethylene copolymer may be about 0.945 g/cm$^3$; in some cases, about 0.941 g/cm$^3$ and; in other cases about 0.936 g/cm$^3$. In embodiments of the disclosure, the lower limit on the density, d2 of the second ethylene copolymer may be about 0.865 g/cm$^3$, in some cases about 0.875 g/cm$^3$, and; in other cases, about 0.885 g/cm$^3$.

In embodiments of the disclosure the density, d2 of the second ethylene copolymer may be from about 0.875 g/cm$^3$ to about 0.945 g/cm$^3$, or from about 0.875 g/cm$^3$ to about 0.941 g/cm$^3$, or from about 0.875 g/cm$^3$ to about 0.936 g/cm$^3$, or from about 0.875 g/cm$^3$ to about 0.931 g/cm$^3$, or from about 0.875 g/cm$^3$ to about 0.929 g/cm$^3$, or from about 0.875 g/cm$^3$ to about 0.926 g/cm$^3$, or from about 0.885 g/cm$^3$ to about 0.945 g/cm$^3$, or from about 0.885 g/cm$^3$ to about 0.941 g/cm$^3$, or from about 0.885 g/cm$^3$ to about 0.936 g/cm$^3$, or from about 0.885 g/cm$^3$ to about 0.931 g/cm$^3$, or from about 0.885 g/cm$^3$ to about 0.929 g/cm$^3$, or from about 0.885 g/cm$^3$ to about 0.926 g/cm$^3$, or from about 0.895 g/cm$^3$ to about 0.945 g/cm$^3$, or from about 0.895 g/cm$^3$ to about 0.941 g/cm$^3$, or from about 0.895 g/cm$^3$ to about 0.936 g/cm$^3$, or from about 0.895 g/cm$^3$ to about 0.931 g/cm$^3$, or from about 0.895 g/cm$^3$ to about 0.929 g/cm$^3$, or from about 0.895 g/cm$^3$ to about 0.926 g/cm$^3$, or from about 0.910 g/cm$^3$ to about 0.945 g/cm$^3$, or from about 0.910 g/cm$^3$ to about 0.941 g/cm$^3$, or from about 0.910 g/cm$^3$ to about 0.936 g/cm$^3$, or from about 0.910 g/cm$^3$ to about 0.931 g/cm$^3$, or from about 0.910 g/cm$^3$ to about 0.929 g/cm$^3$, or from about 0.910 g/cm$^3$ to about 0.926 g/cm$^3$.

In an embodiment of the disclosure, the density of the second ethylene copolymer, d2 is equal to or greater than the density of the first ethylene copolymer, d1.

In an embodiment of the disclosure, the density of the second ethylene copolymer, d2 is greater than the density of the first ethylene copolymer, d1.

In an embodiment of the disclosure, the second ethylene copolymer has a composition distribution breadth index, $CDBI_{50}$ of less than 75 weight % or 70 weight percent or less. In further embodiments of the disclosure, the second ethylene copolymer has a $CDBI_{50}$ of 65 wt. % or less, or 60 wt. % or less, or 55 wt. % or less, or 50 wt. % or less, or 45 wt. % or less.

In embodiments of the disclosure the melt index of the second ethylene copolymer, $I_2^2$ may be from about 0.1 dg/min to about 1,000 dg/min, or from about 0.5 dg/min to about 500 dg/min, or from about 0.5 dg/min to about 100 dg/min, or from about 0.3 dg/min to about 100 dg/min, or from about 1.0 dg/min to about 500 dg/min, or from about 1.0 dg/min to about 75 dg/min, or from about 0.5 dg/min to about 75 dg/min, or from about 0.3 dg/min to about 75 dg/min, or from about 0.5 dg/min to about 50 dg/min, or from about 0.3 dg/min to about 50 dg/min, or from about 0.5 dg/min to about 30 dg/min, or from about 0.3 dg/min to about 30 dg/min, or from about 0.5 dg/min to about 25 dg/min, or from about 0.3 dg/min to about 25 dg/min, or from about 0.1 dg/min to about 25 dg/min, or from about 0.1 dg/min to about 15 dg/min, or from about 0.5 dg/min to about 15 dg/min, or from about 0.3 dg/min to about 15 dg/min, or from about 0.1 dg/min to about 10 dg/min, or from about 0.5 dg/min to about 10 dg/min, or from about 0.3 dg/min to about 10 dg/min, or from about 1.0 dg/min to about 30 dg/min, or from about 1.0 dg/min to about 25 dg/min, from about 1.0 dg/min to about 15 dg/min, or from about 1.0 dg/min to about 10 dg/min.

In an embodiment of the disclosure, the second ethylene copolymer has a weight average molecular weight, $M_w$ of from about 25,000 to about 250,000, or from about 25,000 to about 200,000, or from about 30,000 to about 150,000, or from about 40,000 to about 150,000, or from about 50,000 to about 130,000, or from about 50,000 to about 110,000.

In an embodiment of the disclosure, the weight average molecular weight of the second ethylene copolymer is less than the weight average molecular weight of the first ethylene copolymer.

In embodiments of the disclosure, the upper limit on the weight percent (wt. %) of the second ethylene copolymer in the ethylene copolymer composition (i.e. the weight percent of the second ethylene copolymer based on the total weight of the first, the second and the third ethylene copolymers) may be about 85 wt. %, or about 80 wt. %, or about 70 wt. %, or about 65 wt. %, in other cases about 60 wt. %. In embodiments of the disclosure, the lower limit on the wt % of the second ethylene copolymer in the ethylene copolymer composition may be about 5 wt. %, or about 10 wt. %, or about 15 wt. %, or about 20 wt. %, or about 25 wt. %, or about 30 wt. %, or about 35 wt %, or about 40 wt. %, or about 45 wt. %, or in other cases about 50 wt. %.

In embodiments of the disclosure, the second ethylene copolymer has no long chain branching present or does not have any detectable levels of long chain branching.

The Third Ethylene Copolymer

In an embodiment of the disclosure, the third ethylene copolymer is made with a single site catalyst, non-limiting examples of which include phosphinimine catalysts, metallocene catalysts, and constrained geometry catalysts, all of which are well known in the art.

In an embodiment of the disclosure, the third ethylene copolymer is made with a multi-site catalyst system, non-limiting examples of which include Ziegler-Natta catalysts and chromium catalysts, both of which are well known in the art.

In embodiments of the disclosure, alpha-olefins which may be copolymerized with ethylene to make the third ethylene copolymer may be selected from the group including 1-propene, 1-butene, 1-pentene, 1-hexene and 1-octene and mixtures thereof.

In an embodiment of the disclosure, the third ethylene copolymer is a homogeneously branched ethylene copolymer.

In an embodiment of the disclosure, the third ethylene copolymer is an ethylene/1-octene copolymer.

In an embodiment of the disclosure, the third ethylene copolymer is made with a metallocene catalyst.

In an embodiment of the disclosure, the third ethylene copolymer is made with a Ziegler-Natta catalyst.

In an embodiment of the disclosure, the third ethylene copolymer is a heterogeneously branched ethylene copolymer.

In embodiments of the disclosure, the third ethylene copolymer has no long chain branching present or does not have any detectable levels of long chain branching.

In an embodiment of the disclosure, the third ethylene copolymer will contain long chain branches, hereinafter 'LOB'. LCB is a well-known structural phenomenon in polyethylenes and well known to those of ordinary skill in the art. Traditionally, there are three methods for LCB analysis, namely, nuclear magnetic resonance spectroscopy (NMR), for example see J. C. Randall, J Macromol. Sci., Rev. Macromol. Chem. Phys. 1989, 29, 201; triple detection SEC equipped with a DRI, a viscometer and a low-angle laser light scattering detector, for example see W. W. Yau and D. R. Hill, Int. J. Polym. Anal. Charact. 1996; 2:151; and rheology, for example see W. W. Graessley, Acc. Chem. Res. 1977, 10, 332-339. In this disclosure, a long chain branch is macromolecular in nature, i.e. long enough to be seen in an NMR spectra, triple detector SEC experiments or rheological experiments.

In an embodiment of the disclosure, the third ethylene copolymer contains long chain branching characterized by the LCBF disclosed herein. In embodiments of the disclosure, the upper limit on the LCBF of the third ethylene copolymer may be about 0.5, in other cases about 0.4 and in still other cases about 0.3 (dimensionless). In embodiments of the disclosure, the lower limit on the LCBF of the third ethylene copolymer may be about 0.001, in other cases about 0.0015 and in still other cases about 0.002 (dimensionless).

In embodiments of the disclosure, the upper limit on the molecular weight distribution, $M_w/M_n$ of the third ethylene copolymer may be about 2.8, or about 2.5, or about 2.4, or about 2.3, or about 2.2. In embodiments of the disclosure, the lower limit on the molecular weight distribution, $M_w/M_n$ of the third ethylene copolymer may be about 1.4, or about 1.6, or about 1.7, or about 1.8, or about 1.9.

In embodiments of the disclosure, the third ethylene copolymer has a molecular weight distribution, $M_w/M_n$ of <2.3, or ≤2.3, or <2.1, or ≤2.1, or <2.0, or ≤2.0, or about 2.0.

In embodiments of the disclosure, the first ethylene copolymer has a molecular weight distribution, $M_w/M_n$ of from about 1.7 to about 2.3, or from about 1.8 to about 2.3, or from about 1.8 to 2.2.

In embodiments of the disclosure, the third ethylene copolymer has a molecular weight distribution, $M_w/M_n$ of ≥2.3, or >2.3, or ≥2.5, or >2.5, or ≥2.7, or >2.7, or ≥2.9, or >2.9, or ≥3.0, or 3.0. In embodiments of the disclosure, the third ethylene copolymer has a molecular weight distribution, $M_w/M_n$ of from 2.3 to 6.5, or from 2.3 to 6.0, or from 2.3 to 5.5, or from 2.3 to 5.0, or from 2.3 to 4.5, or from 2.3 to 4.0, or from 2.3 to 3.5, or from 2.3 to 3.0, or from 2.5 to 5.0, or from 2.5 to 4.5, or from 2.5 to 4.0, or from 2.5 to 3.5, or from 2.7 to 5.0, or from 2.7 to 4.5, or from 2.7 to 4.0, or from 2.7 to 3.5, or from 2.9 to 5.0, or from 2.9 to 4.5, or from 2.9 to 4.0, or from 2.9 to 3.5.

In embodiments of the disclosure, the third ethylene copolymer has a molecular weight distribution, $M_w/M_n$ of from 2.0 to 6.5, or from 2.3 to 6.5, or from 2.3 to 6.0, or from 2.0 to 6.0.

In embodiments of the disclosure, the upper limit on the density, d3 of the third ethylene copolymer may be about 0.975 g/cm$^3$; in some cases about 0.965 g/cm$^3$ and; in other cases about 0.955 g/cm$^3$, in yet other cases about 0.945 g/cm$^3$ In embodiments of the disclosure, the lower limit on the density, d3 of the third ethylene copolymer may be about 0.855 g/cm$^3$, in some cases about 0.865 g/cm$^3$, and; in other cases about 0.875 g/cm$^3$.

In embodiments of the disclosure the density, d3 of the third ethylene copolymer may be from about 0.875 g/cm$^3$ to about 0.965 g/cm$^3$, or from about 0.875 g/cm$^3$ to about 0.960 g/cm$^3$, or from about 0.875 g/cm$^3$ to 0.950 g/cm$^3$, from about 0.865 g/cm$^3$ to about 0.945 g/cm$^3$, or from about 0.865 g/cm$^3$ to about 0.940 g/cm$^3$, or from about 0.865 g/cm$^3$ to about 0.936 g/cm$^3$, or from about 0.865 g/cm$^3$ to about 0.932 g/cm$^3$, or from about 0.865 g/cm$^3$ to about 0.926 g/cm$^3$, or from about 0.865 g/cm$^3$ to about 0.921 g/cm$^3$, or from about 0.865 g/cm$^3$ to about 0.918 g/cm$^3$, or from about 0.875 g/cm$^3$ to about 0.916 g/cm$^3$, or from about 0.875 g/cm$^3$ to about 0.916 g/cm$^3$, or from about 0.865 g/cm$^3$ to about 0.912 g/cm$^3$, or from about 0.880 g/cm$^3$ to about 0.912 g/cm$^3$, or from about 0.890 g/cm$^3$ to about 0.916 g/cm$^3$, or from about 0.900 g/cm$^3$ to about 0.916 g/cm$^3$, or from about 0.880 g/cm$^3$ to about 0.916 g/cm$^3$, or from about 0.880 g/cm$^3$ to about 0.918 g/cm$^3$, or from about 0.880 g/cm$^3$ to about 0.921 g/cm$^3$, or from about 0.880 g/cm$^3$ to about 0.926 g/cm$^3$, or from about 0.880 g/cm$^3$ to about 0.932 g/cm$^3$, or from about 0.880 g/cm$^3$ to about 0.936 g/cm$^3$.

In embodiments of the disclosure, the upper limit on the CDBI$_{50}$ of the third ethylene copolymer may be about 98 weight %, in other cases about 95 wt. % and in still other cases about 90 wt. %. In embodiments of the disclosure, the lower limit on the CDBI$_{50}$ of the third ethylene copolymer may be about 70 weight %, in other cases about 75 wt. % and in still other cases about 80 wt. %.

In an embodiment of the disclosure, the third ethylene copolymer is an ethylene copolymer which has a composition distribution breadth index, CDBI$_{50}$ of less than 75 wt. %, or 70 wt. % or less. In further embodiments of the disclosure, the third ethylene copolymer is an ethylene copolymer which has a CDBI$_{50}$ of 65 wt. % or less, or 60 wt. % or less, or 55 wt. % or less, or 50 wt. % or less, or 45 wt. % or less.

In embodiments of the disclosure, the melt index of the third ethylene copolymer $I_2^3$ may be from about 0.01 dg/min to about 1000 dg/min, or from about 0.01 dg/min to about 500 dg/min, or from about 0.01 dg/min to about 100 dg/min, or from about 0.01 dg/min to about 50 dg/min, or from about 0.01 dg/min to about 25 dg/min, or from about 0.01 dg/min to about 10 dg/min, or from about 0.01 dg/min to about 5 dg/min, or from about 0.01 dg/min to about 3 dg/min, or from about 0.01 dg/min to about 1 dg/min, or less than about 5 dg/min, or less than about 3 dg/min, or less than about 1.0 dg/min, or less than about 0.75 dg/min, or less than about 0.50 dg/min.

In embodiments of the disclosure, the melt index of the third ethylene copolymer $I_2^3$ may be from about 0.1 dg/min to about 1000 dg/min, or from about 0.2 dg/min to about 500 dg/min, or from about 0.3 dg/min to about 200 dg/min.

In an embodiment of the disclosure, the third ethylene copolymer has a weight average molecular weight, $M_w$, of from about 50,000 to about 300,000, or from about 50,000 to about 250,000, or from about 60,000 to about 250,000, or from about 70,000 to about 250,000, or from about 75,000 to about 200,000, or from about 80,000 to about 275,000; or from about 80,000 to about 250,000, or from about 80,000 to about 200,000, or from about 80,000 to about 175,000.

In embodiments of the disclosure, the upper limit on the weight percent (wt %) of the third ethylene copolymer in the ethylene copolymer composition (i.e. the weight percent of the third ethylene copolymer based on the total weight of the first, the second and the third ethylene copolymer) may be about 60 wt. %, or about 55 wt. %, or 50 wt. %, in other cases about 45 wt. %, in other cases about 40 wt. %, or about 35 wt. %, or about 30 wt. %, or about 25 wt. %, or about 20 wt. %. In embodiments of the disclosure, the lower limit on the wt. % of the third ethylene copolymer in the final ethylene copolymer composition may be 0 wt. %, or about 1 wt. %, or about 3 wt. %, or about 5 wt. %, or about 10 wt. %, or about 15 wt. %.

The Ethylene Copolymer Composition

The polyethylene compositions disclosed herein can be made using any well-known techniques in the art, including but not limited to melt blending, solution blending, or in-reactor blending to bring together a first ethylene copolymer, a second ethylene copolymer and optionally a third ethylene copolymer.

In an embodiment, the ethylene copolymer composition of the present disclosure is made using a single site catalyst in a first reactor to give a first ethylene copolymer, and a multi-site catalyst is used in a second reactor to give a second ethylene copolymer.

In an embodiment, the ethylene copolymer composition of the present disclosure is made using a single site catalyst in a first reactor to give a first ethylene copolymer, a multi-site catalyst is used in a second reactor to give a second ethylene copolymer, and a multi-site catalyst is used in a third reactor to give a third ethylene copolymer.

In an embodiment, the ethylene copolymer composition of the present disclosure is made using a single site catalyst in a first reactor to give a first ethylene copolymer, a multi-site catalyst is used in a second reactor to give a second ethylene copolymer, and a single site catalyst is used in a third reactor to give a third ethylene copolymer.

In an embodiment, the ethylene copolymer composition of the present disclosure is made by forming a first ethylene copolymer in a first reactor by polymerizing ethylene and an alpha olefin with a single site catalyst; and forming a second ethylene copolymer in a second reactor by polymerizing ethylene and an alpha olefin with a multi-site catalyst.

In an embodiment, the ethylene copolymer composition of the present disclosure is made by forming a first ethylene copolymer in a first reactor by polymerizing ethylene and an alpha olefin with a single site catalyst; forming a second ethylene copolymer in a second reactor by polymerizing ethylene and an alpha olefin with a multi-site catalyst, and forming a third ethylene copolymer in a third reactor by polymerizing ethylene and an alpha olefin with a multi-site catalyst.

In an embodiment, the ethylene copolymer composition of the present disclosure is made by forming a first ethylene copolymer in a first reactor by polymerizing ethylene and an alpha olefin with a single site catalyst; forming a second ethylene copolymer in a second reactor by polymerizing ethylene and an alpha olefin with a multi-site catalyst, and forming a third ethylene copolymer in a third reactor by polymerizing ethylene and an alpha olefin with a single site catalyst.

In an embodiment, the ethylene copolymer composition of the present disclosure is made by forming a first ethylene copolymer in a first solution phase polymerization reactor by polymerizing ethylene and an alpha olefin with a single site catalyst; and forming a second ethylene copolymer in a second solution phase polymerization reactor by polymerizing ethylene and an alpha olefin with a multi-site catalyst.

In an embodiment, the ethylene copolymer composition of the present disclosure is made by forming a first ethylene copolymer in a first solution phase polymerization reactor by polymerizing ethylene and an alpha olefin with a single site catalyst; forming a second ethylene copolymer in a second solution phase polymerization reactor by polymerizing ethylene and an alpha olefin with a multi-site catalyst, and forming a third ethylene copolymer in a third solution phase polymerization reactor by polymerizing ethylene and an alpha olefin with a multi-site catalyst.

In an embodiment, the ethylene copolymer composition of the present disclosure is made by forming a first ethylene copolymer in a first solution phase polymerization reactor by polymerizing ethylene and an alpha olefin with a single site catalyst; forming a second ethylene copolymer in a second solution phase polymerization reactor by polymerizing ethylene and an alpha olefin with a multi-site catalyst, and forming a third ethylene copolymer in a third solution phase polymerization reactor by polymerizing ethylene and an alpha olefin with a single site catalyst.

In an embodiment, the ethylene copolymer composition of the present disclosure is made by forming a first ethylene copolymer in a first solution phase polymerization reactor by polymerizing ethylene and an alpha olefin with a single site catalyst; and forming a second ethylene copolymer in a second solution phase polymerization reactor by polymerizing ethylene and an alpha olefin with a multi-site catalyst, where the first and second solution phase polymerization reactors are configured in series with one another.

In an embodiment, the ethylene copolymer composition of the present disclosure is made by forming a first ethylene copolymer in a first solution phase polymerization reactor by polymerizing ethylene and an alpha olefin with a single site catalyst; and forming a second ethylene copolymer in a second solution phase polymerization reactor by polymerizing ethylene and an alpha olefin with a multi-site catalyst, where the first and second solution phase polymerization reactors are configured in parallel with one another.

In an embodiment, the ethylene copolymer composition of the present disclosure is made by forming a first ethylene copolymer in a first solution phase polymerization reactor by polymerizing ethylene and an alpha olefin with a single site catalyst; forming a second ethylene copolymer in a second solution phase polymerization reactor by polymerizing ethylene and an alpha olefin with a multi-site catalyst, and forming a third ethylene copolymer in a third solution phase polymerization reactor by polymerizing ethylene and an alpha olefin with a multi-site catalyst, where the first and second solution phase polymerization reactors are configured in series with one another.

In an embodiment, the ethylene copolymer composition of the present disclosure is made by forming a first ethylene copolymer in a first solution phase polymerization reactor by polymerizing ethylene and an alpha olefin with a single site catalyst; forming a second ethylene copolymer in a second solution phase polymerization reactor by polymerizing ethylene and an alpha olefin with a multi-site catalyst, and forming a third ethylene copolymer in a third solution phase polymerization reactor by polymerizing ethylene and an alpha olefin with a multi-site catalyst, where at least the first and second solution phase polymerization reactors are configured in series with one another.

In an embodiment, the ethylene copolymer composition of the present disclosure is made by forming a first ethylene copolymer in a first solution phase polymerization reactor by polymerizing ethylene and an alpha olefin with a single site catalyst; forming a second ethylene copolymer in a second solution phase polymerization reactor by polymerizing ethylene and an alpha olefin with a multi-site catalyst, and forming a third ethylene copolymer in a third solution phase polymerization reactor by polymerizing ethylene and an alpha olefin with a multi-site catalyst, where the first, second and third solution phase polymerization reactors are configured in series with one another.

In an embodiment, the ethylene copolymer composition of the present disclosure is made by forming a first ethylene copolymer in a first solution phase polymerization reactor by polymerizing ethylene and an alpha olefin with a single site catalyst; forming a second ethylene copolymer in a second solution phase polymerization reactor by polymerizing ethylene and an alpha olefin with a multi-site catalyst, and forming a third ethylene copolymer in a third solution phase polymerization reactor by polymerizing ethylene and an alpha olefin with a multi-site catalyst, where each of the first, second and third solution phase polymerization reactors are configured in parallel to one another.

In an embodiment, the ethylene copolymer composition of the present disclosure is made by forming a first ethylene copolymer in a first solution phase polymerization reactor by polymerizing ethylene and an alpha olefin with a single site catalyst; forming a second ethylene copolymer in a second solution phase polymerization reactor by polymerizing ethylene and an alpha olefin with a multi-site catalyst, and forming a third ethylene copolymer in a third solution phase polymerization reactor by polymerizing ethylene and an alpha olefin with a multi-site catalyst, where the first and second solution phase reactors are configured in series to one another, and the third solution phase reactor is configured in parallel to the first and second reactors.

In an embodiment, the ethylene copolymer composition of the present disclosure is made by forming a first ethylene copolymer in a first solution phase polymerization reactor by polymerizing ethylene and an alpha olefin with a single site catalyst; forming a second ethylene copolymer in a second solution phase polymerization reactor by polymerizing ethylene and an alpha olefin with a multi-site catalyst, and forming a third ethylene copolymer in a third solution phase polymerization reactor by polymerizing ethylene and an alpha olefin with a single site catalyst, where at least the first and second solution phase polymerization reactors are configured in series with one another.

In an embodiment, the ethylene copolymer composition of the present disclosure is made by forming a first ethylene copolymer in a first solution phase polymerization reactor by polymerizing ethylene and an alpha olefin with a single site catalyst; forming a second ethylene copolymer in a second solution phase polymerization reactor by polymerizing ethylene and an alpha olefin with a multi-site catalyst, and forming a third ethylene copolymer in a third solution phase polymerization reactor by polymerizing ethylene and an alpha olefin with a single site catalyst, where the first, second and third solution phase polymerization reactors are configured in series with one another.

In an embodiment, the ethylene copolymer composition of the present disclosure is made by forming a first ethylene copolymer in a first solution phase polymerization reactor by polymerizing ethylene and an alpha olefin with a single site catalyst; forming a second ethylene copolymer in a second solution phase polymerization reactor by polymerizing ethylene and an alpha olefin with a multi-site catalyst, and forming a third ethylene copolymer in a third solution phase polymerization reactor by polymerizing ethylene and an alpha olefin with a single site catalyst, where each of the first, second and third solution phase polymerization reactors are configured in parallel to one another.

In an embodiment, the ethylene copolymer composition of the present disclosure is made by forming a first ethylene copolymer in a first solution phase polymerization reactor by polymerizing ethylene and an alpha olefin with a single site catalyst; forming a second ethylene copolymer in a second solution phase polymerization reactor by polymerizing ethylene and an alpha olefin with a multi-site catalyst, and forming a third ethylene copolymer in a third solution phase polymerization reactor by polymerizing ethylene and an alpha olefin with a single site catalyst, where the first and second solution phase reactors are configured in series to one another, and the third solution phase reactor is configured in parallel to the first and second reactors.

In an embodiment, the solution phase polymerization reactor used as a first solution phase reactor, a second solution phase reactor, or a third solution phase reactor is a continuously stirred tank reactor or a tubular reactor.

In an embodiment, the solution phase polymerization reactor used as a first solution phase reactor, a second solution phase reactor, or a third solution phase reactor is a continuously stirred tank reactor.

In an embodiment, the solution phase polymerization reactor used as a first solution phase reactor, a second solution phase reactor, or a third solution phase reactor is a tubular reactor.

In an embodiment, the solution phase polymerization reactor used as a first solution phase reactor and a second solution phase reactor is a continuously stirred tank reactor, and the solution phase polymerization reactor used as a third solution phase reactor is a tubular reactor.

In solution polymerization, the monomers are dissolved/dispersed in the solvent either prior to being fed to the reactor (or for gaseous monomers the monomer may be fed to the reactor so that it will dissolve in the reaction mixture). Prior to mixing, the solvent and monomers are generally purified to remove potential catalyst poisons such as water, oxygen or metal impurities. The feedstock purification follows standard practices in the art, e.g. molecular sieves, alumina beds and oxygen removal catalysts are used for the purification of monomers. The solvent itself as well (e.g. methyl pentane, cyclohexane, hexane or toluene) is preferably treated in a similar manner.

The feedstock may be heated or cooled prior to feeding to the reactor.

Generally, the catalyst components may be premixed in the solvent for the reaction or fed as separate streams to the reactor. In some instances premixing it may be desirable to provide a reaction time for the catalyst components prior to entering the reaction. Such an "in line mixing" technique is described in a number of patents in the name of DuPont Canada Inc. (e.g. U.S. Pat. No. 5,589,555 issued Dec. 31, 1996).

Solution polymerization processes for the polymerization or copolymerization of ethylene are well known in the art (see for example U.S. Pat. Nos. 6,372,864 and 6,777,509). These processes are conducted in the presence of an inert hydrocarbon solvent. In a solution phase polymerization reactor, a variety of solvents may be used as the process solvent; non-limiting examples include linear, branched or cyclic $C_5$ to $C_{12}$ alkanes. Non-limiting examples of α-olefins include 1-propene, 1-butene, 1-pentene, 1-hexene and 1-octene. Suitable catalyst component solvents include aliphatic and aromatic hydrocarbons. Non-limiting examples of aliphatic catalyst component solvents include linear, branched or cyclic $C_{5-12}$ aliphatic hydrocarbons, e.g. pentane, methyl pentane, hexane, heptane, octane, cyclohexane, cyclopentane, methylcyclohexane, hydrogenated naphtha or combinations thereof. Non-limiting examples of aromatic catalyst component solvents include benzene, toluene (methylbenzene), ethylbenzene, o-xylene (1,2-dimethylbenzene), m-xylene (1,3-dimethylbenzene), p-xylene (1,4-dimethylbenzene), mixtures of xylene isomers, hemellitene (1,2,3-trimethylbenzene), pseudocumene (1,2,4-trimethylbenzene), mesitylene (1,3,5-trimethylbenzene), mixtures of trimethylbenzene isomers, prehenitene (1,2,3,4-tetramethylbenzene), durene (1,2,3,5-tetramethylbenzene), mixtures of tetramethylbenzene isomers, pentamethylbenzene, hexamethylbenzene and combinations thereof.

The polymerization temperature in a conventional solution process may be from about 80° C. to about 300° C. In an embodiment of the disclosure the polymerization temperature in a solution process is from about 120° C. to about 250° C. The polymerization pressure in a solution process may be a "medium pressure process", meaning that the pressure in the reactor is less than about 6,000 psi (about 42,000 kiloPascals or kPa). In an embodiment of the disclosure, the polymerization pressure in a solution process may be from about 10,000 to about 40,000 kPa, or from about 14,000 to about 22,000 kPa (i.e. from about 2,000 psi to about 3,000 psi).

Suitable monomers for copolymerization with ethylene include $C_{3-20}$ mono- and di-olefins. Preferred comonomers include $C_{3-12}$ alpha olefins which are unsubstituted or substituted by up to two $C_{1-6}$ alkyl radicals, $C_{8-12}$ vinyl aromatic monomers which are unsubstituted or substituted by up to two substituents chosen from $C_{1-4}$ alkyl radicals, $C_{4-12}$ straight chained or cyclic diolefins which are unsubstituted or substituted by a $C_{1-4}$ alkyl radical. Illustrative non-limiting examples of such alpha-olefins are one or more of propylene, 1-butene, 1-pentene, 1-hexene, 1-octene and 1-decene, styrene, alpha methyl styrene, and the constrained-ring cyclic olefins such as cyclobutene, cyclopentene, dicyclopentadiene norbornene, alkyl-substituted norbornenes, alkenyl-substituted norbornenes and the like (e.g. 5-methylene-2-norbornene and 5-ethylidene-2-norbornene, bicyclo-(2,2,1)-hepta-2,5-diene).

In an embodiment of the disclosure, the ethylene copolymer composition has at least 1 mole percent of one or more than one alpha olefin.

In an embodiment of the disclosure, the ethylene copolymer composition has at least 3 mole percent of one or more than one alpha olefin.

In an embodiment of the disclosure, the ethylene copolymer composition has from about 1 to about 10 mole percent of one or more than one alpha-olefin.

In an embodiment of the disclosure, the ethylene copolymer composition has from about 3 to about 10 mole percent of one or more than one alpha-olefin.

In an embodiment of the disclosure, the ethylene copolymer composition has from about 3 to about 8 mole percent of one or more than one alpha olefin.

In an embodiment of the disclosure, the ethylene copolymer includes ethylene and one or more than one alpha olefin selected from the group including 1-butene, 1-hexene, 1-octene and mixtures thereof.

In an embodiment of the disclosure, the ethylene copolymer includes ethylene and one or more than one alpha olefin selected from the group including 1-hexene, 1-octene and mixtures thereof.

In an embodiment of the disclosure, the ethylene copolymer includes ethylene and 1-octene.

In an embodiment of the disclosure, the ethylene copolymer includes ethylene and at least 1 mole percent 1-octene.

In an embodiment of the disclosure, the ethylene copolymer includes ethylene and from 1 to 10 mole percent of 1-octene.

In an embodiment of the disclosure, the ethylene copolymer includes ethylene and from 3 to 8 mole percent of 1-octene.

In embodiments of the disclosure, the ethylene copolymer composition has a density which may be from about 0.855 g/cm$^3$ to about 0.914 g/cm$^3$, or from about 0.865 g/cm$^3$ to about 0.913 g/cm$^3$, or from about 0.865 g/cm$^3$ to 0.912 g/cm$^3$, or from about 0.875 g/cm$^3$ to about 0.913 g/cm$^3$, or from about 0.875 g/cm$^3$ to about 0.912 g/cm$^3$, or from about 0.865 g/cm$^3$ to about 0.910 g/cm$^3$, or from about 0.865 g/cm$^3$ to about 0.910 g/cm$^3$, or from about 0.875 g/cm$^3$ to about 0.910 g/cm$^3$, or from about 0.885 g/cm$^3$ to about 0.913 g/cm$^3$, or from about 0.885 g/cm$^3$ to about 0.912 g/cm$^3$, or from about 0.885 g/cm$^3$ to about 0.910 g/cm$^3$, or from about 0.895 g/cm$^3$ to about 0.913 g/cm$^3$, or from about 0.895 g/cm$^3$ to about 0.912 g/cm$^3$, or from about 0.895 g/cm$^3$ to about 0.910 g/cm$^3$, or from about 0.895 g/cm$^3$ to about 0.913 g/cm$^3$.

In embodiments of the disclosure, the melt index, $I_2$ of the ethylene copolymer composition may be from about 0.01 dg/min to about 1000 dg/min, or from about 0.01 dg/min to about 500 dg/min, or from about 0.01 dg/min to about 100 dg/min, or from about 0.01 dg/min to about 50 dg/min, or from about 0.01 dg/min to about 25 dg/min, or from about 0.01 dg/min to about 10 dg/min, or from about 0.01 dg/min to about 5 dg/min, or from about 0.01 dg/min to about 3 dg/min, or from about 0.01 dg/min to about 1 dg/min, or from about 0.1 dg/min to about 10 dg/min, or from about 0.1 dg/min to about 5 dg/min, or from about 0.1 dg/min to about 3 dg/min, or from about 0.1 dg/min to about 2 dg/min, or from about 0.1 dg/min to about 1.5 dg/min, or from about 0.1 dg/min to about 1 dg/min, or from about 0.5 dg/min to about 100 dg/min, or from about 0.5 dg/min to about 50 dg/min, or from about 0.5 dg/min to about 25 dg/min, or from about 0.5 dg/min to about 10 dg/min, or from about 0.5 dg/min to about 5 dg/min, or less than about 5 dg/min, or less than about 3 dg/min, or less than about 1.0 dg/min.

In embodiments of the disclosure, the high load melt index, I21 of the ethylene copolymer composition may be from about 10 dg/min to about 10,000 dg/min, or from about 10 dg/min to about 1000 dg/min, or from about 10 dg/min to about 500 dg/min, or from about 10 dg/min to about 250 dg/min, or from about 10 dg/min to about 150 dg/min, or from about 10 dg/min to about 100 dg/min.

In embodiments of the disclosure, the melt flow ratio I21/I2 of the ethylene copolymer composition may be from about 15 to about 1,000, or from about 15 to about 100, or from about 15 to about 75, or from about 15 to about 50, or from about 15 to about 40, or from about 18 to about 50, or from about 20 to about 75, or from about 20 to about 50, or from about 20 to about 45, or from about 20 to about 40, or from about 20 to about 38, or from about 20 to about 35, or less than about 45, or less than about 40, or less than about 35, or less than about 30.

In embodiments of the disclosure, the ethylene copolymer composition has a weight average molecular weight, $M_w$ of from about 40,000 to about 300,000, or from about 40,000 to about 250,000, or from about 50,000 to about 250,000, or from about 50,000 to about 225,000, or from about 50,000 to about 200,000, or from about 50,000 to about 175,000, or from about 50,000 to about 150,000, or from about 50,000 to about 125,000.

In embodiments of the disclosure, the ethylene copolymer composition has a lower limit molecular weight distribution, $M_w/M_n$ of 2.0, or 2.1, or 2.2, or 2.3. In embodiments of the disclosure, the polyethylene composition has an upper limit molecular weight distribution, $M_w/M_n$ of 6.0, or 5.5, or 5.0, or 4.5, or 4.0, or 3.75, or 3.5.

In embodiments of the disclosure, the ethylene copolymer composition has a molecular weight distribution, $M_w/M_n$ of from 2.1 to 6.0, or from 2.1 to 5.5, or from 2.1 to 5.0, or from 2.1 to 4.5, or from 2.1 to 4.0, or from 2.1 to 3.5, or from 2.1 to 3.0, or from 2.2 to 5.5, or from 2.2 to 5.0, or from 2.2 to 4.5, or from 2.2 to 4.0, or from 2.2 to 3.5, or from 2.2 to 3.0.

In embodiments of the disclosure, the ethylene copolymer composition has a Z-average molecular weight distribution, $M_Z/M_W$ of ≤4.0, or <4.0, or ≤3.5, or <3.5, or ≤3.0, or <3.0, or ≤2.75, or <2.75, or ≤2.50, or <2.50. In embodiments of the disclosure, the polyethylene composition has a Z-average molecular weight distribution, $M_Z/M_W$ of from 1.5 to 4.0, or from 1.75 to 3.5, or from 1.75 to 3.0, or from 2.0 to 4.0, or from 2.0 to 3.5, or from 2.0 to 3.0, or from 2.0 to 2.75.

In an embodiment of the disclosure, the ethylene copolymer composition has a unimodal profile in a gel permeation chromatograph generated according to the method of ASTM D6474-99. The term "unimodal" is herein defined to mean there will be only one significant peak or maximum evident in the GPC-curve. A unimodal profile includes a broad unimodal profile. In contrast, the use of the term "bimodal" is meant to convey that in addition to a first peak, there will be a secondary peak or shoulder which represents a higher or lower molecular weight component (i.e. the molecular weight distribution, can be said to have two maxima in a molecular weight distribution curve). Alternatively, the term "bimodal" connotes the presence of two maxima in a molecular weight distribution curve generated according to the method of ASTM D6474-99. The term "multi-modal" denotes the presence of two or more, typically more than two, maxima in a molecular weight distribution curve generated according to the method of ASTM D6474-99.

In an embodiment of the disclosure, the ethylene copolymer composition will have a reverse or partially reverse comonomer distribution profile as measured using GPC-FTIR. If the comonomer incorporation decreases with molecular weight, as measured using GPC-FTIR, the distribution is described as "normal". If the comonomer incorporation is approximately constant with molecular weight, as measured using GPC-FTIR, the comonomer distribution is described as "flat" or "uniform". The terms "reverse comonomer distribution" and "partially reverse comonomer distribution" mean that in the GPC-FTIR data obtained for a copolymer, there is one or more higher molecular weight components having a higher comonomer incorporation than in one or more lower molecular weight components. The term "reverse(d) comonomer distribution" is used herein to mean, that across the molecular weight range of an ethylene copolymer, comonomer contents for the various polymer fractions are not substantially uniform and the higher molecular weight fractions thereof have proportionally higher comonomer contents (i.e. if the comonomer incorporation rises with molecular weight, the distribution is described as "reverse" or "reversed"). Where the comonomer incorporation rises with increasing molecular weight and then declines, the comonomer distribution is still considered "reverse", but may also be described as "partially reverse". A partially reverse comonomer distribution will exhibit a peak or maximum.

In an embodiment of the disclosure, the ethylene copolymer composition has a reversed comonomer distribution profile as measured using GPC-FTIR.

In an embodiment of the disclosure, the ethylene copolymer composition has a partially reversed comonomer distribution profile as measured using GPC-FTIR.

In an embodiment of the disclosure, the ethylene copolymer composition has a fraction eluting at from 90 to 105° C., having an integrated area of greater than 3.0 weight percent, in a temperature rising elution fractionation (TREF) analysis as obtained using a CTREF instrument (a "CRYSTAF/Temperature Rising Elution Fractionation instrument). In an embodiment of the disclosure, the ethylene copolymer composition has a fraction eluting at from 90 to 105° C., having an integrated area of greater than 3.5 weight percent, in a temperature rising elution fractionation (TREF) analysis as obtained using a CTREF instrument (a "CRYSTAF/Temperature Rising Elution Fractionation instrument). In an embodiment of the disclosure, the ethylene copolymer composition has a fraction eluting at from 90 to 105° C., having an integrated area of greater than 4.0 weight percent, in a temperature rising elution fractionation (TREF) analysis as obtained using a CTREF instrument (a "CRYSTAF/Temperature Rising Elution Fractionation instrument). In an embodiment of the disclosure, the ethylene copolymer composition has a fraction eluting at from 90 to 105° C., having an integrated area of greater than 4.5 weight percent, in a temperature rising elution fractionation (TREF) analysis as obtained using a CTREF instrument (a "CRYSTAF/Temperature Rising Elution Fractionation instrument). In an embodiment of the disclosure, the ethylene copolymer composition has a fraction eluting at from 90 to 105° C., having an integrated area of greater than 5.0 weight percent, in a temperature rising elution fractionation (TREF) analysis as obtained using a CTREF instrument (a "CRYSTAF/Temperature Rising Elution Fractionation instrument).

In embodiments of the disclosure, the ethylene copolymer composition has a $CDBI_{50}$ of from about 50 to 85 weight %, or from about 60 to 85 wt %, or from about 60 to about 80 wt. %, or from about 60 to about 75 wt. %, or from about 50 to about 80 wt. %, or from about 50 to about 75 wt. %, or from about 55 to about 80 wt. %, or from about 55 to about 75 wt. %.

In embodiments of the disclosure, the upper limit on the parts per million (ppm) of hafnium in the ethylene copolymer composition may be about 3.0 ppm, or about 2.5 ppm, or about 2.0 ppm, or about 1.5 ppm, or about 1.0 ppm, or about 0.75 ppm, or about 0.5 ppm. In embodiments of the disclosure, the lower limit on the parts per million (ppm) of hafnium in the ethylene copolymer composition may be about 0.0015 ppm, or about 0.0050 ppm, or about 0.0075 ppm, or about 0.010 ppm, or about 0.015 ppm, or about 0.030 ppm, or about 0.050 ppm, or about 0.075 ppm, or about 0.100 ppm, or about 0.150 ppm, or about 0.175 ppm, or about 0.200 ppm.

In embodiments of the disclosure, the ethylene copolymer composition has from 0.0015 to 2.5 ppm of hafnium, or from 0.0050 to 2.5 ppm of hafnium, or from 0.0075 to 2.5 ppm of hafnium, or from 0.010 to 2.5 ppm of hafnium, or from 0.015 to 2.5 ppm of hafnium, or from 0.050 to 3.0 ppm of hafnium, or from 0.050 to 2.5 ppm, or from 0.075 to 2.5 ppm of hafnium, or from 0.075 to 2.0 ppm of hafnium, or from 0.075 to 1.5 ppm of hafnium, or from 0.075 to 1.0 ppm of hafnium, or from 0.075 to 0.5 ppm of hafnium, or from 0.100 to 2.0 ppm of hafnium, or from 0.100 to 1.5 ppm of hafnium, or from 0.100 to 1.0 ppm of hafnium, or from 0.100 to 0.75 ppm of hafnium, or from 0.10 to 0.5 ppm of hafnium, or from 0.15 to 0.5 ppm of hafnium, or from 0.20 to 0.5 ppm of hafnium.

In embodiments of the disclosure, the ethylene copolymer composition has at least 0.0015 ppm of hafnium, or at least 0.005 ppm of hafnium, or at least 0.0075 ppm of hafnium, or at least 0.015 ppm of hafnium, or at least 0.030 ppm of hafnium, or at least 0.050 ppm of hafnium, or at least 0.075 ppm of hafnium, or at least 0.100 ppm of hafnium, or at least 0.125 ppm of hafnium, or at least 0.150 ppm of hafnium, or at least 0.175 ppm of hafnium, or at least 0.200 ppm of hafnium.

In embodiments of the disclosure, the upper limit on the parts per million (ppm) of titanium in the ethylene copolymer composition may be about 18.0 ppm, or about 16.0 ppm, or about 14.0 ppm, or about 12.0 ppm, or about 10.0 ppm, or about 8.0 ppm. In embodiments of the disclosure, the lower limit on the parts per million (ppm) of titanium in the ethylene copolymer composition may be about 0.1 ppm, 0.5 ppm, or about 1.0 ppm, or about 2.0 ppm, or about 3.0 ppm.

In embodiments of the disclosure, the ethylene copolymer composition has from 0.5 to 20.0 ppm of titanium, or from 0.5 to 18.0 ppm of titanium, or from 0.5 to 14.0 ppm of titanium, or from 1.0 to 18.0 ppm of titanium, or from 1.0 to 16.0 ppm of titanium, or from 1.0 to 14.0 ppm of titanium, or from 2.0 to 18.0 ppm of titanium, or from 2.0 to 16.0 ppm of titanium, or from 2.0 to 14.0, or from 3.0 to 18.0 ppm of titanium, or from 3.0 to 16.0 ppm of titanium, or from 3.0 to 14.0 ppm of titanium.

In an embodiment of the disclosure, the ethylene copolymer composition has a stress exponent, defined as $Log_{10}[I_6/I_2]/Log_{10}[6.48/2.16]$, which is 1.40. In further embodiments of the disclosure the ethylene copolymer composition has a stress exponent, $Log_{10}[I_6/I_2]/Log_{10}[6.48/2.16]$ of less than 1.38, or less than 1.35, or less than 1.33, or less than 1.30.

In an embodiment of the disclosure, the ethylene copolymer composition has a dimensionless long chain branching factor, LCBF of 0.001.

The ethylene copolymer composition disclosed herein may be converted into flexible manufactured articles such as monolayer or multilayer films. Such films are well known to those experienced in the art; non-limiting examples of processes to prepare such films include blown film and cast film processes.

In the blown film extrusion process an extruder heats, melts, mixes and conveys a thermoplastic, or a thermoplastic blend. Once molten, the thermoplastic is forced through an annular die to produce a thermoplastic tube. In the case of co-extrusion, multiple extruders are employed to produce a multilayer thermoplastic tube. The temperature of the extrusion process is primarily determined by the thermoplastic or thermoplastic blend being processed, for example the melting temperature or glass transition temperature of the thermoplastic and the desired viscosity of the melt. In the case of polyolefins, typical extrusion temperatures are from 330° F. to 550° F. (166° C. to 288° C.). Upon exit from the annular die, the thermoplastic tube is inflated with air, cooled, solidified and pulled through a pair of nip rollers. Due to air inflation, the tube increases in diameter forming a bubble of desired size. Due to the pulling action of the nip rollers the bubble is stretched in the machine direction. Thus, the bubble is stretched in two directions: the transverse direction (TD) where the inflating air increases the diameter of the bubble; and the machine direction (MD) where the nip rollers stretch the bubble. As a result, the physical properties of blown films are typically anisotropic, i.e. the physical properties differ in the MD and TD directions; for example, film tear strength and tensile properties typically differ in the MD and TD. In some documents, the terms "cross direction" or "CD" is used; these terms are equivalent to the terms "transverse direction" or "TD" used in this disclosure. In the blown film process, air is also blown on the external bubble circumference to cool the thermoplastic as it exits the annular die. The final width of the film is determined by controlling the inflating air or the internal bubble pressure; in other words, increasing or decreasing bubble diameter. Film thickness is controlled primarily by increasing or decreasing the speed of the nip rollers to control the draw-down rate. After exiting the nip rollers, the bubble or tube is collapsed and may be slit in the machine direction thus creating sheeting. Each sheet may be wound into a roll of film. Each roll may be further slit to create film of the desired width. Each roll of film is further processed into a variety of consumer products as described below.

The cast film process is similar in that a single or multiple extruder(s) may be used; however, the various thermoplastic materials are metered into a flat die and extruded into a monolayer or multilayer sheet, rather than a tube. In the cast film process the extruded sheet is solidified on a chill roll In the cast film process, films are extruded from a flat die onto a chilled roll or a nipped roll, optionally, with a vacuum box and/or air-knife. The cast films may be monolayer or coextruded multi-layer films obtained by various extrusion through single or multiple dies. The resultant films may be the used as-is or may be laminated to other films or substrates, for example by thermal, adhesive lamination or direct extrusion onto a substrate. The resultant films and laminates may be subjected to other forming operations such as embossing, stretching, thermoforming. Surface treatments such as corona may be applied and the films may be printed.

In the cast film extrusion process, a thin film is extruded through a slit onto a chilled, highly polished turning roll, where it is quenched from one side. The speed of the roller controls the draw ratio and final film thickness. The film is then sent to a second roller for cooling on the other side. Finally, it passes through a system of rollers and is wound onto a roll.

In an embodiment, two or more thin films are coextruded through two or more slits onto a chilled, highly polished turning roll, the coextruded film is quenched from one side. The speed of the roller controls the draw ratio and final coextruded film thickness. The coextruded film is then sent to a second roller for cooling on the other side. Finally, it passes through a system of rollers and is wound onto a roll.

A cast film may further be laminated, one or more layers, into a multilayer structure.

Depending on the end-use application, the disclosed ethylene copolymer composition may be converted into films that span a wide range of thicknesses. Non-limiting examples include, food packaging films where thicknesses may range from about 0.5 mil (13 µm) to about 4 mil (102 µm), and; in heavy duty sack applications film thickness may range from about 2 mil (51 µm) to about 10 mil (254 µm).

The ethylene copolymer composition disclosed herein may be used in monolayer films; where the monolayer may contain more than one ethylene copolymer composition and/or additional thermoplastics; non-limiting examples of thermoplastics include polyethylene polymers and propylene polymers. The lower limit on the weight percent of the ethylene copolymer composition in a monolayer film may be about 3 wt. %, in other cases about 10 wt. % and in still other cases about 30 wt. %. The upper limit on the weight percent of the ethylene copolymer composition in the monolayer film may be 100 wt. %, in other cases about 90 wt. % and in still other cases about 70 wt. %.

The ethylene copolymer composition disclosed herein may also be used in one or more layers of a multilayer film; non-limiting examples of multilayer films include three, five, seven, nine, eleven or more layers. The thickness of a specific layer (containing the ethylene copolymer composition) within a multilayer film may be about 5%, in other cases about 15% and in still other cases about 30% of the total multilayer film thickness. In other embodiments, the thickness of a specific layer (containing the ethylene copolymer composition) within a multilayer film may be about 95%, in other cases about 80% and in still other cases about 65% of the total multilayer film thickness. Each individual layer of a multilayer film may contain more than one ethylene copolymer composition and/or additional thermoplastics.

Additional embodiments include laminations and coatings, wherein mono or multilayer films containing the disclosed ethylene copolymer composition are extrusion laminated or adhesively laminated or extrusion coated. In extrusion lamination or adhesive lamination, two or more substrates are bonded together with a thermoplastic or an adhesive, respectively. In extrusion coating, a thermoplastic is applied to the surface of a substrate. These processes are well known to those experienced in the art. Frequently, adhesive lamination or extrusion lamination are used to bond dissimilar materials, non-limiting examples include the bonding of a paper web to a thermoplastic web, or the bonding of an aluminum foil containing web to a thermoplastic web, or the bonding of two thermoplastic webs that are chemically incompatible, e.g. the bonding of a ethylene copolymer composition containing web to a polyester or polyamide web. Prior to lamination, the web containing the disclosed ethylene copolymer composition(s) may be monolayer or multilayer. Prior to lamination the individual webs may be surface treated to improve the bonding, a non-limiting example of a surface treatment is corona treating. A primary web or film may be laminated on its upper surface, its lower surface, or both its upper and lower surfaces with a secondary web. A secondary web and a tertiary web could be laminated to the primary web; wherein the secondary and tertiary webs differ in chemical composition. As non-limiting examples, secondary or tertiary webs may include; polyamide, polyester and polypropylene, or webs containing barrier resin layers such as EVOH. Such webs may also contain a vapor deposited barrier layer; for example, a thin silicon oxide ($SiO_x$) or aluminum oxide ($AlO_x$) layer. Multilayer webs (or films) may contain three, five, seven, nine, eleven or more layers.

The ethylene copolymer composition disclosed herein can be used in a wide range of manufactured articles including one or more films or film layers (monolayer or multilayer). Non-limiting examples of such manufactured articles include: food packaging films (fresh and frozen foods, liquids and granular foods), stand-up pouches, retortable packaging and bag-in-box packaging; barrier films (oxygen, moisture, aroma, oil, etc.) and modified atmosphere packaging; light and heavy duty shrink films and wraps, collation shrink film, pallet shrink film, shrink bags, shrink bundling and shrink shrouds; light and heavy duty stretch films, hand stretch wrap, machine stretch wrap and stretch hood films; high clarity films; heavy-duty sacks; household wrap, overwrap films and sandwich bags; industrial and institutional films, trash bags, can liners, magazine overwrap, newspaper bags, mail bags, sacks and envelopes, bubble wrap, carpet film, furniture bags, garment bags, coin bags, auto panel films; medical applications such as gowns, draping and surgical garb; construction films and sheeting, asphalt films, insulation bags, masking film, landscaping film and bags; geomembrane liners for municipal waste disposal and mining applications; batch inclusion bags; agricultural films, mulch film and green house films; in-store packaging, self-service bags, boutique bags, grocery bags, carry-out sacks and t-shirt bags; oriented films, machine direction and biaxially oriented films and functional film layers in oriented polypropylene (OPP) films, e.g. sealant and/or toughness layers. Additional manufactured articles including one or more films containing at least one ethylene copolymer composition include laminates and/or multilayer films; sealants and tie layers in multilayer films and composites; laminations with paper; aluminum foil laminates or laminates containing vacuum deposited aluminum; polyamide laminates; polyester laminates; extrusion coated laminates, and; hot-melt adhesive formulations. The manufactured articles summarized in this paragraph contain at least one film (monolayer or multilayer) including at least one embodiment of the disclosed ethylene copolymer composition.

Cast films and laminates made from ethylene copolymer compositions of the present disclosure may be used in a variety of end-uses, such as for example, for food packaging (dry foods, fresh foods, frozen foods, liquids, processed foods, powders, granules), for packaging of detergents, toothpaste, towels, for labels and release liners. The cast films may also be used in unitization and industrial packaging, notably in stretch films. The cast films may also be suitable in hygiene and medical applications, for example in breathable and non-breathable films used in diapers, adult incontinence products, feminine hygiene products, ostomy bags. The ethylene copolymer compositions of the present disclosure may also be useful in tapes and artificial turf applications.

Desired film physical properties (monolayer or multilayer) typically depend on the application of interest. Non-limiting examples of desirable film properties include: optical properties (gloss, haze and clarity), dart impact, Elmendorf tear, modulus (1% and 2% secant modulus), puncture-propagation tear resistance, tensile properties (yield strength, break strength, elongation at break, toughness, etc.) and heat sealing properties (heat seal initiation temperature and hot tack strength). Specific hot tack and heat sealing properties are desired in high speed vertical and horizontal form-fill-seal processes that load and seal a commercial product (liquid, solid, paste, part, etc.) inside a pouch-like package.

In addition to desired film physical properties, it is desired that the disclosed ethylene copolymer composition is easy to process on film lines. Those skilled in the art frequently use the term "processability" to differentiate polymers with improved processability, relative to polymers with inferior processability. A commonly used measure to quantify processability is extrusion pressure; more specifically, a polymer with improved processability has a lower extrusion pressure (on a blown film or a cast film extrusion line) relative to a polymer with inferior processability.

The films used in the manufactured articles described in this section may optionally include, depending on its intended use, additives and adjuvants. Non-limiting examples of additives and adjuvants include, anti-blocking agents, antioxidants, heat stabilizers, slip agents, processing aids, anti-static additives, colorants, dyes, filler materials, light stabilizers, light absorbers, lubricants, pigments, plasticizers, nucleating agents and combinations thereof.

In an embodiment, of the disclosure, a film or film layer includes the ethylene copolymer composition described herein.

In an embodiment, of the disclosure, a film or film layer is a monolayer film and includes the ethylene copolymer composition described herein.

In an embodiment, a film or film layer is a blown film.

In an embodiment, a film or film layer is a cast film.

In embodiments of the disclosure, a film or film layer includes the ethylene copolymer composition described herein and has a thickness of from 0.5 to 10 mil.

In embodiments of the disclosure, a film or film layer has a thickness of from 0.5 to 10 mil.

In embodiments of the disclosure, a multilayer film structure has a thickness of from 0.5 to 10 mil.

In an embodiment of the disclosure, a multilayer film structure includes at least one layer including the ethylene copolymer composition described herein, and the multilayer film structure has a thickness of from 0.5 to 10 mil.

An embodiment of the disclosure is a multilayer coextruded blown film structure.

An embodiment of the disclosure is a multilayer coextruded blown film structure having a thickness of from 0.5 to 10 mil.

An embodiment of the disclosure is a multilayer coextruded blown film structure including a film layer including the ethylene copolymer composition described herein.

An embodiment of the disclosure is a multilayer coextruded blown film structure including a film layer including the ethylene copolymer composition described herein, and the multilayer film structure has a thickness of from 0.5 to 10 mil.

An embodiment of the disclosure is a multilayer coextruded cast film structure.

An embodiment of the disclosure is a multilayer coextruded cast film structure having a thickness of from 0.5 to 10 mil.

An embodiment of the disclosure is a multilayer coextruded cast film structure including a film layer including the ethylene copolymer composition described herein.

An embodiment of the disclosure is a multilayer coextruded cast film structure including a film layer including the ethylene copolymer composition described herein, and the multilayer film structure has a thickness of from 0.5 to 10 mil.

In embodiments of the disclosure, a 1 mil blown film or blown film layer will have a dart impact strength of $\geq 600$ g/mil, or $\geq 700$ g/mil, or $\geq 800$ g/mil, or $\geq 850$ g/mil. In another embodiment of the disclosure, a 1 mil blown film or blown film layer will have a dart impact strength of from 600 g/mil to 1200 g/mil. In a further embodiment of the disclosure, a 1 mil blown film or blown film layer will have dart impact strength of from 700 g/mil to 1100 g/mil. In a further embodiment of the disclosure, a 1 mil blown film or blown film layer will have dart impact strength of from 800 g/mil to 1200 g/mil. In yet another embodiment of the disclosure, a 1 mil blown film or blown film layer will have dart impact strength of from 800 g/mil to 1100 g/mil. In still yet another embodiment of the disclosure, a 1 mil blown film or blown film layer will have dart impact strength of from 850 g/mil to 1050 g/mil.

In embodiments of the disclosure, a 1 mil blown film or blown film layer will have a haze of $\leq 10\%$, or $\leq 8\%$, $\leq 6\%$, or $\leq 5\%$. In embodiments of the disclosure, a 1 mil film or blown film layer will have a haze of from 2% to 10%, or from 2% to 8%, or from 3% to 6%.

In embodiments of the disclosure, a 1 mil blown film or blown film layer will have an ASTM puncture resistance value of $\geq 80$ J/mm, or $\geq 90$ J/mm, or $\geq 95$ J/mm, or $\geq 100$ J/mm. In embodiments of the disclosure, a 1 mil blown film or blown film layer will have ASTM puncture value of from 80 J/mm to 140 J/mm, or from 90 J/mm to 130 J/mm, or from 100 J/mm to 125 J/mm.

In embodiments of the disclosure, a 2 mil blown film or blown film layer will have a seal initiation temperature (SIT) of $\leq 100°$ C., or $\leq 95°$ C., or $\leq 90°$ C., or $\leq 85°$ C., or $<100°$ C., or $<95°$ C., or $<90°$ C., or $<85°$ C. In an embodiment of the disclosure, a 2 mil blown film or blown film layer will have a seal initiation temperature (SIT) of from 75° C. to 105° C. In an embodiment of the disclosure, a 2 mil blown film or blown film layer will have a seal initiation temperature (SIT) of from 80° C. to 100° C. In an embodiment of the disclosure, a 2 mil blown film or blown film layer will have a seal initiation temperature (SIT) of from 80° C. to 95° C.

In embodiments of the disclosure, a 2 mil blown film or blown film layer will have a hot tack onset temperature (HTOT) of $\leq 100°$ C., or $\leq 95°$ C., or $\leq 90°$ C., or $\leq 88°$ C., or $\leq 85°$ C., or $<100°$ C., or $<95°$ C., or $<90°$ C., or $<88°$ C., or $<85°$ C. In an embodiment of the disclosure, a 2 mil or blown film layer blown film will have a hot tack onset temperature (HTOT) of from 55° C. to 100° C. In an embodiment of the disclosure, a 2 mil blown film or blown film layer will have a hot tack onset temperature (HTOT) of from 60° C. to 88° C. In an embodiment of the disclosure, a 2 mil blown film or blown film layer will have a hot tack onset temperature (HTOT) of from 60° C. to 85° C.

In an embodiment of the disclosure, a 2 mil blown film or blown film layer will have a hot tack window (HTW) of $\geq 40°$ C. In an embodiment of the disclosure, a 2 mil blown film or blown film layer will have a hot tack window (HTW) of $\geq 45°$ C. In an embodiment of the disclosure, a 2 mil or blown film layer blown film will have a hot tack window (HTW) of $\geq 50°$ C. In an embodiment of the disclosure, a 2 mil blown film or blown film layer will have a hot tack window (HTW) of $\geq 55°$ C. In an embodiment of the disclosure, a 2 mil blown film or blown film layer will have a hot tack window (HTW) of from 40 to 75° C. In an embodiment of the disclosure, a 2 mil blown film or blown film layer will have a hot tack window (HTW) of from 40 to 70° C. In an embodiment of the disclosure, a 2 blown mil film or blown film layer will have a hot tack window (HTW) of from 45 to 75° C. In an embodiment of the disclosure, a 2 mil blown film or blown film layer will have a hot tack window (HTW) of from 45 to 70° C. In an embodiment of the disclosure, a 2 mil blown film or blown film layer will have a hot tack window (HTW) of from 45 to 65° C.

An embodiment of the disclosure is a multilayer film structure including at least one film layer including the ethylene copolymer composition described herein.

An embodiment of the disclosure is a multilayer film structure including at least one film layer including the ethylene copolymer composition described herein where the multilayer film structure has at least 3 layers, or at least 5 layers, or at least 7 layers, or at least 9 layers.

An embodiment of the disclosure is a multilayer film structure including at least one film layer including the ethylene copolymer composition described herein where the multilayer film structure has 9 layers.

An embodiment of the disclosure is a multilayer film structure including at least one sealant layer including the ethylene copolymer composition described herein.

An embodiment of the disclosure is a multilayer film structure including a sealant layer including the ethylene copolymer composition described herein.

An embodiment of the disclosure is a multilayer film structure including a sealant layer including the ethylene copolymer composition described herein and where the multilayer film structure has at least 3 layers.

An embodiment of the disclosure is a multilayer film structure including a sealant layer including the ethylene copolymer composition described herein and where the multilayer film structure has at least 5 layers.

An embodiment of the disclosure is a multilayer film structure including a sealant layer including the ethylene copolymer composition described herein and where the multilayer film structure has at least 7 layers.

An embodiment of the disclosure is a multilayer film structure including a sealant layer including the ethylene copolymer composition described herein and where the multilayer film structure has at least 9 layers.

An embodiment of the disclosure is a multilayer film structure including a sealant layer including the ethylene copolymer composition described herein and where the multilayer film structure has 9 layers.

In embodiments of the disclosure, a 2 mil cast film or cast film layer will have a seal initiation temperature (SIT) of ≤100° C., or ≤95° C., or ≤90° C., or <100° C., or <95° C., or <90° C. In an embodiment of the disclosure, a 2 mil cast film or cast film layer will have a seal initiation temperature (SIT) of from 75° C. to 105° C. In an embodiment of the disclosure, a 2 mil cast film or cast film layer will have a seal initiation temperature (SIT) of from 80° C. to 100° C. In an embodiment of the disclosure, a 2 mil cast film or cast film layer will have a seal initiation temperature (SIT) of from 80° C. to 95° C.

In embodiments of the disclosure, a 2 mil cast film structure will have a seal initiation temperature (SIT) of ≤100° C., or ≤95° C., or ≤90° C., or <100° C., or <95° C., or <90° C. In an embodiment of the disclosure, a 2 mil cast film structure will have a seal initiation temperature (SIT) of from 75° C. to 105° C. In an embodiment of the disclosure, a 2 mil cast film structure will have a seal initiation temperature (SIT) of from 80° C. to 100° C. In an embodiment of the disclosure, a 2 mil cast film structure will have a seal initiation temperature (SIT) of from 80° C. to 95° C.

In embodiments of the disclosure, a 2 mil cast film or cast film layer will have a hot tack onset temperature (HTOT) of ≤100° C., or ≤95° C., or ≤90° C., or ≤88° C., or ≤85° C., or <100° C., or <95° C., or <90° C., or <88° C., or <85° C. In an embodiment of the disclosure, a 2 mil cast film or cast film layer will have a hot tack onset temperature (HTOT) of from 65° C. to 100° C. In an embodiment of the disclosure, a 2 mil cast film or cast film layer will have a hot tack onset temperature (HTOT) of from 70° C. to 95° C. In an embodiment of the disclosure, a 2 mil cast film or cast film layer will have a hot tack onset temperature (HTOT) of from 75° C. to 95° C.

In embodiments of the disclosure, a 2 mil cast film structure will have a hot tack onset temperature (HTOT) of ≤100° C., or ≤95° C., or ≤90° C., or ≤88° C., or ≤85° C., or <100° C., or <95° C., or <90° C., or <88° C., or <85° C. In an embodiment of the disclosure, a 2 mil cast film structure will have a hot tack onset temperature (HTOT) of from 65° C. to 100° C. In an embodiment of the disclosure, a 2 mil cast film structure will have a hot tack onset temperature (HTOT) of from 70° C. to 95° C. In an embodiment of the disclosure, a 2 mil cast film structure will have a hot tack onset temperature (HTOT) of from 75° C. to 95° C.

In an embodiment of the disclosure, a 2 mil cast film or cast film layer will have a hot tack window (HTW) of ≥15° C. In an embodiment of the disclosure, a 2 mil cast film or cast film layer will have a hot tack window (HTW) of ≥17.5° C. In an embodiment of the disclosure, a 2 mil cast film or cast film layer will have a hot tack window (HTW) of ≥20° C. In an embodiment of the disclosure, a 2 mil cast film or cast film layer will have a hot tack window (HTW) of from 15 to 40° C. In an embodiment of the disclosure, a 2 mil cast film or cast film layer will have a hot tack window (HTW) of from 17.5 to 40° C. In an embodiment of the disclosure, a 2 mil cast film or cast film layer will have a hot tack window (HTW) of from 20 to 40° C. In an embodiment of the disclosure, a 2 mil cast film or cast film layer will have a hot tack window (HTW) of from 20 to 35° C.

In an embodiment of the disclosure, a 2 mil cast film structure will have a hot tack window (HTW) of ≥15° C. In an embodiment of the disclosure, a 2 mil cast film structure will have a hot tack window (HTW) of ≥17.5° C. In an embodiment of the disclosure, a 2 mil cast film structure will have a hot tack window (HTW) of ≥20° C. In an embodiment of the disclosure, a 2 mil cast film structure will have a hot tack window (HTW) of from 15 to 40° C. In an embodiment of the disclosure, a 2 mil cast film structure will have a hot tack window (HTW) of from 17.5 to 40° C. In an embodiment of the disclosure, a 2 mil cast film structure will have a hot tack window (HTW) of from 20 to 40° C. In an embodiment of the disclosure, a 2 mil cast film structure will have a hot tack window (HTW) of from 20 to 35° C.

The following examples are presented for the purpose of illustrating selected embodiments of this disclosure; it being understood, that the examples presented do not limit the claims presented.

EXAMPLES

General Testing Procedures

Prior to testing, each polymer specimen was conditioned for at least 24 hours at 23±2° C. and 50±10% relative humidity and subsequent testing was conducted at 23±2° C. and 50±10% relative humidity. Herein, the term "ASTM conditions" refers to a laboratory that is maintained at 23±2° C. and 50±10% relative humidity; and specimens to be tested were conditioned for at least 24 hours in this laboratory prior to testing. ASTM refers to the American Society for Testing and Materials.

Density

Ethylene copolymer composition densities were determined using ASTM D792-13 (Nov. 1, 2013).

Melt Index

Ethylene copolymer composition melt index was determined using ASTM D1238 (Aug. 1, 2013). Melt indexes, $I_2$, $I_6$, $I_{10}$ and $I_{21}$ were measured at 190° C., using weights of 2.16 kg, 6.48 kg, 10 kg and a 21.6 kg respectively. Herein, the term "stress exponent" or its acronym "S.Ex.", is defined by the following relationship: S.Ex.=log ($I_6$/$I_2$)/log(6480/2160) wherein I6 and I2 are the melt flow rates measured at 190° C. using 6.48 kg and 2.16 kg loads, respectively.

Conventional Size Exclusion Chromatography (SEC)

Ethylene copolymer composition samples (polymer) solutions (1 to 3 mg/mL) were prepared by heating the polymer in 1,2,4-trichlorobenzene (TCB) and rotating on a wheel for 4 hours at 150° C. in an oven. An antioxidant (2,6-di-tert-butyl-4-methylphenol (BHT)) was added to the mixture in order to stabilize the polymer against oxidative degradation. The BHT concentration was 250 ppm. Polymer solutions were chromatographed at 140° C. on a PL 220 high-temperature chromatography unit equipped with four Shodex columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect GPC columns from oxidative degradation. The sample injection volume was 200 μL. The GPC columns were calibrated with narrow distribution polystyrene standards. The polystyrene molecular weights were converted to polyethylene molecular weights using the Mark-Houwink equation, as described in the ASTM standard test method D6474-12 (December 2012). The GPC raw data were processed with the Cirrus GPC software, to produce molar mass averages ($M_n$, $M_w$, $M_z$) and molar mass distribution (e.g. Polydispersity, $M_w/M_n$). In the polyethylene art, a commonly used term that is equivalent to SEC is GPC, i.e. Gel Permeation Chromatography.

Triple Detection Size Exclusion Chromatography (3D-SEC)

Ethylene copolymer composition samples (polymer) solutions (1 to 3 mg/mL) were prepared by heating the polymer in 1,2,4-trichlorobenzene (TCB) and rotating on a wheel for 4 hours at 150° C. in an oven. An antioxidant (2,6-di-tert-butyl-4-methylphenol (BHT)) was added to the mixture in order to stabilize the polymer against oxidative degradation. The BHT concentration was 250 ppm. Sample solutions were chromatographed at 140° C. on a PL 220 high-temperature chromatography unit equipped with a differential refractive index (DRI) detector, a dual-angle light scattering detector (15 and 90 degree) and a differential viscometer. The SEC columns used were either four Shodex columns (HT803, HT804, HT805 and HT806), or four PL Mixed ALS or BLS columns. TCB was the mobile phase with a flow rate of 1.0 mL/minute, BHT was added to the mobile phase at a concentration of 250 ppm to protect SEC columns from oxidative degradation. The sample injection volume was 200 μL. The SEC raw data were processed with the Cirrus GPC software, to produce absolute molar masses and intrinsic viscosity ([η]). The term "absolute" molar mass was used to distinguish 3D-SEC determined absolute molar masses from the molar masses determined by conventional SEC. The viscosity average molar mass ($M_v$) determined by 3D-SEC was used in the calculations to determine the Long Chain Branching Factor (LCBF).

GPC-FTIR

Ethylene copolymer composition (polymer) solutions (2 to 4 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a Waters GPC 150C chromatography unit equipped with four Shodex columns (HT803, HT804, HT805 and HT806) using TCB as the mobile phase with a flow rate of 1.0 mL/minute, with a FTIR spectrometer and a heated FTIR flow through cell coupled with the chromatography unit through a heated transfer line as the detection system. BHT was added to the mobile phase at a concentration of 250 ppm to protect SEC columns from oxidative degradation. The sample injection volume was 300 μL. The raw FTIR spectra were processed with OPUS FTIR software and the polymer concentration and methyl content were calculated in real time with the Chemometric Software (PLS technique) associated with the OPUS. Then the polymer concentration and methyl content were acquired and baseline-corrected with the Cirrus GPC software. The SEC columns were calibrated with narrow distribution polystyrene standards. The polystyrene molecular weights were converted to polyethylene molecular weights using the Mark-Houwink equation, as described in the ASTM standard test method D6474. The comonomer content was calculated based on the polymer concentration and methyl content predicted by the PLS technique as described in Paul J. DesLauriers, Polymer 43, pages 159-170 (2002); herein incorporated by reference.

The GPC-FTIR method measures total methyl content, which includes the methyl groups located at the ends of each macromolecular chain, i.e. methyl end groups. Thus, the raw GPC-FTIR data is corrected by subtracting the contribution from methyl end groups. To be more clear, the raw GPC-FTIR data overestimates the amount of short chain branching (SCB) and this overestimation increases as molecular weight (M) decreases. In this disclosure, raw GPC-FTIR data was corrected using the 2-methyl correction. At a given molecular weight (M), the number of methyl end groups ($N_E$) was calculated using the following equation; $N_E$=28000/M, and $N_E$ (M dependent) was subtracted from the raw GPC-FTIR data to produce the SCB/1000C (2-Methyl Corrected) GPC-FTIR data.

CRYSTAF/TREF (CTEF)

The "Composition Distribution Breadth Index", hereinafter CDBI, of the ethylene copolymer compositions (and Comparative Examples) was measured using a CRYSTAF/TREF 200+ unit equipped with an IR detector, hereinafter the CTREF. The acronym "TREF" refers to Temperature Rising Elution Fractionation. The CTREF was supplied by PolymerChAR S.A. (Valencia Technology Park, Gustave Eiffel, 8, Paterna, E-46980 Valencia, Spain). The CTREF was operated in the TREF mode, which generates the chemical composition of the polymer sample as a function of elution temperature, the Co/Ho ratio (Copolymer/Homopolymer ratio) and the CDBI (the Composition Distribution Breadth Index), i.e. $CDBI_{50}$ and $CDBI_{25}$. A polymer sample (80 to 100 mg) was placed into the reactor vessel of the CTREF. The reactor vessel was filled with 35 ml of 1,2,4-trichlorobenzene (TCB) and the polymer was dissolved by heating the solution to 150° C. for 2 hours. An aliquot (1.5 mL) of the solution was then loaded into the CTREF column which was packed with stainless steel beads. The column, loaded with sample, was allowed to stabilize at 110° C. for 45 minutes. The polymer was then crystallized from solution, within the column, by dropping the temperature to 30° C. at a cooling rate of 0.09° C./minute. The column was then equilibrated for 30 minutes at 30° C. The crystallized polymer was then eluted from the column with TCB flowing through the column at 0.75 mL/minute, while the column was slowly heated from 30° C. to 120° C. at a heating rate of 0.25° C./minute. The raw CTREF data were processed using Polymer ChAR software, an Excel spreadsheet and CTREF software developed in-house. $CDBI_{50}$ was defined as the percent of polymer whose composition is within 50% of the median comonomer composition; $CDBI_{50}$ was calculated from the composition distribution cure and the normalized cumulative integral of the composition distribution curve, as described in U.S. Pat. No. 5,376,439. Those skilled in the art will understand that a calibration curve is required to convert a CTREF elution temperature to comonomer content, i.e. the amount of comonomer in the ethylene/α-olefin polymer fraction that elutes at a specific temperature. The generation of such calibration curves are described elsewhere, e.g. Wild, et al., J. Polym. Sci., Part B, Polym. Phys., Vol. 20 (3), pages 441-455: hereby fully incorporated by reference. $CDBI_{25}$ as calculated in a similar manner; $CDBI_{25}$ is defined as the percent of polymer whose composition is with 25% of the median comonomer composition. At the end of each sample run, the CTREF column was cleaned for 30 minutes; specifically, with the CTREF column temperature at 160° C., TCB flowed (0.5 mL/minute) through the column for 30 minutes.

Figure 3:
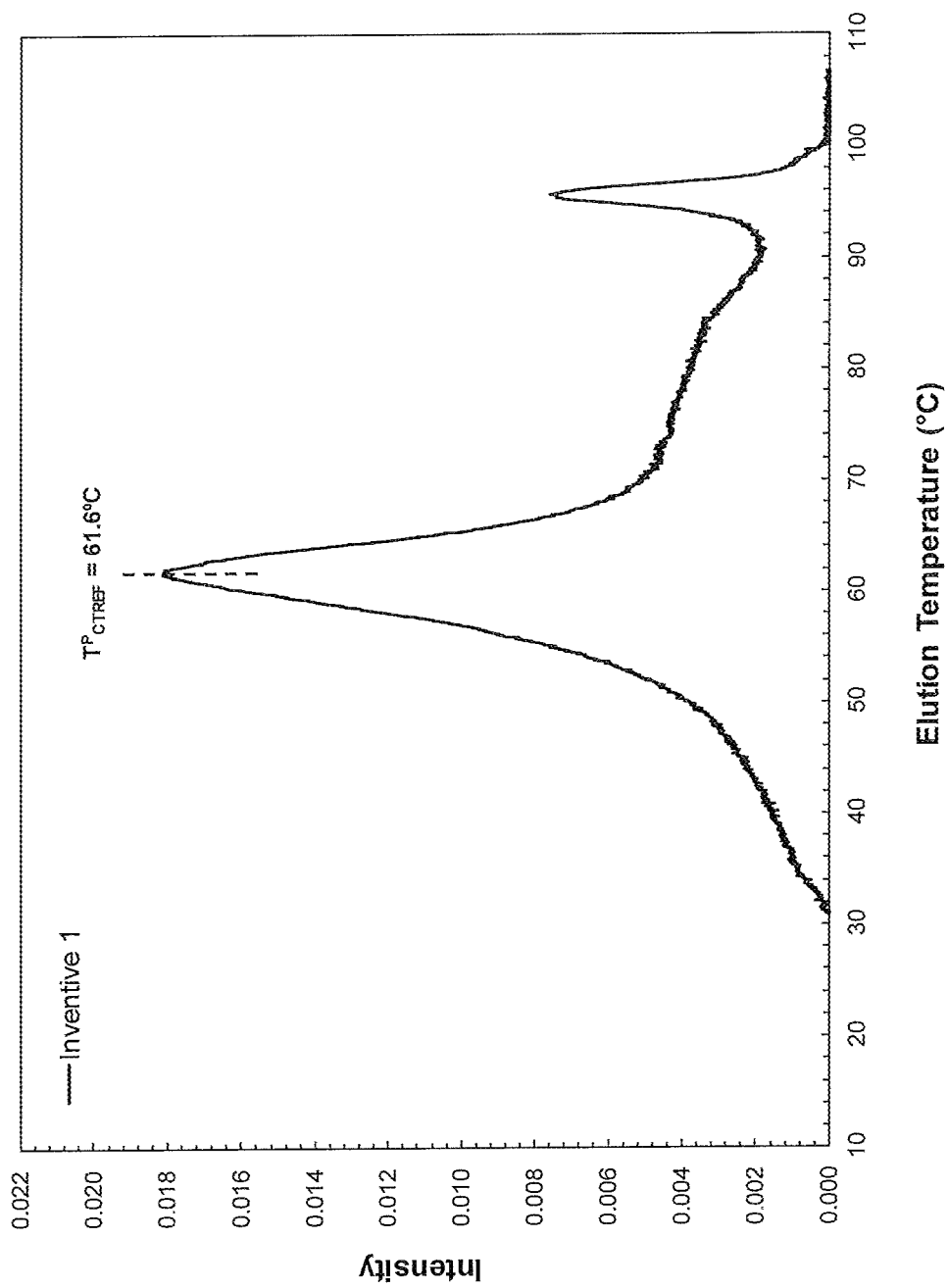
FIG. 3 shows the CTREF profile obtained for an ethylene copolymer composition made according to the present disclosure.

CTREF peak elution temperatures were used to determine the amount of branching (SCB1 ($\#C_6/10000$)) and density of the first ethylene copolymer using the following equations: SCB1 ($\#C_{6/10000}$)=74.29−0.7598 ($T^P_{CTREF}$), where $T^P_{CTREF}$ is the peak elution temperature of the first ethylene copolymer in the CTREF chromatogram, and SCB1 ($\#C_6/10000$)= 9341.8 $(\rho^1)^2$−17766 $(\rho^1)$+8446.8, where $\rho^1$ was the density of the first ethylene copolymer. The SCB2 ($\#C_6/10000$) and density of the second ethylene copolymer was determined using blending rules, given the overall SCB of the ethylene copolymer composition, SCB-overall composition (measured as $\#C_6/1000C$, where $\#C_6$ is the number of hexyl branches or as a proxy for hexyl branches, the $\#CH_3/1000C$ from FTIR, where $\#CH_3$ is the number of methyl groups) and the overall density of the ethylene copolymer composition. See FIG. 3, which shows the relative position of the $T^P_{CTREF}$ of the first ethylene copolymer for Inventive Example 1.

The CTREF procedures described above are also used to determine the modality of a TREF profile, the temperatures or temperatures ranges where elution intensity maxima (elution peaks) occur, and the weight percent (wt %) of the ethylene copolymer composition which elutes at a temperature of from 90° C. to 105° C. (i.e. the intergrated area of the fraction, in weight percent, of the ethylene copolymer composition which elutes at from 90° C. to 105° C. in a CTREF analysis).

Neutron Activation (Elemental Analysis)

Neutron Activation Analysis, hereinafter N.A.A., was used to determine catalyst metal residues in ethylene copolymer compositions as follows. A radiation vial (composed of ultrapure polyethylene, 7 mL internal volume) was filled with an ethylene copolymer composition sample and the sample weight was recorded. Using a pneumatic transfer system the sample was placed inside a SLOWPOKE™ nuclear reactor (Atomic Energy of Canada Limited, Ottawa, Ontario, Canada) and irradiated for 30 to 600 seconds for short half-life elements (e.g., Ti, V, Al, Mg, and Cl) or 3 to 5 hours for long half-life elements (e.g. Zr, Hf, Cr, Fe and Ni). The average thermal neutron flux within the reactor was $5\times10^{11}/cm^2/s$. After irradiation, samples were withdrawn from the reactor and aged, allowing the radioactivity to decay; short half-life elements were aged for 300 seconds or long half-life elements were aged for several days. After aging, the gamma-ray spectrum of the sample was recorded using a germanium semiconductor gamma-ray detector (Ortec model GEM55185, Advanced Measurement Technology Inc., Oak Ridge, Tenn., USA) and a multichannel analyzer (Ortec model DSPEC Pro). The amount of each element in the sample was calculated from the gamma-ray spectrum and recorded in parts per million, relative to the total weight of the ethylene copolymer composition sample. The N.A.A. system was calibrated with Specpure standards (1000 ppm solutions of the desired element (greater than 99% pure)). One mL of solutions (elements of interest) were pipetted onto a 15 mm×800 mm rectangular paper filter and air dried. The filter paper was then placed in a 1.4 mL polyethylene irradiation vial and analyzed by the N.A.A. system. Standards are used to determine the sensitivity of the N.A.A. procedure (in counts/µg).

Unsaturation

The quantity of unsaturated groups, i.e. double bonds, in an ethylene copolymer composition was determined according to ASTM D3124-98 (vinylidene unsaturation, published March 2011) and ASTM D6248-98 (vinyl and trans unsaturation, published July 2012). An ethylene copolymer composition sample was: a) first subjected to a carbon disulfide extraction to remove additives that may interfere with the analysis; b) the sample (pellet, film or granular form) was pressed into a plaque of uniform thickness (0.5 mm), and; c) the plaque was analyzed by FTIR.

Comonomer Content: Fourier Transform Infrared (FTIR) Spectroscopy

The quantity of comonomer in an ethylene copolymer composition was determined by FTIR and reported as the Short Chain Branching (SCB) content having dimensions of $CH_3\#/1000C$ (number of methyl branches per 1000 carbon atoms). This test was completed according to ASTM D6645-01 (2001), employing a compression molded polymer plaque and a Thermo-Nicolet 750 Magna-IR Spectrophotometer. The polymer plaque was prepared using a compression molding device (Wabash-Genesis Series press) according to ASTM D4703-16 (April 2016).

$^{13}C$ Nuclear Magnetic Resonance (NMR)

Between 0.21 and 0.30 g of polymer sample was weighed into 10 mm NMR tubes. The sample was then dissolved with deuterated ortho-dichlorobenzene (ODCB-d4) and heated to 125° C.; a heat gun was used to assist the mixing process. $^{13}C$ NMR spectra (24000 scans per spectra) were collected on a Bruker AVANCE III HD 400 MHz NMR spectrometer fitted with a 10 mm PABBO probehead maintained at 125° C. Chemical shifts were referenced to the polymer backbone resonance, which was assigned a value of 30.0 ppm. $^{13}C$ spectra were processed using exponential multiplication with a line broadening (LB) factor of 1.0 Hz. They were also processed using Gaussian multiplication with LB=−0.5 Hz and GB=0.2 to enhance resolution.

Differential Scanning Calorimetry (DSC)

Primary melting peak (° C.), melting peak temperatures (° C.), heat of fusion (J/g) and crystallinity (%) was determined using differential scanning calorimetry (DSC) as follows: the instrument was first calibrated with indium; after the calibration, a polymer specimen is equilibrated at 0° C. and then the temperature was increased to 200° C. at a heating rate of 10° C./min; the melt was then kept isothermally at 200° C. for five minutes; the melt was then cooled to 0° C. at a cooling rate of 10° C./min and kept at 0° C. for five minutes; the specimen was then heated to 200° C. at a heating rate of 10° C./min. The DSC Tm, heat of fusion and crystallinity are reported from the $2^{nd}$ heating cycle.

Dynamic Mechanical Analysis (DMA)

Oscillatory shear measurements under small strain amplitudes were carried out to obtain linear viscoelastic functions at 190° C. under $N_2$ atmosphere, at a strain amplitude of 10% and over a frequency range of 0.02-126 rad/s at 5 points per decade. Frequency sweep experiments were performed with a TA Instruments DHR3 stress-controlled rheometer using cone-plate geometry with a cone angle of 5°, a truncation of 137 μm and a diameter of 25 mm. In this experiment a sinusoidal strain wave was applied and the stress response was analyzed in terms of linear viscoelastic functions. The zero shear rate viscosity ($\eta_0$) based on the DMA frequency sweep results was predicted by Ellis model (see R. B. Bird et al. "Dynamics of Polymer Liquids. Volume 1: Fluid Mechanics" Wiley-Interscience Publications (1987) p. 228) or Carreau-Yasuda model (see K. Yasuda (1979) PhD Thesis, IT Cambridge). In this disclosure, the LCBF (Long Chain Branching Factor) was determined using the DMA determined $\eta_0$.

Melt Strength

The melt strength is measured on Rosand RH-7 capillary rheometer (barrel diameter=15 mm) with a flat die of 2-mm Diameter, L/D ratio 10:1 at 190° C. Pressure Transducer: 10,000 psi (68.95 MPa). Piston Speed: 5.33 mm/min. Haul-off Angle: 52°. Haul-off incremental speed: 50-80 m/min² or 65±15 m/min². A polymer melt is extruded through a capillary die under a constant rate and then the polymer strand is drawn at an increasing haul-off speed until it ruptures. The maximum steady value of the force in the plateau region of a force versus time curve is defined as the melt strength for the polymer.

Film Dart Impact

Film dart impact strength was determined using ASTM D1709-09 Method A (May 1, 2009). In this disclosure the dart impact test employed a 1.5 inch (38 mm) diameter hemispherical headed dart.

Film Puncture

Film "puncture", the energy (J/mm) required to break the film was determined using ASTM D5748-95 (originally adopted in 1995, reapproved in 2012).

Film Lubricated Puncture

The "lubricated puncture" test was performed as follows: the energy (J/mm) to puncture a film sample was determined using a 0.75-inch (1.9-cm) diameter pear-shaped fluorocarbon coated probe travelling at 10-inch per minute (25.4-cm/minute). ASTM conditions were employed. Prior to testing the specimens, the probe head was manually lubricated with Muko Lubricating Jelly to reduce friction. Muko Lubricating Jelly is a water-soluble personal lubricant available from Cardinal Health Inc., 1000 Tesma Way, Vaughan, ON L4K 5R8 Canada. The probe was mounted in an Instron Model 5 SL Universal Testing Machine and a 1000-N load cell as used. Film samples (1.0 mil (25 μm) thick, 5.5 inch (14 cm) wide and 6 inch (15 cm) long) were mounted in the Instron and punctured.

Film Tensile

The following film tensile properties were determined using ASTM D882-12 (Aug. 1, 2012): tensile break strength (MPa), elongation at break (%), tensile yield strength (MPa), tensile elongation at yield (%) and film toughness or total energy to break (ft·lb/in³). Tensile properties were measured in the both the machine direction (MD) and the transverse direction (TD) of the blown films.

Film Secant Modulus

The secant modulus is a measure of film stiffness. The secant modulus is the slope of a line drawn between two points on the stress-strain curve, i.e. the secant line. The first point on the stress-strain curve is the origin, i.e. the point that corresponds to the origin (the point of zero percent strain and zero stress), and; the second point on the stress-strain curve is the point that corresponds to a strain of 1%; given these two points the 1% secant modulus is calculated and is expressed in terms of force per unit area (MPa). The 2% secant modulus is calculated similarly. This method is used to calculated film modulus because the stress-strain relationship of polyethylene does not follow Hook's law; i.e. the stress-strain behavior of polyethylene is non-linear due to its viscoelastic nature. Secant moduli were measured using a conventional Instron tensile tester equipped with a 200 lbf load cell. Strips of monolayer film samples were cut for testing with following dimensions: 14 inch long, 1 inch wide and 1 mil thick; ensuring that there were no nicks or cuts on the edges of the samples. Film samples were cut in both the machine direction (MD) and the transverse direction (TD) and tested. ASTM conditions were used to condition the samples. The thickness of each film was accurately measured with a hand-held micrometer and entered along with the sample name into the Instron software. Samples were loaded in the Instron with a grip separation of 10 inch and pulled at a rate of 1 inch/min generating the strain-strain curve. The 1% and 2% secant modulus were calculated using the Instron software.

Film Puncture-Propagation Tear

Puncture-propagation tear resistance of blown film was determined using ASTM D2582-09 (May 1, 2009). This test measures the resistance of a blown film to snagging, or more precisely, to dynamic puncture and propagation of that puncture resulting in a tear. Puncture-propagation tear resistance was measured in the machine direction (MD) and the transverse direction (TD) of the blown films.

Film Elmendorf Tear

Film tear performance was determined by ASTM D1922-09 (May 1, 2009); an equivalent term for tear is "Elmendorf tear". Film tear was measured in both the machine direction (MD) and the transverse direction (TD) of the blown films.

Film Opticals

Film optical properties were measured as follows: Haze, ASTM D1003-13 (Nov. 15, 2013), and; Gloss ASTM D2457-13 (Apr. 1, 2013).

Film Dynatup Impact

Instrumented impact testing was carried out on a machine called a Dynatup Impact Tester purchased from Illinois Test Works Inc., Santa Barbara, Calif., USA; those skilled in the art frequently call this test the Dynatup impact test. Testing was completed according to the following procedure. Test samples are prepared by cutting about 5 inch (12.7 cm) wide and about 6 inch (15.2 cm) long strips from a roll of blown film; film was about 1 mil thick. Prior to testing, the thickness of each sample was accurately measured with a handheld micrometer and recorded. ASTM conditions were employed. Test samples were mounted in the 9250 Dynatup Impact drop tower/test machine using the pneumatic clamp. Dynatup tup #1, 0.5 inch (1.3 cm) diameter, was attached to the crosshead using the Allen bolt supplied. Prior to testing, the crosshead is raised to a height such that the film impact velocity is 10.9±0.1 ft/s. A weight was added to the crosshead such that: 1) the crosshead slowdown, or tup slowdown, was no more than 20% from the beginning of the test to the point of peak load and 2) the tup must penetrate through the specimen. If the tup does not penetrate through the film, additional weight is added to the crosshead to increase the striking velocity. During each test the Dynatup Impulse Data Acquisition System Software collected the experimental data (load (lb) versus time). At least 5 film samples are tested and the software reports the following average values: "Dynatup Maximum (Max) Load (lb)", the highest load measured during the impact test; "Dynatup Total Energy (ft/lb)", the area under the load curve from the start of the test to the end of the test (puncture of the sample), and; "Dynatup Total Energy at Max Load (ft/lb)", the area under the load curve from the start of the test to the maximum load point.

Film Hexane Extractables

Hexane extractables was determined according to the Code of Federal Registration 21 CFR § 177.1520 Para (c) 3.1 and 3.2; wherein the quantity of hexane extractable material in a film is determined gravimetrically. Elaborating, 2.5 grams of 3.5 mil (89 μm) monolayer film was placed in a stainless steel basket, the film and basket were weighed ($w^i$), while in the basket the film was: extracted with n-hexane at 49.5° C. for two hours; dried at 80° C. in a vacuum oven for 2 hours; cooled in a desiccator for 30 minutes, and; weighed ($w^f$). The percent loss in weight is the percent hexane extractables ($w^{C6}$): $w^{C6}=100\times(w^i-w^f)/w^i$.

Film Hot Tack

In this disclosure, the "Hot Tack Test" was performed as follows, using ASTM conditions. Hot tack data was generated using a J&B Hot Tack Tester which is commercially available from Jbi Hot Tack, Geloeslaan 30, B-3630 Maamechelen, Belgium. In the hot tack test, the strength of a polyolefin to polyolefin seal is measured immediately after heat sealing two film samples together (the two film samples were cut from the same roll of 2.0 mil (51-μm) thick film), i.e. when the polyolefin macromolecules that include the film are in a semi-molten state. This test simulates the heat sealing of polyethylene films on high speed automatic packaging machines, e.g., vertical or horizontal form, fill and seal equipment. The following parameters were used in the J&B Hot Tack Test: film specimen width, 1 inch (25.4 mm); film sealing time, 0.5 second; film sealing pressure, 0.27 N/mm²; delay time, 0.5 second; film peel speed, 7.9 in/second (200 mm/second); testing temperature range, 131° F. to 293° F. (55° C. to 145° C.); temperature increments, 9° F. (5° C.); and five film samples were tested at each temperature increment to calculate average values at each temperature. In this way, a hot tack profile of pulling force vs sealing temperature is generated. The following data can be calculated from this hot tack profile: the "Hot Tack Onset Temperature @ 1.0 N (° C.)" or the "HTOT", is the temperature at which a hot tack force of 1N was observed (an average of five film samples); the "Max Hot tack Strength (N)", is the maximum hot tack force observed (an average of five film samples) over the testing temperature range; the "Temperature—Max. Hot tack (° C.)", is the temperature at which the maximum hot tack force was observed. Finally, the hot-tack (strength) window (the "hot tack window" or the "HTW") is defined as the range of temperature, in ° C. spanned by the hot tack curve at a given seal strength, for example 2.5 Newtons. A person skilled in the art will realize that a hot tack window can be determined for differently defined seal strengths. Generally speaking, for a given seal strength, the larger the hot tack window, the greater the temperature window over which a high sealing force can be maintained or achieved.

Film Heat Seal Strength

In this disclosure, the "Heat Seal Strength Test" (also known as "the cold seal test") was performed as follows. ASTM conditions were employed. Heat seal data was generated using a conventional Instron Tensile Tester. In this test, two film samples are sealed over a range of temperatures (the two film samples were cut from the same roll of 2.0 mil (51-μm) thick film). The following parameters were used in the Heat Seal Strength (or cold seal) Test: film specimen width, 1 inch (25.4 mm); film sealing time, 0.5 second; film sealing pressure, 40 psi (0.28 N/mm²); temperature range, 212° F. to 302° F. (100° C. to 150° C.) and temperature increment, 9° F. (5° C.). After aging for at least 24 hours at ASTM conditions, seal strength was determined using the following tensile parameters: pull (crosshead) speed, 12 inch/min (2.54 cm/min); direction of pull, 90° to seal, and; 5 samples of film were tested at each temperature increment. The Seal Initiation Temperature, hereafter "SIT", is defined as the temperature required to form a commercially viable seal; a commercially viable seal has a seal strength of 2.0 lb per inch of seal (8.8 N per 25.4 mm of seal).

Long Chain Branching Factor (LCBF)

The LCBF (dimensionless) was determined for the ethylene copolymer composition using the method described in U.S. Pat. Appl. Pub. No. 2018/0305531 which is incorporated herein by reference.

Ethylene Copolymer Compositions

Ethylene copolymer compositions were each made using a mixed dual catalyst system in an "in-series" dual reactor solution polymerization process. As a result, ethylene copolymer compositions each include a first ethylene copolymer made with a single site catalyst and a second ethylene copolymer made with a multi-site catalyst. An "in series" dual reactor, solution phase polymerization process, including one employing a mixed dual catalyst has been described in U.S. Pat. Appl. Pub. No. 2018/0305531. Basically, in an "in-series" dual reactor system the exit stream from a first polymerization reactor ($R_1$) flows directly into a second polymerization reactor ($R_2$).

The $R_1$ pressure was from about 14 MPa to about 18 MPa; while $R_2$ was operated at a lower pressure to facilitate continuous flow from $R_1$ to $R_2$. Both $R_1$ and $R_2$ were continuously stirred reactors (CSTR's) and were agitated to give conditions in which the reactor contents were well mixed. The process was operated continuously by feeding fresh process solvent, ethylene, 1-octene and hydrogen to the reactors and in the removal of product. Methylpentane was used as the process solvent (a commercial blend of methylpentane isomers). The volume of the first CSTR reactor ($R_1$) was 3.2 gallons (12 L), and the volume of the second CSTR reactor ($R_2$) was 5.8 gallons (22 L). Monomer (ethylene) and comonomer (1-octene) were purified prior to addition to the reactor using conventional feed preparation systems (such as contact with various absorption media to remove impurities such as water, oxygen and polar contaminants). The reactor feeds were pumped to the reactors at the ratios shown in Table 1. Average residence times for the reactors are calculated by dividing average flow rates by reactor volume and is primarily influenced by the amount of solvent flowing through each reactor and the total amount of solvent flowing through the solution process.

The following single site catalyst (SSC) components were used to prepare the first ethylene copolymer in a first reactor (R1) configured in series to a second reactor (R2): diphenylmethylene(cyclopentadienyl)(2,7-di-t-butylfuorenyl)hafnium dimethide [(2,7-tBu$_2$Flu)Ph$_2$C(Cp)HfMe$_2$]; methylaluminoxane (MMAO-07); trityl tetrakis(pentafluorophenyl)borate (trityl borate), and 2,6-di-tert-butyl-4-ethylphenol (BHEB). Methylaluminoxane (MMAO-07) and 2,6-di-tert-butyl-4-ethylphenol are premixed in-line and then combined with diphenylmethylene(cyclopentadienyl) (2,7-di-t-butylfuorenyl)hafnium dimethide and trityl tetrakis (pentafluoro-phenyl)borate just before entering the polymerization reactor (R1). The efficiency of the single site catalyst formulation was optimized by adjusting the mole ratios of the catalyst components and the R1 catalyst inlet temperature.

The following Ziegler-Matta (ZN) catalyst components were used to prepare the second ethylene copolymer in a second reactor (R2) configured in series to a first reactor (R1): butyl ethyl magnesium; tertiary butyl chloride; titanium tetrachloride; diethyl aluminum ethoxide; and triethyl aluminum. Methylpentane was used as the catalyst component solvent and the in-line Ziegler-Natta catalyst formulation was prepared using the following steps and then injected into the second reactor (R2). In step one, a solution of triethylaluminum and butyl ethyl magnesium (Mg:Al=20, mol:mol) was combined with a solution of tertiary butyl chloride and allowed to react for about 30 seconds to produce a $MgCl_2$ support. In step two, a solution of titanium tetrachloride was added to the mixture formed in step one and allowed to react for about 14 seconds prior to injection into second reactor (R2). The in-line Ziegler-Natta catalyst was activated in the reactor by injecting a solution of diethyl aluminum ethoxide into R2. The quantity of titanium tetrachloride added to the reactor is shown in Table 1. The efficiency of the in-line Ziegler-Natta catalyst formulation was optimized by adjusting the mole ratios of the catalyst components.

Polymerization in the continuous solution polymerization process was terminated by adding a catalyst deactivator to the second reactor exit stream. The catalyst deactivator used was octanoic acid (caprylic acid), commercially available from P&G Chemicals, Cincinnati, Ohio, U.S.A. The catalyst deactivator was added such that the moles of fatty acid added were 50% of the total molar amount of hafnium, titanium and aluminum added to the polymerization process; to be clear, the moles of octanoic acid added=0.5×(moles hafnium+moles titanium+moles aluminum).

A two-stage devolatilization process was employed to recover the ethylene copolymer composition from the process solvent, i.e. two vapor/liquid separators were used and the second bottom stream (from the second V/L separator) was passed through a gear pump/pelletizer combination. DHT-4V (hydrotalcite), supplied by Kyowa Chemical Industry Co. LTD, Tokyo, Japan was used as a passivator, or acid scavenger, in the continuous solution process. A slurry of DHT-4V in process solvent was added prior to the first V/L separator. The molar amount of DHT-4V added was 10-fold higher than the molar amount of tertiary butyl chloride and titanium tetrachloride added to the solution process.

Prior to pelletization the ethylene copolymer composition was stabilized by adding 500 ppm of Irganox 1076 (a primary antioxidant) and 500 ppm of Irgafos 168 (a secondary antioxidant), based on weight of the ethylene copolymer composition. Antioxidants were dissolved in process solvent and added between the first and second V/L separators.

Table 1 shows the reactor conditions used to make each of the inventive ethylene copolymer compositions. Table 1 includes process parameters, such as the ethylene and 1-octene splits between the reactors ($R_1$ and $R_2$), the reactor temperatures, the ethylene conversions, etc.

The properties of the inventive ethylene copolymer compositions (Inventive Examples 1-6) as well as those for several comparative resins (Comparative Examples 1-7) are shown in Table 2. Comparative Example 1 is ELITE® AT6202, a resin commercially available from the Dow Chemical Company. ELITE® AT6202 has a density of about 0.908 g/cm³ and a melt index 12 of about 0.83 dg/min. Comparative Example 2 is Affinity® PL 1840G, a resin commercially available from the Dow Chemical Company. Affinity® PL 1840G has a density of 0.909 g/cm³ and a melt index 12 of 0.88 dg/min. Comparative Example 3 is Queo® 1001, a resin commercially available from Borealis AG. Queo® 1001 has a density of 0.909 g/cm³ and a melt index 12 of 1.11 dg/min. Comparative Example 4 is EXCEED® 1012HA, a resin commercially available from ExxonMobil. EXCEED 1012HA has a density of about 0.912 g/cm³ and a melt index $I_2$ of about 0.98 dg/min. Comparative Example 5 is EXCEED® 3812, a resin commercially available from ExxonMobil. EXCEED 3812 has a density of about 0.911 g/cm³ and a melt index 12 of about 3.78 dg/min. Comparative Example 6 is a resin made according to U.S. Pat. Appl. Pub. No. 2016/0108221. Comparative Example 6 is an ethylene/1-octene copolymer, has a density of about 0.914 g/cm³, a melt index 12 of about 0.86 dg/min, and is made in a multi reactor solution process in which a first reactor and a second reactor are configured in series with one another. Comparative Example 7 is SURPASS® FPs317-A, a resin commercially available from the NOVA Chemicals Corporation. SURPASS® FPs317-A has a density of 0.917 g/cm³ and a melt index 12 of 3.83 dg/min.

Details of the inventive ethylene copolymer composition components: the first ethylene copolymer and the second ethylene copolymer, are provided in Table 3. The ethylene copolymer composition component properties shown in Table 3 were determined using a combination of CTREF analytical methods and calculations from a Polymerization Process Model (e.g. for the determination of SCB1, SCB2, d1 and d2, wt1 and wt2, Mw1, Mw2, Mn1, Mn2, $I_2^1$ and $I_2^2$).

Polymerization Process Model

For multicomponent (or bimodal resins) polyethylene polymers, the $M_w$, $M_n$, and $M_w/M_n$ were calculated herein, by using a reactor model simulation using the input conditions which were employed for actual pilot scale run conditions (for references on relevant reactor modeling methods, see "Copolymerization" by A. Hamielec, J. MacGregor, and A. Penlidis in *Comprehensive Polymer Science and Supplements*, volume 3, Chapter 2, page 17, Elsevier, 1996 and "Copolymerization of Olefins in a Series of Continuous Stirred-Tank Slurry-Reactors using Heterogeneous Ziegler-Natta and Metallocene Catalysts. I. General Dynamic Mathematical Model" by J. B. P Soares and A. E Hamielec in *Polymer Reaction Engineering*, 4(2&3), p 153, 1996.)

The model takes for input the flow of several reactive species (e.g. catalyst, monomer such as ethylene, comonomer such as 1-octene, hydrogen, and solvent) going to each reactor, the temperature (in each reactor), and the conversion of monomer (in each reactor), and calculates the polymer properties (of the polymer made in each reactor, i.e., the first and second ethylene copolymers) using a terminal kinetic model for continuously stirred tank reactors (CSTRs) connected in series. The "terminal kinetic model" assumes that the kinetics depend upon the monomer unit within the polymer chain on which the active catalyst site is located (see "Copolymerization" by A. Hamielec, J. MacGregor, and A. Penlidis in *Comprehensive Polymer Science and*

*Supplements*, Volume 3, Chapter 2, page 17, Elsevier, 1996). In the model, the copolymer chains are assumed to be of reasonably large molecular weight to ensure that the statistics of monomer/comonomer unit insertion at the active catalyst center is valid and that monomers/comonomers consumed in routes other than propagation are negligible. This is known as the "long chain" approximation.

The terminal kinetic model for polymerization includes reaction rate equations for activation, initiation, propagation, chain transfer, and deactivation pathways. This model solves the steady-state conservation equations (e.g., the total mass balance and heat balance) for the reactive fluid which includes the reactive species identified above.

The total mass balance for a generic CSTR with a given number of inlets and outlets is given by:

$$0 = \Sigma_i \dot{m}_i \quad (1)$$

where $\dot{m}_i$ represents the mass flow rate of individual streams with index i indicating the inlet and outlet streams.

Equation (1) can be further expanded to show the individual species and reactions:

$$0 = \frac{\sum_i m \dot{x}_{ij}/M_i}{\rho_{mix} V} + R_j/\rho_{mix} \quad (2)$$

where $M_i$ is the average molar weight of the fluid inlet or outlet (i), $x_{ij}$ is the mass fraction of species j in stream i, $\rho_{mix}$ is the molar density of the reactor mixture, V is the reactor volume, $R_j$ is the reaction rate for species j, which has units of kmol/m³s.

The total heat balance is solved for an adiabatic reactor and is given by:

$$0 = (\Sigma \dot{m}_i \Delta H_i + q_{Rx} V + \dot{W} - \dot{Q}) \quad (3)$$

where, $\dot{m}_i$ is the mass flow rate of stream i (inlet or outlet), $\Delta H_i$ is the difference in enthalpy of stream i versus a reference state, $q_{Rx}$ is the heat released by reaction(s), V is the reactor volume, $\dot{W}$ is the work input (i.e., agitator), $\dot{Q}$ is the heat input/loss.

The catalyst concentration input to each reactor is adjusted to match the experimentally determined ethylene conversion and reactor temperature values in order solve the equations of the kinetic model (e.g., propagation rates, heat balance and mass balance).

The H$_2$ concentration input to each reactor may be likewise adjusted so that the calculated molecular weight distribution of a polymer made over both reactors (and, hence, the molecular weight of polymer made in each reactor) matches that which is observed experimentally.

The weight fraction, wt1 and wt2 of material made in each reactor, R1 and R2, is determined from knowing the mass flow of monomer and comonomer into each reactor along with knowing the conversions for monomer and comonomer in each reactor calculated based on kinetic reactions.

The degree of polymerization (dp$_n$) for a polymerization reaction is given by the ratio of the rate of chain propagation reactions over the rate of chain transfer/termination reactions:

$$dp_n = \frac{k_{p11}\phi_1[m_1] + k_{p12}\phi_1[m_2] + k_{p21}\phi_2[m_2]}{k_{tm11}[m_1]\phi_1 + k_{tm12}[m_2]\phi_1 + k_{tm21}[m_2]\phi_2 + k_{ts1}\phi_1 + k_{ts2}\phi_2 + k_{tH1}[H] + k_{tH2}[H]} = \frac{R_p}{R_t} \quad (4)$$

where $k_{p12}$ is the propagation rate constant for adding monomer 2 to a growing polymer chain ending with monomer 1, $[m_1]$ is the molar concentration of monomer 1 (ethylene) in the reactor, $[m_2]$ is the molar concentration of monomer 2 (1-octene) in the reactor, $k_{tm12}$ the termination rate constant for chain transfer to monomer 2 for a growing chain ending with monomer 1, $k_{ts1}$ is rate constant for the spontaneous chain termination for a chain ending with monomer 1, $k_{tH1}$ is the rate constant for the chain termination by hydrogen for a chain ending with monomer 1. $\phi_1$ and $\phi_2$ and the fraction of catalyst sites occupied by a chain ending with monomer 1 or monomer 2 respectively.

The number average molecular weight (Mn) for a polymer follows from the degree of polymerization and the molecular weight of a monomer unit. From the number average molecular weight of polymer in a given reactor, and assuming a Flory-Schulz distribution for a single site catalyst, the molecular weight distribution is determined for the polymer using the following relationships.

$$w(n) = n\tau^2 e^{-\tau n} \quad (5)$$

where n is the number of monomer units in a polymer chain, w(n) is the weight fraction of polymer chains having a chain length n, and $\tau$ is calculated using the equation;

$$\tau = \frac{1}{dp_n} = \frac{R_t}{R_p}$$

where $dp_n$ is the degree of polymerization, $R_p$ is the rate of propagation and $R_t$ is the rate of termination.

The Flory-Schulz distribution can be transformed into the common log scaled GPC trace by applying:

$$\frac{dW}{d\log(M)} = \ln(10)\frac{n^2}{dp_n^2}e^{\left(-\frac{n}{dp_n}\right)} \text{ where } \frac{dW}{d\log(MW)} \quad (6)$$

is the differential weight fraction of polymer with a chain length n (n=MW/28 where 28 is the molecular weight of the polymer segment corresponding to a C$_2$H$_4$ unit) and $dp_n$ is the degree of polymerization.

Assuming a Flory-Schultz model, different moments of molecular weight distribution can be calculated using the following:

$$\mu_i = \int_0^\infty n^i W(n) dn$$

thus, $$\mu_0 = 1,$$

$$\mu_1 = dp_n, \text{ and}$$

$$\mu_2 = 2dp_n^2;$$

so, $$M_n = Mw_{monomer}\frac{\mu_1}{\mu_0} = Mw_{monomer}dp_n$$

$$M_w = Mw_{monomer}\frac{\mu_2}{\mu_1} = 2Mw_{monomer}dp_n$$

where Mw$_{monomer}$ is the molecular weight of the polymer segment corresponding to a C$_2$H$_4$ unit of monomer.

Alternatively, when a Ziegler-Natta catalyst is employed, the molecular weight distribution of the polymer made in a given reactor by a Ziegler-Natta catalyst, can be modeled as above but using the sum of four such single site catalyst sites, each of which is assumed to have a Flory-Schultz distribution. When considering the kinetics of the process model for a Zielger-Natta catalyst, the total amount of the Ziegler-Natta catalyst components fed to a reactor are known, and it is assumed that there is the same weight fraction of each of the four active catalyst sites modeled, but where each site has its own kinetics.

Finally, when a single site catalyst produces long chain branching, the molecular weight distribution is determined for the polymer using the following relationships (see "Polyolefins with Long Chain Branches Made with Single-Site Coordination Catalysts: A Review of Mathematical Modeling Techniques for Polymer Microstructure" by J. B. P Soares in *Macromolecular Materials and Engineering*, volume 289, Issue 1, Pages 70-87, Wiley-VCH, 2004 and "Polyolefin Reaction Engineering" by J. B. P Soares and T. F. L. McKenna Wiley-VCH, 2012).

$$w(n) = \frac{(1-\alpha)\tau_B e^{-\tau_B n}}{(1+\alpha)\sqrt{\alpha}} I_1\left(2\frac{\tau_B n \sqrt{\alpha}}{1+\alpha}\right)$$

where n is the number of monomer units in a polymer chain, w(n) is the weight fraction of polymer chains having a chain length n, and $\tau_B$ and $\alpha$ are calculated using equations below:

$$\tau_B = \frac{1}{dp_n^B} = \frac{R_t + R_{LCB}}{R_p}$$

$$\alpha = \frac{R_{LCB}}{R_p}$$

where $dp_n^B$ is degree of polymerization, $R_p$ is the rate propagation, $R_t$ is the rate of termination and $R_{LCB}$ is the rate of long chain branching formation calculated using equation below:

$$R_{LCB} = k_{p13}\phi_1[m_3]$$

where $k_{p13}$ is the propagation rate constant for adding monomer 3 (macromonomer which is formed in the reactor) to a growing polymer chain ending with monomer 1, $[m_3]$ is the molar concentration of macromonomer in the reactor.

The weight distribution can be transformed into the common log scaled GPC trace by applying:

$$\frac{dw}{d\log(M)} = \ln(10)\frac{(1-\alpha)\tau_B e^{-\tau_B n}}{(1+\alpha)\sqrt{\alpha}} I_1\left(2\frac{\tau_B n \sqrt{\alpha}}{1+\alpha}\right) \quad (7)$$

where $\frac{dW}{d\log(MW)}$ is the differential weight fraction of polymer with a chain length n (n=MW/28 where 28 is the molecular weight of the polymer segment corresponding to a $C_2H_4$ unit).

From the weight distribution, different moments of molecular weight distribution can be calculated using the following:

$$M_n = Mw_{monomer} dp_n^B \frac{1+\alpha}{1-\alpha}$$

$$M_w = 2Mw_{monomer} dp_n^B \frac{1+\alpha}{(1-\alpha)^2}$$

where $dp_n^B$ is degree of polymerization, and a is calculated as above.

TABLE 1

Reactor Operating Conditions

| Example No. | Inventive 1 | Inventive 2 | Inventive 3 | Inventive 4 | Inventive 5 | Inventive 6 |
|---|---|---|---|---|---|---|
| Total Solution Rate (TSR) (kg/h) | 551.1 | 525.0 | 549.9 | 550.0 | 500.0 | 500.0 |
| Ethylene Concentration (wt % overall) | 12.4 | 12.3 | 12.6 | 12.6 | 13.8 | 13.8 |
| Ethylene Split Between Reactors (R1/(R1 + R2) | 45.0 | 45.0 | 45.0 | 45.0 | 45.0 | 45.0 |
| 1-octene/ethylene (wt %) (total) | 0.930 | 1.051 | 0.780 | 0.670 | 0.919 | 0.638 |
| 1-Octene Split Between Reactors (R1/(R1 + R2)) | 0.20 | 0.20 | 0.20 | 0.28 | 0.25 | 0.33 |
| Polymer Production Rate in kg/h (by near infra-red) Reactor 1 (R1) | 60.5 | 57.2 | 61.3 | 61.3 | 63.1 | 63.0 |
| Total Solution Rate in R1 (kg/h) | 323.7 | 315.9 | 331.7 | 331.8 | 279.7 | 284.9 |
| Ethylene concentration (wt %) in R1 | 9.50 | 9.20 | 9.40 | 9.40 | 11.10 | 10.90 |
| 1-Octene/ethylene in fresh feed (g/g) | 0.38 | 0.43 | 0.32 | 0.39 | 0.43 | 0.41 |
| Primary Feed Inlet Temperature in R1 (° C.) | 30.0 | 30.0 | 30.0 | 30.0 | 30.0 | 30.0 |
| R1 Control temperature (° C.) | 137.8 | 135.0 | 136.1 | 135.9 | 154.0 | 154.0 |
| Ethylene conversion, by near infra-red, in R1 (%) | 80.04 | 80.16 | 79.86 | 80.09 | 80.00 | 80.00 |
| Hydrogen Feed (ppm) | 5.96 | 4.97 | 6.30 | 6.30 | 0.00 | 0.03 |
| Single Site Catalyst (ppm) to R1 | 0.33 | 0.40 | 0.32 | 0.32 | 0.30 | 0.29 |

TABLE 1-continued

Reactor Operating Conditions

| Example No. | Inventive 1 | Inventive 2 | Inventive 3 | Inventive 4 | Inventive 5 | Inventive 6 |
|---|---|---|---|---|---|---|
| SSC - Al/Hf (mol/mol) | 30.3 | 30.1 | 30.1 | 30.1 | 30.1 | 30.1 |
| SSC - BHEB/Al (mol/mol) | 0.40 | 0.41 | 0.56 | 0.42 | 0.44 | 0.41 |
| SSC - B/Hf (mol/mol) | 1.21 | 1.20 | 1.20 | 1.20 | 1.21 | 1.20 |
| R1 Diluent Temperature (° C.) | 29.3 | 35.1 | 38.2 | 32.3 | 30.4 | 31.0 |
| Reactor 2 (R2) | | | | | | |
| Total Solution Rate in R2 (kg/h) | 227.4 | 209.2 | 218.2 | 218.2 | 220.3 | 215.1 |
| Ethylene fresh feed to R2 concentration (wt %) | 16.53 | 16.98 | 17.46 | 17.46 | 17.23 | 17.64 |
| 1-Octene/ethylene in fresh feed (g/g) | 1.52 | 1.72 | 1.28 | 1.00 | 1.32 | 0.82 |
| Primary Feed Temperature in R2 (° C.) | 40.0 | 40.0 | 40.1 | 40.0 | 40.0 | 40.1 |
| R2 Control Temperature (° C.) | 182.0 | 179.9 | 182.2 | 181.9 | 202.1 | 202.0 |
| Ethylene conversion, by near infra-red, in R2 (%) | 81.95 | 82.03 | 82.07 | 81.99 | 86.57 | 86.50 |
| Hydrogen Feed (ppm) | 0.51 | 0.52 | 0.49 | 0.49 | 8.56 | 9.35 |
| Multi-Site Catalyst (Ti ppm) to R2 | 0.35 | 0.35 | 0.35 | 0.35 | 0.35 | 0.35 |
| ZN - tertbutylchloride/Mg (mol/mol) | 1.52 | 1.52 | 1.52 | 1.52 | 1.52 | 1.52 |
| ZN - diethyl aluminum ethoxide/Ti (mol/mol) | 1.35 | 1.35 | 1.35 | 1.35 | 1.35 | 1.35 |
| ZN - Mg/Ti (mol/mol) | 7.2 | 7.2 | 7.2 | 7.2 | 7.2 | 7.2 |
| R2 Diluent Temperature (° C.) | 32.8 | 37.2 | 40.0 | 35.2 | 33.8 | 34.3 |

TABLE 2

Polymer Properties

| Example No. | Inventive 1 | Inventive 2 | Inventive 3 | Inventive 4 | Inventive 5 | Inventive 6 |
|---|---|---|---|---|---|---|
| Density (g/cm$^3$) | 0.9082 | 0.9061 | 0.9128 | 0.9123 | 0.9067 | 0.9133 |
| Melt Index $I_2$ (g/10 min) | 0.85 | 0.82 | 0.84 | 0.76 | 3.66 | 3.56 |
| Melt Index $I_{21}$ (g/10 min) | 21.5 | 21.5 | 19.9 | 18.7 | 90 | 89 |
| Melt Flow Ratio ($I_{21}/I_2$) | 25.4 | 25.4 | 23.6 | 23.7 | 24.8 | 24.6 |
| Stress Exponent | 1.29 | 1.29 | 1.25 | 1.27 | 1.25 | 1.29 |
| $M_n$ | 41842 | 35726 | 37552 | 41197 | 31813 | 29624 |
| $M_w$ | 105477 | 101423 | 108775 | 115423 | 73637 | 74869 |
| $M_z$ | 212739 | 213447 | 229055 | 283932 | 134410 | 148528 |
| Polydispersity Index ($M_w/M_n$) | 2.52 | 2.92 | 2.9 | 2.8 | 2.31 | 2.53 |
| CTREF - High Temperature Elution Peak (° C.) | 95.7 | 95.9 | 95.8 | 95.8 | 95.4 | 95.6 |
| CTREF - CDBI$_{50}$ | 70.1 | 69.8 | 69.6 | 64.8 | 71.2 | 67.4 |
| CTREF - weight percent (wt %) eluting at from 90° C. to 105° C. | 8.9 | 9.5 | 10.6 | 11.8 | 5.5 | 8.5 |
| CTREF - $T^P_{CTREF}$ | 61.1 | 58.4 | 68.1 | 62.4 | 61.3 | 62.1 |
| Heat of Fusion (J/g) | 101.4 | 96.6 | 113.9 | 114.1 | 96 | 113.3 |
| Crystallinity (%) | 35 | 33.3 | 39.3 | 39.4 | 33.1 | 39.1 |
| Branch Freq/1000C | 21.5 | 23.5 | 17.9 | 18.5 | 24.1 | 19.2 |
| Comonomer | 1-octene | 1-octene | 1-octene | 1-octene | 1-octene | 1-octene |
| Comonomer Content (mole %) | 4.3 | 4.7 | 3.6 | 3.7 | 4.8 | 3.8 |
| Comonomer Content (wt %) | 15.3 | 16.5 | 12.9 | 13.3 | 16.9 | 13.8 |
| Ti (ppm) | 4.82 | 5.34 | 6.81 | 5.15 | 12.0 | 9.32 |
| Hf (ppm) | 0.316 | 0.410 | 0.324 | 0.323 | 0.219 | 0.243 |
| Melt Strength - 190° C. (cN) | 4.06 | 4.17 | 3.98 | 4.27 | 1.18 | 1.17 |

TABLE 2-continued

| Polymer Properties | | | | | | |
|---|---|---|---|---|---|---|
| LCBF | 0.00091 | 0.000877 | 0.00117 | 0.00143 | <0.001 | 0.000266 |
| Internal Unsaturation/100C | 0.006 | 0.007 | 0.005 | 0.005 | 0.008 | 0.007 |
| Side Chain Unsaturation/100C | 0.001 | 0.001 | 0 | 0 | 0.006 | 0.006 |
| Terminal Unsaturation/100C | 0.025 | 0.023 | 0.026 | 0.027 | 0.032 | 0.036 |

| Example No. | Comp. 1 | Comp. 2 | Comp. 3 | Comp. 4 | Comp. 5 | Comp. 6 | Comp. 7 |
|---|---|---|---|---|---|---|---|
| Density (g/cm$^3$) | 0.9081 | 0.9091 | 0.9093 | 0.9116 | 0.9113 | 0.9141 | 0.9173 |
| Melt Index I$_2$ (g/10 min) | 0.83 | 0.88 | 1.11 | 0.98 | 3.78 | 0.86 | 3.83 |
| Melt Index I$_{21}$ (g/10 min) | 25.8 | 30.4 | 41.2 | 16.4 | 63 | 6.2 | 93 |
| Melt Flow Ratio (I$_{21}$/I$_2$) | 29.9 | 34.7 | 36.2 | 16.7 | 16.7 | 19.5 | 22.7 |
| Stress Exponent | 1.34 | 1.48 | 1.48 | 1.13 | 1.12 | 22 | 1.2 |
| M$_n$ | 43351 | 42720 | 38112 | 48526 | 42934 | 43435 | 29105 |
| M$_w$ | 94385 | 81470 | 82272 | 101890 | 74382 | 108418 | 72510 |
| M$_z$ | 175746 | 136620 | 149535 | 167833 | 114940 | 231322 | 146082 |
| Polydispersity Index (M$_w$/M$_n$) | 2.18 | 1.91 | 2.16 | 2.1 | 1.73 | 2.5 | 2.49 |
| CTREF - High Temperature Elution Peak (° C.) | 78.1 | 75.9 | 88.4 | 92.5 | 92.6 | 95.9 | 94.5 |
| CTREF - CDBI$_{50}$ | 86.5 | 83.9 | 86.7 | 71.6 | 74.9 | 62 | 81.3 |
| CTREF - weight percent (wt %) eluting at from 90° C. to 105° C. | 0.1 | 0 | 0 | 3.9 | 1.5 | 14.5 | 4.6 |
| Heat of Fusion (J/g) | | 106.2 | 105.3 | 113.4 | 111.37 | 121.4 | 122.5 |
| Crystallinity (%) | | 36.61 | 36.3 | 39.1 | 38.4 | 41.8 | 42.25 |
| Branch Freq/1000C | 16.1 | 17.7 | 18.6 | 15.9 | 18.9 | 16.9 | 14.7 |
| Comonomer ID | 1-hexene | 1-octene | 1-octene | 1-hexene | 1-hexene | 1-octene | 1-octene |
| Comonomer Content (mole %) | 3.2 | 3.5 | 3.7 | 3.2 | 3.8 | 3.4 | 2.9 |
| Comonomer Content (wt %) | 9.1 | 12.8 | 13.4 | 9 | 10.6 | 12.3 | 10.8 |
| Ti (ppm) | | | | | | 8.06 | 0.227 |
| Hf (ppm) | | | | | | NA | NA |
| Melt Strength - 190° C. (cN) | 3.89 | 3.99 | 3.71 | 2.27 | 0.72 | 4.36 | 0.71 |
| LCBF | | | <0.001 | — | | <0.001 | |
| Internal Unsaturation/100C | 0.003 | 0.004 | 0.013 | 0.001 | 0.001 | 0.007 | 0.021 |
| Side Chain Unsaturation/100C | 0.002 | 0.001 | 0.011 | 0.001 | 0.003 | 0.004 | 0.003 |
| Terminal Unsaturation/100C | 0.006 | 0.008 | 0.01 | 0.009 | 0.007 | 0.028 | 0.007 |

TABLE 3

| Polyethylene Composition Component Properties | | | | | | |
|---|---|---|---|---|---|---|
| Example No. | Inv. 1 | Inv. 2 | Inv. 3 | Inv. 4 | Inv. 5 | Inv. 6 |
| The First Ethylene Copolymer | | | | | | |
| Catalyst Type 1 | Single Site Catalyst | Single Site Catalyst | Single Site Catalyst | Single Site Catalyst | Single Site Catalyst | Single Site Catalyst |
| weight fraction, wt$^1$ (wt %) | 0.43 | 0.43 | 0.43 | 0.45 | 0.41 | 0.43 |
| I$_2^1$ (g/10 min) | 0.25 $^e$ | 0.18 $^e$ | 0.24 $^e$ | 0.28 $^e$ | 1.23 $^e$ | 1.02 $^e$ |
| ρ$^1$ (g/cm$^3$) | 0.8968 $^c$ | 0.8945 $^c$ | 0.9018 $^c$ | 0.8974 $^c$ | 0.8967 $^c$ | 0.8971 $^c$ |
| Mn1 | 67039 | 72857 | 67588 | 65038 | 44565 | 46667 |
| Mw1 | 138736 | 150845 | 139807 | 134283 | 91859 | 96339 |
| Mw1/Mn1 | 2.07 | 2.07 | 2.07 | 2.06 | 2.06 | 2.06 |
| short chain branches per 1000 carbons (SCB1) | 27.49 $^a$ | 29.92 $^a$ | 22.70 $^a$ | 26.95 $^a$ | 27.64 $^a$ | 27.26 $^a$ |

TABLE 3-continued

Polyethylene Composition Component Properties

| Example No. | Inv. 1 | Inv. 2 | Inv. 3 | Inv. 4 | Inv. 5 | Inv. 6 |
|---|---|---|---|---|---|---|
| The Second Ethylene Copolymer | | | | | | |
| Catalyst Type 2 | Ziegler-Natta Catalyst | Ziegler-Natta Catalyst | Ziegler-Natta Catalyst | Ziegler-Natta Catalyst | Ziegler-Natta Catalyst | Ziegler-Natta Catalyst |
| weight fraction, $wt^2$ (wt %) | 0.57 | 0.57 | 0.57 | 0.55 | 0.59 | 0.57 |
| $I_2^2$ (g/10 min) | 1.72 [e] | 1.56 [e] | 1.62 [e] | 1.47 [e] | 8.65 [e] | 6.93 [e] |
| $\rho^2$ (g/cm$^3$) | 0.9169 [d] | 0.9150 [d] | 0.9212 [d] | 0.9243 [d] | 0.9138 [d] | 0.9254 [d] |
| Mn2 | 25640 | 26102 | 25909 | 26267 | 19384 | 20076 |
| Mw2 | 87053 | 89323 | 88458 | 90604 | 57146 | 60546 |
| Mw2/Mn2 | 3.40 | 3.42 | 3.41 | 3.45 | 2.95 | 3.02 |
| short chain branches per 1000 carbons (SCB2) | 16.91 [b] | 18.56 [b] | 14.22 [b] | 11.70 [b] | 21.60 [b] | 13.20 [b] |

[a] SCB1, the number of hexyl branches per thousand backbone carbon atoms of the first ethylene copolymer = 74.29−0.7598 ($T^P_{CTREF}$); where $T^P_{CTREF}$ is the peak elution temperature of the first ethylene copolymer in the CTREF chromatogram.
[b] SCB2, the number of hexyl branches per thousand backbone carbon atoms of the second ethylene copolymer is determined by considering the linear branch frequency rule and the respective weight fractions of the first and second ethylene copolymer components; SCB2 = (SCB overall − $wt^1$ * SCB1)/($wt^2$).
[c] $\rho^1 = (-a_1 - (a_1^2 - 4*a_0*(a_2 - (SCB1C6/1000C)))^{0.5})/(2*a_0)$; where $a_0 = 9341.81$, $a_1 = -17765.91$ and $a_2 = 8446.849$
[d] $\rho^2 = (\rho^f - wt^1*\rho^1)/(wt^2)$; where $\rho^1$, $\rho^2$ and $\rho^f$ are the densities of the first ethylene copolymer, the second ethylene copolymer and the overall (ethylene copolymer composition) density respectively, and $wt^1$ and $wt^2$ represent the respective weight fractions of the first and second ethylene copolymer components.
[e] Melt Index ($I_2$, dg/min): Log $I_2 = 7.8998042 - 3.9089344*\log(Mw/1000) - 0.27994391*Mn/Mw$; where Mw is weight average molecular weight of the respective component and Mn is number average molecular weight of the respective component (i.e. the first or the second ethylene copolymer) as determined by polymerization process modeling (See Polymerization Process Model section)..

The data in Table 2, clearly shows that in contrast to Comparative Examples 1-5, the Inventive Example ethylene copolymer compositions have more than 4 weight percent of material eluting at from 90 to 100° C. in a TREF analysis. The Inventive Example ethylene copolymer compositions also have more than 0.100 ppm of hafnium as well as more than 1 ppm of titanium present, whereas both Comparative Examples 6 and 7 which are made with a different catalyst system (one which does not employ a hafnium based polymerization catalyst) are expected to have zero ppm of hafnium present.

Blown Film (Monolayer)

Inventive ethylene copolymer compositions, Inventive Examples 1-4, having a melt index, $I_2$ of 1 g/10 min or less, as well as comparative resins, Comparative Examples 1, 2, 3, 4 and 6 having a melt index, $I_2$ of 1.11 g/10 min or less, were blown into monolayer film using a Gloucester Blown Film Line, with a Gloucester extruder, 2.5-inch (6.45 cm) barrel diameter, 24/1 L/D (barrel Length/barrel Diameter) equipped with: a barrier screw; a low pressure 4 inch (10.16 cm) diameter die with a 35 mil (0.089 cm) die gap, and; a Western Polymer Air ring. The die was coated with polymer processing aid (PPA) by spiking the line with a high concentration of PPA masterbatch to avoid melt fracture. The extruder was equipped with the following screen pack: 20/40/60/80/20 mesh. Blown films, of about 1.0 mil (25.4 μm) thick and 2.0 mil (50.8 μm) thick, at 2.5:1 Blow Up Ratio (BUR), were produced at a constant output rate of 100 lb/hr (45.4 kg/hr) by adjusting extruder screw speed, and; the frost line height was maintained at 16-18 inch (40.64-45.72 cm) by adjusting the cooling air. The monolayer 1-mil film produced with a blow-up ratio (BUR) of 2.5 were used for obtaining the physical properties of the films. The monolayer 2-mil film (BUR=2.5) was used for obtaining the cold-seal and hot tack profiles. Blown film processing conditions are provided in Table 4. Data for film blown from the ethylene copolymer compositions of the present disclosure is provided in Table 5, along with data for films made from various comparative resins. The film properties of the ethylene copolymer compositions of the present disclosure provided in Table 5, along with data for films made from various comparative resins are measured on 1-mil film (BUR=2.5) except for hot tack and cold seal properties. The hot tack test profiles for film blown from ethylene copolymer compositions of the present disclosure, along with those made from various comparative resins are given in FIG. 4.

TABLE 4

Blown Film Process Conditions

| Example No. | Inventive 1 | Inventive 2 | Inventive 3 | Inventive 4 |
|---|---|---|---|---|
| Blow Up Ratio | 2.5:1 | 2.5:1 | 2.5:1 | 2.5:1 |
| Layflat | 15.7 | 15.7 | 15.7 | 15.7 |
| Thickness (mil) | 1 | 1 | 1 | 1 |
| Output (lb/hr) | 100 | 100 | 100 | 100 |
| Melt Temperature (° F.) | 430 | 430 | 432 | 431 |
| Frost Line Height (inches) | 18 | 18 | 18 | 18 |
| Cooling Setting (Blower) (° C.) | 7 | 7 | 7 | 7 |
| Magnehelic (in-H2O) | 7.0 | 7.3 | 7.0 | 7.3 |
| Nip Pressure (psi) | 30 | 30 | 30 | 30 |
| Nip Roll Speed (ft/min) | 133 | 133 | 133 | 132 |
| Die Mill Gap (mils) | 35 | 35 | 35 | 35 |
| Extruder Current: (Amps) | 41 | 41 | 42 | 42 |
| Extruder Voltage: (Volts) | 197 | 195 | 201 | 199 |

TABLE 4-continued

| Blown Film Process Conditions | | | | |
|---|---|---|---|---|
| Extruder Pressure (psi) | 4502 | 4527 | 4537 | 4585 |
| Screw Speed (rpm) | 41 | 40 | 42 | 42 |
| Specific Output (lb/hr · rpm) × 10 | 24.4 | 25.0 | 23.8 | 23.8 |
| Power (kW) | 8.1 | 8.0 | 8.4 | 8.4 |
| Specific Energy (W/lb/hr) | 80.8 | 80.0 | 84.4 | 83.6 |

| Example No. | Comp. 1 | Comp. 2 | Comp. 3 | Comp. 4 | Comp. 6 |
|---|---|---|---|---|---|
| Blow Up Ratio | 2.5:1 | 2.5:1 | 2.5:1 | 2.5:1 | 2.5:1 |
| Layflat | 15.7 | 15.7 | 15.7 | 15.7 | 15.7 |
| Thickness (mil) | 1 | 1 | 1 | 1 | 1 |
| Output (lb/hr) | 100 | 100 | 100 | 100 | 100 |
| Melt Temperature (° F.) | 431 | 431 | 431 | 433 | 432 |
| Frost Line Height (inches) | 18 | 18 | 16 | 16 | 18 |
| Cooling Setting (Blower) (° C.) | 8 | 8 | 9 | 8 | 7 |
| Magnehelic (in-H2O) | 9.8 | 9.8 | 13.3 | 11.3 | 7.0 |
| Nip Pressure (psi) | 30 | 30 | 30 | 30 | 30 |
| Nip Roll Speed (ft/min) | 133 | 133 | 132 | 130 | 133 |
| Die Mill Gap (mils) | 35 | 35 | 35 | 35 | 35 |
| Extruder Current: (Amps) | 39 | 35 | 32 | 45 | 44 |
| Extruder Voltage: (Volts) | 199 | 195 | 181 | 183 | 219 |
| Extruder Pressure (psi) | 4002 | 3662 | 3404 | 4567 | 4905 |
| Screw Speed (rpm) | 42 | 41 | 39 | 37 | 46 |
| Specific Output (lb/hr · rpm) × 10 | 23.8 | 24.4 | 25.6 | 27.0 | 21.7 |
| Power (kW) | 8.1 | 6.2 | 5.8 | 8.2 | 9.6 |
| Specific Energy (W/lb/hr) | 81.3 | 61.9 | 57.9 | 82.4 | 96.4 |

TABLE 5

| Blown Film Properties | | | | |
|---|---|---|---|---|
| Example No. | Inventive 1 | Inventive 2 | Inventive 3 | Inventive 4 |
| Film Physical Properties | | | | |
| Thickness Profile Ave | 1.03 | 1.05 | 1.06 | 1.07 |
| Film Toughness | | | | |
| Dart Impact (g/mil) | 999 | 892 | 939 | 909 |
| Slow Puncture - Lube/Tef (J/mm) | 111 | 119 | 106 | 108 |
| Film Tear Resistance | | | | |
| Tear - MD (g/mil) | 229 | 217 | 220 | 270 |
| Tear - TD (g/mil) | 486 | 457 | 522 | 538 |
| Film Stiffness | | | | |
| 1% Sec Modulus - MD (Mpa) | 136 | 204 | 266 | 164 |
| 1% Sec Modulus - TD (Mpa) | 177 | 152 | 167 | 167 |
| 2% Sec Modulus - MD (Mpa) | 126 | 179.5 | 235 | 151 |
| 2% Sec Modulus - TD (Mpa) | 158 | 136 | 153 | 154 |
| Film Tensile Strength | | | | |
| Tensile Break Str - MD (Mpa) | 48.8 | 65.5 | 59.3 | 47.3 |
| Tensile Break Str - TD (Mpa) | 35.9 | 35.8 | 45.9 | 45.3 |
| Elongation at Break - MD (%) | 518 | 546 | 544 | 507 |
| Elongation at Break - TD (%) | 684 | 647 | 718 | 708 |
| Tensile Yield Str - MD (Mpa) | 7.6 | 8 | 10.7 | 8.9 |
| Tensile Yield Str - TD (Mpa) | 7.7 | 6.9 | 8.8 | 8.7 |
| Tensile Elong at Yield - MD (%) | 11 | 9 | 9 | 10 |
| Tensile Elong at Yield - TD (%) | 10 | 10 | 10 | 10 |

TABLE 5-continued

| Blown Film Properties | | | | |
|---|---|---|---|---|
| Film Optics | | | | |
| Gloss at 45° | 78 | 77 | 78 | 73 |
| Haze (%) | 3.4 | 3.6 | 3.5 | 4.5 |
| Cold Seal Properties - 2 mil film | | | | |
| S.I.T. @ 8.8 N Seal Strength (° C.) | 84.5 | 83.9 | 93.8 | 93.2 |
| Max Force (N) | 19.0 | 20.5 | 23.5 | 25.1 |
| Temp. @ Max Force (° C.) | 120 | 125 | 130 | 125 |
| Hot Tack Properties - 2 mil film | | | | |
| Hot Tack Onset Temperature @ 1.0 N (° C.) - 2 mil film | 71.5 | 61.5 | 83.8 | 83.9 |
| Maximum Hot Tack Strength (N) - 2 mil film | 4.5 | 4.3 | 5.0 | 4.6 |
| Hot Tack Window at 2.5 N, HTW (° C.) | 51.1 | 48.9 | 59.5 | 57.6 |

| Example No. | Comp. 1 | Comp. 2 | Comp. 3 | Comp. 4 | Comp. 6 |
|---|---|---|---|---|---|
| Film Physical Properties | | | | | |
| Thickness Profile Ave | 1.06 | 1.05 | 1.02 | 1.03 | 1.05 |
| Film Toughness | | | | | |
| Dart Impact (g/mil) | — | 685 | 708 | 1052 | 789 |
| Slow Puncture - Lube/Tef (J/mm) | 106 | 120 | 100 | 84 | 95 |
| Film Tear Resistance | | | | | |
| Tear - MD (g/mil) | — | 164 | 149 | 250 | 247 |
| Tear - TD (g/mil) | — | 459 | 380 | 565 | 575 |
| Film Stiffness | | | | | |
| 1% Sec Modulus - MD (Mpa) | 141 | 126 | 102 | 162.7 | 166 |
| 1% Sec Modulus - TD (Mpa) | 165 | 170 | 102 | 183.1 | 180 |
| 2% Sec Modulus - MD (Mpa) | 133 | 116 | 98 | 149.6 | 154 |
| 2% Sec Modulus - TD (Mpa) | 154 | 151 | 95 | 167.8 | 165 |
| Film Tensile Strength | | | | | |
| Tensile Break Str - MD (Mpa) | — | 57.8 | 53.2 | 61.7 | 52.7 |
| Tensile Break Str - TD (Mpa) | — | 49.8 | 48.1 | 58 | 767 |
| Elongation at Break - MD (%) | — | 553 | 543 | 599 | 557 |
| Elongation at Break - TD (%) | — | 759 | 762 | 762 | 10 |
| Tensile Yield Str - MD (Mpa) | — | 7.2 | 7.4 | 8.8 | 8.9 |
| Tensile Yield Str - TD (Mpa) | — | 7.5 | 7.3 | 9.2 | 9.1 |
| Tensile Elong at Yield - MD (%) | — | 11 | 15 | 10 | 10 |
| Tensile Elong at Yield - TD (%) | — | 10 | 38 | 10 | 10 |
| Film Optics | | | | | |
| Gloss at 45° | — | 69 | 69 | 82 | 80 |
| Haze (%) | 10 | 4.5 | 4.1 | 3.4 | 3.6 |
| Cold Seal Properties - 2 mil film | | | | | |
| S.I.T. @ 8.8 N Seal Strength (° C.) | 106.6 | 94.7 | 93.0 | 88.5 | 94.3 |
| Max Force (N) | 25.2 | 24.7 | 23.4 | 19.1 | 23.1 |
| Temp. @ Max Force (° C.) | 140 | 120 | 130 | 145 | 145 |

TABLE 5-continued

| Blown Film Properties | | | | | |
|---|---|---|---|---|---|
| Hot Tack Properties - 2 mil film | | | | | |
| Hot Tack Onset Temperature @ 1.0 N (° C.) - 2 mil film | 100.2 | 92.3 | 96.8 | 83.9 | 87.1 |
| Maximum Hot Tack Strength (N) - 2 mil film | 4.6 | 4.4 | 3.9 | 5.0 | 4.9 |
| Hot Tack Window at 2.5 N, HTW (° C.) | 39.4 | 27.1 | 11.7 | 37.5 | 32.2 |

Figure 4A:
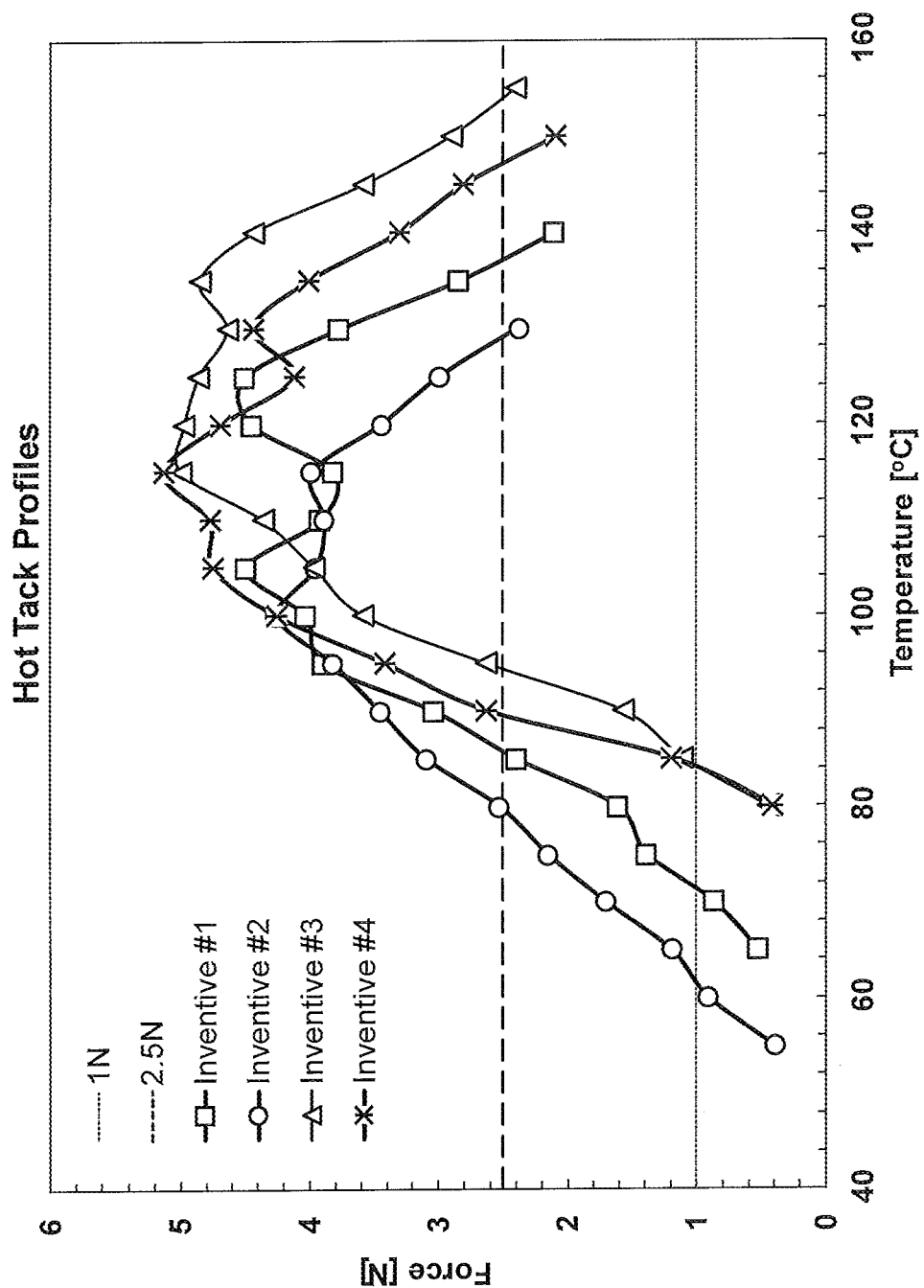
Figure 4B:
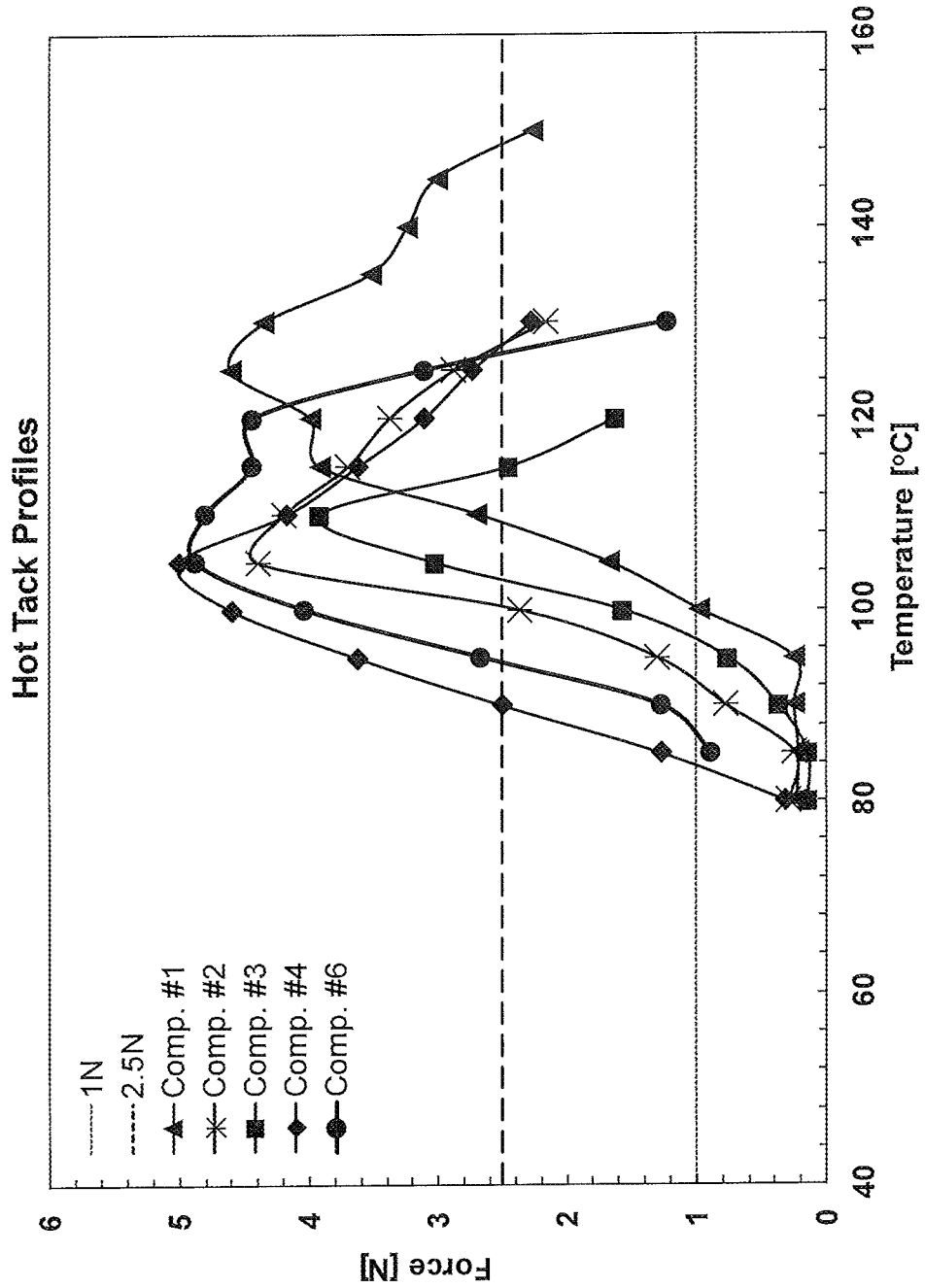
FIG. 4B shows the hot tack profiles for monolayer blown films made using comparative polyethylenes.

The data provided in Table 5 together with the data in FIG. 4 demonstrate that the inventive ethylene copolymer compositions (Inventive Examples 1-4) can be made into blown film having a good balance of properties, including good dart impact, good puncture resistance, and good sealing properties. For example, and with reference to FIG. 4, the blown films made from the inventive ethylene copolymer compositions (Inventive Examples 1-4) have good hot tack and cold seal performance.

Without wishing to be bound by theory, in the hot tack (or cold seal) profile (seal temperature vs. seal force), good hot tack (or cold seal) performance is indicated by an early (or low) hot tack (or cold seal) onset temperature, then a relatively high sealing force over a wide range of hot tack seal temperatures. See for example the shape of the curves in FIG. 4 for Inventive Examples 1-4, relative to Comparative Examples 1-4 and 6. The shape of the hot tack curves for Inventive Examples 1 and 2, are particularly good and have an early hot tack seal onset temperature combined by a high sealing force over a wide range of hot tack seal temperatures. In an effort to provide a more quantitatively measurement of this improved hot tack sealing performance, a new parameter, the "the hot-tack (strength) window" (the "hot tack window" or the "HTW") has been defined herein. In the present instance, the HTW is simply the range of temperature, in ° C. spanned by the hot tack curve at a seal strength of 2.5 Newtons. The larger the hot tack window, the greater the temperature window over which a high sealing force can be maintained or achieved.

As shown in Table 5 and in FIG. 4, the Inventive Examples 1, 2, 3 and 4 each have a HTW (at 2.5 N) of significantly greater than 40° C., whereas each of the Comparative Examples, 1-4, and 6 have a HTW (at 2.5N) of less than 40° C. The Inventive Examples 1-4 also have a relatively low hot tack onset temperature (HTOT), of below about 85° C.

Good cold seal properties are evidenced by data given in Table 5 for the Inventive Examples 1, 2, 3 and 4. From the data provided in Table 5, a person skilled in the art will recognize that the Inventive Examples 1, 2, 3 and 4 each have a relatively low cold seal initiation temperature (SIT), of below about 94° C.

In addition to the good sealing properties, the data in Table 5 shows that the Inventive Examples 1, 2, 3 and 4 have a superior combination of high dart impact values, low haze values and high puncture resistance values relative to the Comparative Examples 1-4 and 6.

Cast Film

Figure 5:
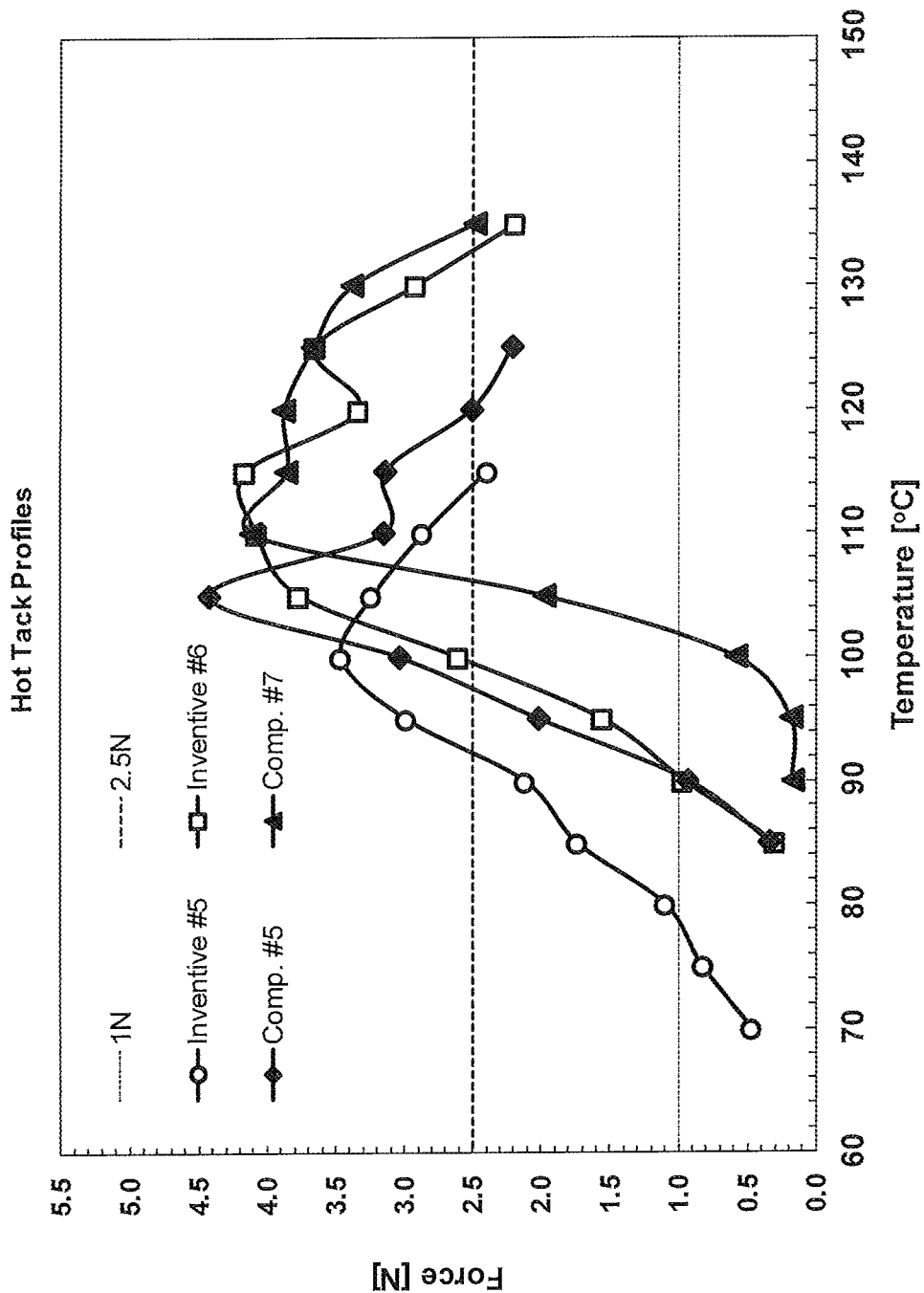
FIG. 5 shows the hot tack profiles for coextruded cast films made using the ethylene copolymer compositions made according to the present disclosure as well as those for comparative polyethylenes.

Inventive ethylene copolymer compositions, Inventive Examples 5 and 6, which have a melt index, $I_2$ of between 3 and 4 g/10 min, as well as comparative resins, Comparative Examples 5 and 7, which have a melt index, $I_2$ of between 3 and 4 g/10 min, were used to make coextruded cast film on a Gloucester cast film line. The coextruded films had a three layer A/B/A structure with A being the skin layer and B being the core layer, and where each layer was the same polymer. The extruder barrel and adapter temperatures are set to 380° F. and the die temperature is set to 400° F. The extruder was equipped with the following screen pack: 20/40/60/80/20 mesh. The casting roll and the cooling rolls are set at temperatures 90° F. and 80° F., respectively. Cast films, of about 0.8 mil (20.3 µm) thick, 2.0 mil (50.8 µm) thick, and 3.5 mil (88.9 µm) thick were produced by adjusting winder parameters as listed in Table 6. The cast film processing conditions are provided in Table 6. Data for a three layer cast film having a thickness of 0.8 mil and made from the ethylene copolymer compositions of the present disclosure (Inventive Examples 5 and 6) is provided in Table 7, along with data for a three layer cast film having a thickness of 0.8 mil and made from various comparative resins (Comparative Examples 5 and 7). Table 7 also includes cold seal and hot tack properties for three layer cast films having a thickness of 2 mil and made from the ethylene copolymer compositions of the present disclosure (Inventive Examples 5 and 6) along with cold seal and hot tack properties for a three layer cast film having a thickness of 2 mil and made from various comparative resins (Comparative Examples 5 and 7). The hot tack test profiles for a three layer cast film having a thickness of 2 mil and made from Inventive Examples 5 or 6, as well as Comparative Examples 5 or 7 are shown in FIG. 5.

TABLE 6

| Cast Film Process Conditions | | | | | | |
|---|---|---|---|---|---|---|
| Example No. | Inventive 5 | Inventive 5 | Inventive 5 | Inventive 6 | Inventive 6 | Inventive 6 |
| Core resin | Inventive 5 | Inventive 5 | Inventive 5 | Inventive 6 | Inventive 6 | Inventive 6 |
| Skin resin | Inventive 5 | Inventive 5 | Inventive 5 | Inventive 6 | Inventive 6 | Inventive 6 |
| Core % | 80 | 80 | 80 | 80 | 80 | 80 |
| Skin % | 20 | 20 | 20 | 20 | 20 | 20 |
| Coex structure | A/B/A | A/B/A | A/B/A | A/B/A | A/B/A | A/B/A |

TABLE 6-continued

Cast Film Process Conditions

| Extruders/Die | | | | | | |
|---|---|---|---|---|---|---|
| Die Gap (in) | 0.025 | 0.025 | 0.025 | 0.025 | 0.025 | 0.025 |
| Output (lbs/hr) | 462 | 462 | 462 | 452 | 452 | 452 |
| Melt Temperature Range (° F.) | 500-550 | 500-550 | 500-550 | 500-550 | 500-550 | 500-550 |
| Film thickness (mil) | 0.8 | 2 | 3.5 | 0.8 | 2 | 3.5 |
| Vacuum box | | | | | | |
| Primary chamber (rpm) | 660 | 660 | 660 | 660 | 660 | 660 |
| Pre-sweep chamber (rpm) | 1440 | 1440 | 1440 | 1440 | 1440 | 1440 |
| Winder | | | | | | |
| Line speed (fpm) | 800 | 310 | 180 | 800 | 310 | 180 |
| Swarp speed (fpm) | 808 | 311 | 179 | 807 | 311 | 178 |
| Layon speed (fpm) | 817 | 312 | 179 | 816 | 313 | 178 |
| Tension adj. pot | 2.58 | 2.58 | 2.58 | 2.58 | 2.58 | 2.58 |
| Taper adj. pot | 1.50 | 1.50 | 1.50 | 1.50 | 1.50 | 1.50 |
| Swarp tension pot | 2.40 | 2.40 | 2.40 | 2.40 | 2.40 | 2.40 |
| Layon draw adj.pot | 1.80 | 1.80 | 1.80 | 1.80 | 1.80 | 1.80 |
| Layon tession pot | 0.89 | 0.89 | 0.89 | 0.89 | 0.89 | 0.89 |
| Web width (in) | 18 | 18 | 18 | 18 | 18 | 18 |
| Roll width (in) | 26 | 26 | 26 | 24 | 25 | 24 |

| Example No. | Comp. 5 | Comp. 5 | Comp. 5 | Comp. 7 | Comp. 7 | Comp. 7 |
|---|---|---|---|---|---|---|
| Core resin | Comp. 5 | Comp. 5 | Comp. 5 | Comp. 7 | Comp. 7 | Comp. 7 |
| Skin resin | Comp. 5 | Comp. 5 | Comp. 5 | Comp. 7 | Comp. 7 | Comp. 7 |
| Core % | 80 | 80 | 80 | 80 | 80 | 80 |
| Skin % | 20 | 20 | 20 | 20 | 20 | 20 |
| Coex structure | A/B/A | A/B/A | A/B/A | A/B/A | A/B/A | A/B/A |
| Extruders/Die | | | | | | |
| Die Gap (in) | 0.025 | 0.025 | 0.025 | 0.025 | 0.025 | 0.025 |
| Output (lbs/hr) | 458 | 458 | 458 | 458 | 458 | 458 |
| Melt Temperature Range (° F.) | 500-550 | 500-550 | 500-550 | 500-550 | 500-550 | 500-550 |
| Film thickness (mil) | 0.8 | 2 | 3.5 | 0.8 | 2 | 3.5 |
| Vacuum box | | | | | | |
| Primary chamber (rpm) | 660 | 660 | 660 | 660 | 660 | 660 |
| Pre-sweep chamber (rpm) | 1440 | 1440 | 1440 | 1440 | 1440 | 1440 |
| Winder | | | | | | |
| Line speed (fpm) | 800 | 310 | 178 | 800 | 310 | 180 |
| Swarp speed (fpm) | 808 | 311 | 180 | 807 | 311 | 179 |
| Layon speed (fpm) | 816 | 312 | 180 | 816 | 312 | 180 |
| Tension adj. pot | 2.58 | 2.58 | 2.58 | 2.58 | 2.58 | 2.58 |
| Taper adj. pot | 1.50 | 1.50 | 1.50 | 1.50 | 1.50 | 1.50 |
| Swarp tension pot | 2.40 | 2.40 | 2.40 | 2.40 | 2.40 | 2.40 |
| Layon draw adj.pot | 1.80 | 1.80 | 1.80 | 1.80 | 1.80 | 1.80 |
| Layon tession pot | 0.89 | 0.89 | 0.89 | 0.89 | 0.89 | 0.89 |
| Web width (in) | 18 | 18 | 18 | 18 | 18 | 18 |
| Roll width (in) | 24 | 25 | 25 | 24 | 25 | 26 |

TABLE 7

Three Layer Coextruded Cast Film Properties

| Example No. | Inv. 5 | Inv. 6 | Comp. 5 | Comp. 7 |
|---|---|---|---|---|
| Film Thickness (mil) | 0.8/2 | 0.8/2 | 0.8/2 | 0.8/2 |
| Dart Impact (g/mil) | 580 | 569 | 610 | 396 |
| Slow Puncture - Lube/Tef (J/mm) | 117 | 88 | 105 | 80 |
| Tear - MD (g/mil) | 334 | 384 | 303 | 383 |
| Tear - TD (g/mil) | 673 | 626 | 520 | 536 |
| 1% Sec Modulus - MD (Mpa) | 74 | 100 | 83 | 125 |
| 1% Sec Modulus - TD (Mpa) | 69 | 124 | 82 | 202 |
| 2% Sec Modulus - MD (Mpa) | 72 | 99 | 81 | 118 |
| 2% Sec Modulus - TD (Mpa) | 68 | 119 | 83 | 151 |
| Tensile Break Strength - MD | 43.2 | 50 | 43.1 | 51.6 |
| Tensile Break Strength - TD | 40.2 | 41.8 | 38.8 | 44 |
| Elongation at Break - MD | 484 | 516 | 481 | 535 |
| Elongation at Break - TD | 719 | 732 | 701 | 730 |
| Tensile Yield Str - MD | 7.4 | 7.8 | 7.6 | 8.2 |
| Tensile Yield Str - TD | 7.4 | 7.7 | 7.5 | 7.8 |
| Tensile Elong at Yield - MD (%) | 10 | 10 | 10 | 11 |
| Tensile Elong at Yield - TD (%) | 10 | 10 | 10 | 10 |

TABLE 7-continued

Three Layer Coextruded Cast Film Properties

| Example No. | Inv. 5 | Inv. 6 | Comp. 5 | Comp. 7 |
|---|---|---|---|---|
| Film Opticals | | | | |
| Gloss at 45 (°) | 87 | 88 | 84 | 89 |
| Haze (%) | 0.8 | 1.2 | 2.6 | 1.5 |
| Cold Seal Properties - 2 mil film | | | | |
| S.I.T. @ 8.8 N Seal Strength (° C.) | 84.8 | 89.1 | 93.1 | 101.5 |
| Max Force (N) | 18.3 | 19.6 | 20.4 | 19.2 |
| Temp. @ Max Force (° C.) | 115 | 125 | 130 | 135 |
| Hot Tack Properties - 2 mil film | | | | |
| Hot Tack Onset Temperature @ 1.0 N (° C.) - 2 mil film | 79.1 | 90.3 | 90.3 | 101.8 |
| Maximum Hot Tack Strength (N) - 2 mil film | 3.5 | 4.1 | 4.4 | 4.1 |
| Hot Tack Window at 2.5 N, HTW (° C.) | 21.6 | 33.3 | 22.7 | 26.0 |

The data provided in Table 7 together with the data in FIG. 5 demonstrate that the Inventive ethylene copolymer compositions (Inventive Examples 5 and 6) can be made into a cast film structure having good sealing properties. For example, and with reference to Table 7 and FIG. 5, the three layer cast films made from the Inventive ethylene copolymer compositions (Inventive Examples 5 and 6) have good hot tack and cold seal performance. As shown in Table 7 and in FIG. 5, the Inventive Example 5 provided for superior (i.e. lower) hot tack onset temperature (HTOT) and superior (i.e. lower) seal initiation temperature (SIT) than either of the Comparative Examples 5 and 7: Inventive Example 5 gave a HTOT of less than about 80° C., while Comparative Examples 5 and 7 gave HTOT values of 90.3° C. and 101.8° C. respectively; Inventive Example 5 gave a SIT of less than about 90° C., while Comparative Examples 5 and 7 gave SIT values of 93.1° C. and 101.5° C. respectively. Also shown in Table 7 and in FIG. 5, is that the Inventive Example 6 provided a larger hot tack widow (HTW at 2.5 N) of over 30° C. when used in the cast film structure, while Comparative Examples 5 and 7 provided a hot tack window (HTW at 2.5N) of less than 30° C. when used in the cast film structure. Inventive Example 6 gave a SIT of just less than about 90° C., while Comparative Examples 5 and 7 gave SIT values of 93.1° C. and 101.5° C. respectively.

Blown Film (Multilayer)

Multilayer blown film was produced on a 9-layer line commercially available from Brampton Engineering (Brampton ON, Canada). The structure of the 9-layer films produced is shown in Table 8. Layer 1 contained either an inventive ethylene copolymer composition made according to the present disclosure or a comparative resin as a sealant layer. More specifically, layer 1 contained either 89.5 wt % of Inventive Example 1 or Inventive Example 2 or Comparative Example 6, 4.0 wt % of an antiblock masterbatch, 2.5 wt % of a slip masterbatch and 4.0 wt % of a processing aid masterbatch, such that layer 1 contained 6250 ppm of antiblock (silica (diatomaceous earth)), 1500 ppm of slip (eurcamide) and 1500 ppm of processing aid (fluoropolymer compound). Note that the additive masterbatch carrier resins were a LLDPE which had a melt index, $I_2$ of about 2.0 g/10 min, and a density of about 0.918 g/cc. Layer 1 was the insider layer, i.e. inside the bubble as the multilayer film was produced on the blown film line. The total thickness of the 9 layer film was held constant at 3.5-mil; the thickness of layer 1 was 0.525 mil (13.3 μm), i.e. 15% of 3.5 mil (see Table 8). Layers 2, 5, and 8 contained SURPASS® HPs167-AB a high density polyethylene resin available from NOVA Chemicals Corporation having a density of about 0.967 g/cc and a melt index, $I_2$ of about 1.20 dg/min. Layers 3, 4, 6 and 7 contained SCLAIR® FP120-C an ethylene/1-octene copolymer resin available from NOVA Chemicals Corporation having a density of about 0.920 g/cc and a melt index, $I_2$ of about 1 dg/min. Layer 9 contained as a sealant resin, SCLAIR® 19C a high density polyethylene resin available from NOVA Chemicals Corporation having a density of about 0.958 g/cc and a melt index 12 of about 0.95 dg/min. More specifically, layer 9 contained 97.0 wt % of the sealant resin, 3.0 wt % of an antiblock masterbatch such that layer 9 contained 6250 ppm of antiblock (silica (diatomaceous earth)). The multilayer die technology consisted of a pan-cake die, FLEX-STACK Co-extrusion die (SCD), with flow paths machined onto both sides of a plate, the die tooling diameter was 6.3-inches, in this disclosure a die gap of 85-mil was used consistently, film was produced at a Blow-Up-Ratio (BUR) of 2.5 and the output rate of the line was held constant at 250 lb/hr. The specifications of the nine extruders was as follows: screws 1.5-in diameter, 30/1 length to diameter ratio, 7-polyethylene screws with single flights and Madddox mixers, 2-Nylon screws, extruders were air cooled, equipped with 20-H.P. motors and all extruders were equipped with gravimetric blenders. The nip and collapsing frame included a Decatex horizontal oscillating haul-off and pearl cooling slats just below the nips. The line was equipped with a turret winder and oscillating slitter knives.

The sealing properties of the nine layer blown films (having a thickness of 3.5 mil) made as described above are provided in Table 9. The hot tack test profiles of the nine layer blown films are shown in FIG. 6.

TABLE 8

Multilayer Blown Film Structure

| | wt. % of the | Materials and Weight % in Each Layer | | | |
|---|---|---|---|---|---|
| Layer | 9-layer | Material A | | Material B | |
| Number | structure | Material | wt. % | Material | wt. % |
| Layer 9 | 5 | 19C | 97 | Additive Masterbatches | 3.0 |
| Layer 8 | 10 | HPs167-AB | 100 | | |
| Layer 7 | 12 | FP120-C | 100 | | |
| Layer 6 | 13 | FP120-C | 100 | | |
| Layer 5 | 10 | HPs167-AB | 100 | | |
| Layer 4 | 13 | FP120-C | 100 | | |
| Layer 3 | 12 | FP120-C | 100 | | |
| Layer 2 | 10 | HPs167-AB | 100 | | |
| Layer 1 | 15 | Inv. 1 or Inv. 2 or Comp. 6 | 89.5 | Additive Masterbatches | 10.5 |

TABLE 9

Sealing Properties of 3.5 Mil, Multilayer Blown Film Structure

| Example No. Used in Layer 1 | Hot Tack Onset Temperature @ 1.0 N (° C.) | Maxim Hot Tack Strength (N) | Hot Tack Window at 5 N, HTW (° C.) | S.I.T. @ 8.8 N Seal Strength (° C.) |
|---|---|---|---|---|
| Inventive 1 | 76.1 | 9.4 | 64.8 | 85.7 |
| Inventive 2 | 80.7 | 9.1 | 61.9 | 90.0 |
| Comp. 6 | 92.8 | 7.5 | 49.6 | 101.1 |

The data provided in Table 9 together with the data in FIG. 6 demonstrate that when the inventive ethylene copolymer compositions are used as a sealant layer (layer 1) in a multilayer blown film structure, the structure has improved sealing properties. When used as the sealant layer, Inventive Examples 1 and 2 provided for superior (i.e. lower) hot tack onset temperature (HTOT) and superior (i.e. lower) seal initiation temperature (SIT) than Comparative Example 6: Inventive Examples 1 and 2 gave a HTOT of less than about 81° C., while Comparative Example 6 gave HTOT value of 92.8; Inventive Examples 1 and 2 gave SIT values of about 90° C. or less, while Comparative Example 6 gave an SIT value of 101.1° C. Also shown in Table 9 and in FIG. 6, is that when used in the sealant layer 1 of the multilayer film structure, the Inventive Examples 1 and 2 provided for a larger hot tack widow (HTW at 5 N), of over 60° C., while Comparative Example 6 provided a hot tack window value of less about 50° C. The Inventive Examples 1 and 2 also lead to a higher maximum hot tack strength at greater than about 9 N, while Comparative Example 6 gave a maximum hot tack strength of 7.5 N.

Without wishing to be bound by theory, the superior hot tack properties afforded by the inventive ethylene copolymer compositions are desired in high speed vertical and horizontal form-fill-seal processes where a product (liquid, solid, paste, part, etc.) is loaded and sealed inside a pouch-like package. Generally, the packaging industry prefers ethylene copolymer compositions (e.g. for use as sealant resins) that have broad hot tack windows, as such products may consistently produce leak-proof packages as various parameters are changed on the packaging equipment. Further, it is desirable that the Hot Tack Onset temperature (HTOT (° C.)) occurs at the lowest possible temperature. Also desirable is a high hot tack seal strength at high temperatures, such that the seal strength remains sufficient at a range of elevated temperatures. In contrast, the use of a resin with poor hot tack properties can limit the packaging line production rate. Finally, in addition to the forgoing, it is desirable to have lower seal initiation temperature (SIT) for end use applications.

Non-limiting embodiments of the present disclosure include the following:

Embodiment A

An ethylene copolymer composition including:
(i) from 20 to 80 weight percent of a first ethylene copolymer having a density of from 0.855 to 0.913 g/cm$^3$; a molecular weight distribution, $M_w/M_n$ of from 1.7 to 2.3; and a melt index, $I_2$ of from 0.1 to 20 g/10 min;
(ii) from 80 to 20 weight percent of a second ethylene copolymer having a density of from 0.875 to 0.936 g/cm$^3$; a molecular weight distribution, $M_w/M_n$ of from 2.3 to 6.0; and a melt index, $I_2$ of from 0.3 to 100 g/10 min; and
(iii) from 0 to 40 weight percent of a third ethylene copolymer;
wherein the number of short chain branches per thousand carbon atoms in the first ethylene copolymer (SCB1) is greater than the number of short chain branches per thousand carbon atoms in the second ethylene copolymer (SCB2);
wherein the density of the second ethylene copolymer is equal to or greater than the density of the first ethylene copolymer;
wherein the ethylene copolymer composition has a density of from 0.865 to 0.913 g/cm$^3$; a melt index, $I_2$ of from 0.5 to 10 g/10 min; and a fraction eluting at from 90 to 105° C., having an integrated area of greater than 4 weight percent, in a CTREF analysis;
wherein the ethylene copolymer composition has at least 0.0015 parts per million (ppm) of hafnium;
wherein the weight percent of the first, second or third ethylene copolymer is defined as the weight of the first, second or the third ethylene copolymer divided by the weight of the sum of (i) the first ethylene copolymer, (ii) the second ethylene copolymer and (iii) the third ethylene copolymer, multiplied by 100%.

Embodiment B

The ethylene copolymer composition according to Embodiment A having a molecular weight distribution of from 2.2 to 5.0.

Embodiment C

The ethylene copolymer composition according to Embodiment A or B having a melt flow ratio, I21/I2 of from 20 to 50.

Embodiment D

The ethylene copolymer composition according to Embodiment A, B, or C wherein the first ethylene copolymer has from 10 to 50 short chain branches per thousand carbon atoms (SCB1).

Embodiment E

The ethylene copolymer composition according to Embodiment A, B, C or D wherein the second ethylene copolymer has from 3 to 25 short chain branches per thousand carbon atoms (SCB2).

Embodiment F

The ethylene copolymer composition according to Embodiment A, B, C, D or E wherein the first ethylene copolymer is present in from 30 to 55 weight percent.

Embodiment G

The ethylene copolymer composition according to Embodiment A, B, C, D, E or F wherein the second ethylene copolymer is present in from 70 to 45 weight percent.

Embodiment H

The ethylene copolymer composition according to Embodiment A, B, C, or D wherein the first ethylene copolymer is present in from 30 to 55 weight percent; the second ethylene copolymer is present in from 70 to 45 weight percent; and the third ethylene copolymer is present in 0 weight percent.

Embodiment I

The ethylene copolymer composition according to Embodiment A, B, C, D, E, F, G or H having a composition distribution breadth index, $CDBI_{50}$ of from 50 to 75 weight percent.

Embodiment J

The ethylene copolymer composition according to Embodiment A, B, C, D, E, F, G, H, or I having a dimensionless long chain branching factor, LCBF≥0.001.

Embodiment K

The ethylene copolymer composition according to Embodiment A, B, C, D, E, F, G, H, I or J having at least 3 mole percent of one or more than one alpha-olefin.

Embodiment L

The ethylene copolymer composition according to Embodiment A, B, C, D, E, F, G, H, I or J having from 3 to 10 mole percent of one or more than one alpha-olefin.

Embodiment M

The ethylene copolymer composition according to Embodiment A, B, C, D, E, F, G, H, I or J having from 3 to 8 mole percent of one or more than one alpha-olefin.

Embodiment N

The ethylene copolymer composition according to Embodiment A, B, C, D, E, F, G, H, I, J, K, L or M wherein said one or more than one alpha-olefin is selected from the group including 1-hexene, 1-octene and mixtures thereof.

Embodiment O

The ethylene copolymer composition according to Embodiment A, B, C, D, E, F, G, H, I, J, K, L or M wherein said one or more than one alpha-olefin is 1-octene.

Embodiment P

The ethylene copolymer composition according to Embodiment A, B, C, D, E, F, G, H, I, J, K, L, M, N or O wherein the first ethylene copolymer is a made with a single site catalyst.

Embodiment Q

The ethylene copolymer composition according to Embodiment A, B, C, D, E, F, G, H, I, J, K, L, M, N, O or P wherein the second ethylene copolymer is a made with a Ziegler-Natta catalyst system.

Embodiment R

The ethylene copolymer composition according to Embodiment A, B, C, D, E, F, G, H, I, J, K, L, M, N, O, P or Q wherein the third ethylene copolymer is a made with a Ziegler-Natta catalyst system.

Embodiment S

The ethylene copolymer composition according to Embodiment A, B, C, D, E, F, G, H, I, J, K, L, M, N, O, P or Q wherein the third ethylene copolymer is a made with a with a single site catalyst.

Embodiment T

The ethylene copolymer composition according to Embodiment A, B, C, D, E, F, G, H, I, J, K, L, M, N, O, P, Q, R, or S wherein the first ethylene copolymer is a made with a single site catalyst system including a metallocene catalyst having the formula (I):

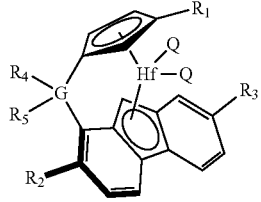

wherein G is a group 14 element selected from carbon, silicon, germanium, tin or lead; $R_1$ is a hydrogen atom, a $C_{1-20}$ hydrocarbyl radical, a $C_{1-20}$ alkoxy radical or a $C_{6-10}$ aryl oxide radical; $R_2$ and $R_3$ are independently selected from a hydrogen atom, a $C_{1-20}$ hydrocarbyl radical, a $C_{1-20}$ alkoxy radical or a $C_{6-10}$ aryl oxide radical; $R_4$ and $R_5$ are independently selected from a hydrogen atom, an unsubstituted $C_{1-20}$ hydrocarbyl radical, a substituted $C_{1-20}$ hydrocarbyl radical, a $C_{1-20}$ alkoxy radical or a $C_{6-10}$ aryl oxide radical; and Q is independently an activatable leaving group ligand.

Embodiment U

The ethylene copolymer composition according to Embodiment A, B, C, D, E, F, G, H, I, J, K, L, M, N, O, P, Q, R, S or T wherein the first ethylene copolymer has a composition distribution breadth index, $CDBI_{50}$ of at least 75 weight percent.

Embodiment V

The ethylene copolymer composition according to Embodiment A, B, C, D, E, F, G, H, I, J, K, L, M, N, O, P, Q, R, S, T or U wherein the second ethylene copolymer has a composition distribution breadth index, $CDBI_{50}$ of less than 75 weight percent.

Embodiment W

The ethylene copolymer composition of Embodiment A, B, C, D, E, F, G, H, I, J, K, L, M, N, O, P, Q, R, S, T, U or V wherein the first ethylene copolymer is a homogeneously branched ethylene copolymer.

Embodiment X

The ethylene copolymer composition of Embodiment A, B, C, D, E, F, G, H, I, J, K, L, M, N, O, P, Q, R, S, T, U, V or W wherein the second ethylene copolymer is a heterogeneously branched ethylene copolymer.

Embodiment Y

The ethylene copolymer composition according to Embodiment A, B, C, D, E, F, G, H, I, J, K, L, M, N, O, P, Q, R, S, T, U, V, W or X wherein the second ethylene copolymer has a $M_w/M_n$ of from 2.5 to 5.0.

Embodiment Z

The ethylene copolymer composition according to Embodiment A, B, C, D, E, F, G, H, I, J, K, L, M, N, O, P, Q, R, S, T, U, V, W, X or Y having from 0.050 parts per million (ppm) to 2.5 ppm of hafnium.

Embodiment AA

The ethylene copolymer composition according to Embodiment A, B, C, D, E, F, G, H, I, J, K, L, M, N, O, P, Q, R, S, T, U, V, W, X, Y or Z having from 0.50 ppm to 14.0 parts per million (ppm) of titanium.

Embodiment BB

The ethylene copolymer composition according to Embodiment A, B, C, D, E, F, G, H, I, J, K, L, M, N, O, P, Q, R, S, T, U, V, W, X, Y, Z or AA wherein the third ethylene copolymer is present in from 5 to 30 weight percent.

Embodiment CC

The ethylene copolymer composition according to Embodiment A or BB wherein the third ethylene copolymer has a density of from 0.865 to 0.945 g/cm$^3$; a molecular weight distribution, $M_w/M_n$ of from 2.0 to 6.0; and a melt index, $I_2$ of from 0.3 to 200 g/10 min.

Embodiment DD

A film layer including an ethylene copolymer composition, the ethylene copolymer composition including:
(i) from 20 to 80 weight percent of a first ethylene copolymer having a density of from 0.855 to 0.913 g/cm$^3$; a molecular weight distribution, $M_w/M_n$ of from 1.7 to 2.3; and a melt index, $I_2$ of from 0.1 to 20 g/10 min;
(ii) from 80 to 20 weight percent of a second ethylene copolymer having a density of from 0.875 to 0.936 g/cm$^3$; a molecular weight distribution, $M_w/M_n$ of from 2.3 to 6.0; and a melt index, $I_2$ of from 0.3 to 100 g/10 min; and
(iii) from 0 to 40 weight percent of a third ethylene copolymer;
wherein the number of short chain branches per thousand carbon atoms in the first ethylene copolymer (SCB1) is greater than the number of short chain branches per thousand carbon atoms in the second ethylene copolymer (SCB2);
wherein the density of the second ethylene copolymer is equal to or greater than the density of the first ethylene copolymer;
wherein the ethylene copolymer composition has a density of from 0.865 to 0.913 g/cm$^3$; a melt index, $I_2$ of from 0.5 to 10 g/10 min; and a fraction eluting at from 90 to 105° C., having an integrated area of greater than 4 weight percent, in a CTREF analysis;
wherein the ethylene copolymer composition has at least 0.0015 parts per million (ppm) of hafnium;
wherein the weight percent of the first, second or third ethylene copolymer is defined as the weight of the first, second or the third ethylene copolymer divided by the weight of the sum of (i) the first ethylene copolymer, (ii) the second ethylene copolymer and (iii) the third ethylene copolymer, multiplied by 100%.

Embodiment EE

The film layer according to Embodiment DD wherein the film layer is a blown film.

Embodiment FF

The film layer according to Embodiment DD or EE having a hot tack window (HTW) of at least 45° C. when measured at a film thickness of about 2 mil.

Embodiment GG

The film layer according to Embodiment DD, EE, or FF having a seal initiation temperature (SIT) of less than 95° C. when measured at a film thickness of about 2 mil.

Embodiment HH

The film layer according to Embodiment DD, EE, FF or GG having a hot tack onset temperature (HTOT) of less than 88° C. when measured at a film thickness of about 2 mil.

Embodiment II

The film layer according to Embodiment DD, EE, FF, GG or HH having a dart impact strength of at least 800 g/mil when measured at a film thickness of about 1 mil.

Embodiment JJ

The film layer according to Embodiment DD, EE, FF, GG, HH or II having a slow puncture resistance value of at least 100 J/mm when measured at a film thickness of about 1 mil.

Embodiment KK

The film layer according to Embodiment DD, EE, FF, GG, HH, II or JJ having a haze value of less than 6% when measured at a film thickness of about 1 mil.

Embodiment LL

The film layer according to Embodiment DD wherein the film layer is a cast film.

Embodiment MM

A multilayer film structure including at least one film layer including an ethylene copolymer composition, the ethylene copolymer composition including:
(i) from 20 to 80 weight percent of a first ethylene copolymer having a density of from 0.855 to 0.913 g/cm$^3$; a molecular weight distribution, $M_w/M_n$ of from 1.7 to 2.3; and a melt index, $I_2$ of from 0.1 to 20 g/10 min;
(ii) from 80 to 20 weight percent of a second ethylene copolymer having a density of from 0.875 to 0.936 g/cm$^3$; a molecular weight distribution, $M_w/M_n$ of from 2.3 to 6.0; and a melt index, $I_2$ of from 0.3 to 100 g/10 min; and
(iii) from 0 to 40 weight percent of a third ethylene copolymer;
wherein the number of short chain branches per thousand carbon atoms in the first ethylene copolymer (SCB1) is greater than the number of short chain branches per thousand carbon atoms in the second ethylene copolymer (SCB2);
wherein the density of the second ethylene copolymer is equal to or greater than the density of the first ethylene copolymer;
wherein the ethylene copolymer composition has a density of from 0.865 to 0.913 g/cm$^3$; a melt index, $I_2$ of from 0.5 to 10 g/10 min; and a fraction eluting at from 90 to 105°

C., having an integrated area of greater than 4 weight percent, in a CTREF analysis;

wherein the ethylene copolymer composition has at least 0.0015 parts per million (ppm) of hafnium;

wherein the weight percent of the first, second or third ethylene copolymer is defined as the weight of the first, second or the third ethylene copolymer divided by the weight of the sum of (i) the first ethylene copolymer, (ii) the second ethylene copolymer and (iii) the third ethylene copolymer, multiplied by 100%.

Embodiment NN

The multilayer film structure according to Embodiment MM wherein the at least one film layer is a blown film.

Embodiment OO

The multilayer film structure according to Embodiment NN wherein the at least one film layer has a hot tack window (HTW) of at least 45° C. when measured at a film thickness of about 2 mil.

Embodiment PP

The multilayer film structure according to Embodiment NN or OO wherein the at least one film layer has a seal initiation temperature (SIT) of less than 95° C. when measured at a film thickness of about 2 mil.

Embodiment QQ

The multilayer film structure according to Embodiment NN, OO or PP wherein the at least one film layer has a hot tack onset temperature (HTOT) of less than 88° C. when measured at a film thickness of about 2 mil.

Embodiment RR

The multilayer film structure according to Embodiment NN, OO, PP or QQ wherein the at least one film layer has a dart impact strength of at least 800 g/mil when measured at a film thickness of about 1 mil.

Embodiment SS

The multilayer film structure according to Embodiment NN, OO, PP, QQ or RR wherein the at least one film layer has a slow puncture resistance value of at least 100 J/mm when measured at a film thickness of about 1 mil.

Embodiment TT

The multilayer film structure according to Embodiment NN, OO, PP, QQ, RR or SS wherein the at least one film layer has a haze value of less than 6% when measured at a film thickness of about 1 mil.

Embodiment UU

The multilayer film structure according to Embodiment MM, NN, OO, PP, QQ, RR, SS or TT wherein the film structure has at least three film layers.

Embodiment W

The multilayer film structure according to Embodiment MM, NN, OO, PP, QQ, RR, SS or TT wherein the film structure has at least five film layers.

Embodiment WW

The multilayer film structure according to Embodiment MM, NN, OO, PP, QQ, RR, SS or TT wherein the film structure has at least seven film layers.

Embodiment XX

The multilayer film structure according to Embodiment MM, NN, OO, PP, QQ, RR, SS or TT wherein the film structure has at least nine film layers.

Embodiment YY

The multilayer film structure according to Embodiment MM, NN, OO, PP, QQ, RR, SS or TT wherein the film structure has 9 layers.

Embodiment ZZ

The multilayer film structure according to Embodiment MM, NN, OO, PP, QQ, RR, SS, TT, UU, VV, WW, XX or YY where the at least one film layer is at least one sealant layer in the multilayer film structure.

Embodiment AAA

The multilayer film structure according to Embodiment MM wherein the at least one film layer is a cast film.

Embodiment BBB

The multilayer film structure according to Embodiment AAA having a seal initiation temperature (SIT) of less than 90° C. when measured at a film thickness of about 2 mil.

Embodiment CCC

A multilayer film structure including a sealant layer, the sealant layer including an ethylene copolymer composition, the ethylene copolymer composition including:

(i) from 20 to 80 weight percent of a first ethylene copolymer having a density of from 0.855 to 0.913 g/cm³; a molecular weight distribution, $M_w/M_n$ of from 1.7 to 2.3; and a melt index, $I_2$ of from 0.1 to 20 g/10 min;

(ii) from 80 to 20 weight percent of a second ethylene copolymer having a density of from 0.875 to 0.936 g/cm³; a molecular weight distribution, $M_w/M_n$ of from 2.3 to 6.0; and a melt index, $I_2$ of from 0.3 to 100 g/10 min; and (iii) from 0 to 40 weight percent of a third ethylene copolymer;

wherein the number of short chain branches per thousand carbon atoms in the first ethylene copolymer (SCB1) is greater than the number of short chain branches per thousand carbon atoms in the second ethylene copolymer (SCB2);

wherein the density of the second ethylene copolymer is equal to or greater than the density of the first ethylene copolymer;

wherein the ethylene copolymer composition has a density of from 0.865 to 0.913 g/cm³; a melt index, $I_2$ of from 0.5 to 10 g/10 min; and a fraction eluting at from 90 to 105° C., having an integrated area of greater than 4 weight percent, in a CTREF analysis;

wherein the ethylene copolymer composition has at least 0.0015 parts per million (ppm) of hafnium;

wherein the weight percent of the first, second or third ethylene copolymer is defined as the weight of the first, second or the third ethylene copolymer divided by the weight of the sum of (i) the first ethylene copolymer, (ii) the second ethylene copolymer and (iii) the third ethylene copolymer, multiplied by 100%.

Embodiment DDD

The multilayer film structure according to Embodiment CCC wherein the film structure has at least three film layers.

Embodiment EEE

The multilayer film structure according to Embodiment CCC wherein the film structure has at least five film layers.

Embodiment FFF

The multilayer film structure according to Embodiment CCC wherein the film structure has at least seven film layers.

Embodiment GGG

The multilayer film structure according to Embodiment CCC wherein the film structure has at least nine film layers.

Embodiment HHH

The multilayer film structure according to Embodiment CCC wherein the film structure has 9 layers.

What is claimed is:

1. An ethylene copolymer composition comprising:
   (i) from 20 to 80 weight percent of a first ethylene copolymer having a density of from 0.855 to 0.913 g/cm$^3$; a molecular weight distribution, $M_w/M_n$ of from 1.7 to 2.3; and a melt index, $I_2$ of from 0.1 to 20 g/10 min;
   (ii) from 80 to 20 weight percent of a second ethylene copolymer having a density of from 0.875 to 0.936 g/cm$^3$; a molecular weight distribution, $M_w/M_n$ of from 2.3 to 6.0; and a melt index, $I_2$ of from 0.3 to 100 g/10 min; and
   (iii) from 0 to 40 weight percent of a third ethylene copolymer;
   wherein a number of short chain branches per thousand carbon atoms in the first ethylene copolymer (SCB1) is greater than a number of short chain branches per thousand carbon atoms in the second ethylene copolymer (SCB2);
   wherein the density of the second ethylene copolymer is equal to or greater than the density of the first ethylene copolymer;
   wherein the ethylene copolymer composition has a density of from 0.865 to 0.913 g/cm$^3$; a melt index, $I_2$ of from 0.5 to 10 g/10 min; and a fraction eluting at from 90 to 105° C., having an integrated area of greater than 4 weight percent, in a CTREF analysis;
   wherein the ethylene copolymer composition has at least 0.0015 parts per million (ppm) of hafnium;
   wherein a weight percent of the first, second or third ethylene copolymer is defined as a weight of the first, second or the third ethylene copolymer divided by a weight of a sum of (i) the first ethylene copolymer, (ii) the second ethylene copolymer and (iii) the third ethylene copolymer, multiplied by 100%.

2. The ethylene copolymer composition according to claim 1 having a molecular weight distribution of from 2.2 to 5.0.

3. The ethylene copolymer composition according to claim 1 having a melt flow ratio, $I_{21}/I_2$ of from 20 to 50.

4. The ethylene copolymer composition according to claim 1 wherein the first ethylene copolymer has from 10 to 50 short chain branches per thousand carbon atoms (SCB1).

5. The ethylene copolymer composition according to claim 1 wherein the second ethylene copolymer has from 3 to 25 short chain branches per thousand carbon atoms (SCB2).

6. The ethylene copolymer composition according to claim 1 wherein the first ethylene copolymer is present in from 30 to 55 weight percent.

7. The ethylene copolymer composition according to claim 1 wherein the second ethylene copolymer is present in from 70 to 45 weight percent.

8. The ethylene copolymer composition according to claim 1 wherein the first ethylene copolymer is present in from 30 to 55 weight percent; the second ethylene copolymer is present in from 70 to 45 weight percent; and the third ethylene copolymer is present in 0 weight percent.

9. The ethylene copolymer composition according to claim 1 having a composition distribution breadth index, $CDBI_{50}$ of from 50 to 75 weight percent.

10. The ethylene copolymer composition according to claim 1 having a dimensionless long chain branching factor, LCBF≥0.001.

11. The ethylene copolymer composition according to claim 1 having at least 3 mole percent of one or more than one alpha-olefin.

12. The ethylene copolymer composition according to claim 1 having from 3 to 10 mole percent of one or more than one alpha-olefin.

13. The ethylene copolymer composition according to claim 1 having from 3 to 8 mole percent of one or more than one alpha-olefin.

14. The ethylene copolymer composition according to claim 11, wherein said one or more than one alpha-olefin is chosen from 1-hexene, 1-octene or mixtures thereof.

15. The ethylene copolymer composition according to claim 11, wherein said one or more than one alpha-olefin is 1-octene.

16. The ethylene copolymer composition according to claim 1 wherein the first ethylene copolymer is a made with a single site catalyst.

17. The ethylene copolymer composition according to claim 1 wherein the second ethylene copolymer is a made with a Ziegler-Natta catalyst system.

18. The ethylene copolymer composition according to claim 1 wherein the third ethylene copolymer is a made with a Ziegler-Natta catalyst system.

19. The ethylene copolymer composition according to claim 1 wherein the third ethylene copolymer is a made with a with a single site catalyst.

20. The ethylene copolymer composition according to claim 1 wherein the first ethylene copolymer is a made with a single site catalyst system comprising a metallocene catalyst having the formula (I):

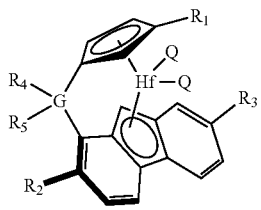

(I)

wherein G is a group 14 element selected from carbon, silicon, germanium, tin or lead; $R_1$ is a hydrogen atom, a $C_{1-20}$ hydrocarbyl radical, a $C_{1-20}$ alkoxy radical or a $C_{6-10}$ aryl oxide radical; $R_2$ and $R_3$ are independently selected from a hydrogen atom, a $C_{1-20}$ hydrocarbyl radical, a $C_{1-20}$ alkoxy radical or a $C_{6-10}$ aryl oxide radical; $R_4$ and $R_5$ are independently selected from a hydrogen atom, an unsubstituted $C_{1-20}$ hydrocarbyl radical, a substituted $C_{1-20}$ hydrocarbyl radical, a $C_{1-20}$ alkoxy radical or a $C_{6-10}$ aryl oxide radical; and Q is independently an activatable leaving group ligand.

21. The ethylene copolymer composition according to claim 1 wherein the first ethylene copolymer has a composition distribution breadth index, $CDBI_{50}$ of at least 75 weight percent.

22. The ethylene copolymer composition according to claim 1 wherein the second ethylene copolymer has a composition distribution breadth index, $CDBI_{50}$ of less than 75 weight percent.

23. The ethylene copolymer composition of claim 1 wherein the first ethylene copolymer is a homogeneously branched ethylene copolymer.

24. The ethylene copolymer composition of claim 1 wherein the second ethylene copolymer is a heterogeneously branched ethylene copolymer.

25. The ethylene copolymer composition according to claim 1 wherein the second ethylene copolymer has a $M_w/M_n$ of from 2.5 to 5.0.

26. The ethylene copolymer composition according to claim 1 having from 0.050 parts per million (ppm) to 2.5 ppm of hafnium.

27. The ethylene copolymer composition according to claim 26 having from 0.50 ppm to 14.0 parts per million (ppm) of titanium.

28. The ethylene copolymer composition according to claim 1 wherein the third ethylene copolymer is present in from 5 to 30 weight percent.

29. The ethylene copolymer composition according to claim 1 wherein the third ethylene copolymer has a density of from 0.865 to 0.945 g/cm³; a molecular weight distribution, $M_w/M_n$ of from 2.0 to 6.0; and a melt index, $I_2$ of from 0.3 to 200 g/10 min.

30. A film layer comprising an ethylene copolymer composition, the ethylene copolymer composition comprising:
(i) from 20 to 80 weight percent of a first ethylene copolymer having a density of from 0.855 to 0.913 g/cm³; a molecular weight distribution, $M_w/M_n$ of from 1.7 to 2.3; and a melt index, $I_2$ of from 0.1 to 20 g/10 min;
(ii) from 80 to 20 weight percent of a second ethylene copolymer having a density of from 0.875 to 0.936 g/cm³; a molecular weight distribution, $M_w/M_n$ of from 2.3 to 6.0; and a melt index, $I_2$ of from 0.3 to 100 g/10 min; and
(iii) from 0 to 40 weight percent of a third ethylene copolymer;
wherein a number of short chain branches per thousand carbon atoms in the first ethylene copolymer (SCB1) is greater than a number of short chain branches per thousand carbon atoms in the second ethylene copolymer (SCB2);
wherein the density of the second ethylene copolymer is equal to or greater than the density of the first ethylene copolymer;
wherein the ethylene copolymer composition has a density of from 0.865 to 0.913 g/cm³; a melt index, $I_2$ of from 0.5 to 10 g/10 min; and a fraction eluting at from 90 to 105° C., having an integrated area of greater than 4 weight percent, in a CTREF analysis;
wherein the ethylene copolymer composition has at least 0.0015 parts per million (ppm) of hafnium;
wherein a weight percent of the first, second or third ethylene copolymer is defined as a weight of the first, second or the third ethylene copolymer divided by a weight of a sum of (i) the first ethylene copolymer, (ii) the second ethylene copolymer and (iii) the third ethylene copolymer, multiplied by 100%.

31. The film layer according to claim 30 wherein the film layer is a blown film.

32. The film layer according to claim 31 having a hot tack window (HTW) of at least 45° C. when measured at a film thickness of about 2 mil.

33. The film layer according to claim 31 having a seal initiation temperature (SIT) of less than 95° C. when measured at a film thickness of about 2 mil.

34. The film layer according to claim 31 having a hot tack onset temperature (HTOT) of less than 88° C. when measured at a film thickness of about 2 mil.

35. The film layer according to claim 31 having a dart impact strength of at least 800 g/mil when measured at a film thickness of about 1 mil.

36. The film layer according to claim 31 having a slow puncture resistance value of at least 100 J/mm when measured at a film thickness of about 1 mil.

37. The film layer according to claim 31 having a haze value of less than 6% when measured at a film thickness of about 1 mil.

38. The film layer according to claim 30 wherein the film layer is a cast film.

39. A multilayer film structure comprising at least one film layer comprising an ethylene copolymer composition, the ethylene copolymer composition comprising:
(i) from 20 to 80 weight percent of a first ethylene copolymer having a density of from 0.855 to 0.913 g/cm³; a molecular weight distribution, $M_w/M_n$ of from 1.7 to 2.3; and a melt index, $I_2$ of from 0.1 to 20 g/10 min;
(ii) from 80 to 20 weight percent of a second ethylene copolymer having a density of from 0.875 to 0.936 g/cm³; a molecular weight distribution, $M_w/M_n$ of from 2.3 to 6.0; and a melt index, $I_2$ of from 0.3 to 100 g/10 min; and
(iii) from 0 to 40 weight percent of a third ethylene copolymer;
wherein a number of short chain branches per thousand carbon atoms in the first ethylene copolymer (SCB1) is greater than a number of short chain branches per thousand carbon atoms in the second ethylene copolymer (SCB2);
wherein the density of the second ethylene copolymer is equal to or greater than the density of the first ethylene copolymer;

wherein the ethylene copolymer composition has a density of from 0.865 to 0.913 g/cm$^3$; a melt index, $I_2$, of from 0.5 to 10 g/10 min; and a fraction eluting at from 90 to 105° C., having an integrated area of greater than 4 weight percent, in a CTREF analysis;

wherein the ethylene copolymer composition has at least 0.0015 parts per million (ppm) of hafnium;

wherein a weight percent of the first, second or third ethylene copolymer is defined as a weight of the first, second or the third ethylene copolymer divided by a weight of a sum of (i) the first ethylene copolymer, (ii) the second ethylene copolymer and (iii) the third ethylene copolymer, multiplied by 100%.

40. The multilayer film structure according to claim 39 wherein the at least one film layer is a blown film.

41. The multilayer film structure according to claim 40 wherein the at least one film layer has a hot tack window (HTW) of at least 45° C. when measured at a film thickness of about 2 mil.

42. The multilayer film structure according to claim 40 wherein the at least one film layer has a seal initiation temperature (SIT) of less than 95° C. when measured at a film thickness of about 2 mil.

43. The multilayer film structure according to claim 40 wherein the at least one film layer has a hot tack onset temperature (HTOT) of less than 88° C. when measured at a film thickness of about 2 mil.

44. The multilayer film structure according to claim 40 wherein the at least one film layer has a dart impact strength of at least 800 g/mil when measured at a film thickness of about 1 mil.

45. The multilayer film structure according to claim 40 wherein the at least one film layer has a slow puncture resistance value of at least 100 J/mm when measured at a film thickness of about 1 mil.

46. The multilayer film structure according to claim 40 wherein the at least one film layer has a haze value of less than 6% when measured at a film thickness of about 1 mil.

47. The multilayer film structure according to claim 39 wherein the multilayer film structure has at least three film layers.

48. The multilayer film structure according to claim 39 wherein the multilayer film structure has at least five film layers.

49. The multilayer film structure according to claim 39 wherein the multilayer film structure has at least seven film layers.

50. The multilayer film structure according to claim 39 wherein the multilayer film structure has at least nine film layers.

51. The multilayer film structure according to claim 39 wherein the multilayer film structure has 9 layers.

52. The multilayer film structure according to claim 39 where the multilayer at least one film layer is at least one sealant layer in the multilayer film structure.

53. The multilayer film structure according to claim 39 wherein the at least one film layer is a cast film.

54. The multilayer film structure according to claim 53 having a seal initiation temperature (SIT) of less than 90° C. when measured at a film thickness of about 2 mil.

55. A multilayer film structure comprising a sealant layer, the sealant layer comprising an ethylene copolymer composition, the ethylene copolymer composition comprising:
  (i) from 20 to 80 weight percent of a first ethylene copolymer having a density of from 0.855 to 0.913 g/cm$^3$; a molecular weight distribution, $M_w/M_n$ of from 1.7 to 2.3; and a melt index, $I_2$ of from 0.1 to 20 g/10 min;
  (ii) from 80 to 20 weight percent of a second ethylene copolymer having a density of from 0.875 to 0.936 g/cm$^3$; a molecular weight distribution, $M_w/M_n$ of from 2.3 to 6.0; and a melt index, $I_2$ of from 0.3 to 100 g/10 min; and
  (iii) from 0 to 40 weight percent of a third ethylene copolymer;

wherein a number of short chain branches per thousand carbon atoms in the first ethylene copolymer (SCB1) is greater than a number of short chain branches per thousand carbon atoms in the second ethylene copolymer (SCB2);

wherein the density of the second ethylene copolymer is equal to or greater than the density of the first ethylene copolymer;

wherein the ethylene copolymer composition has a density of from 0.865 to 0.913 g/cm$^3$; a melt index, $I_2$ of from 0.5 to 10 g/10 min; and a fraction eluting at from 90 to 105° C., having an integrated area of greater than 4 weight percent, in a CTREF analysis;

wherein the ethylene copolymer composition has at least 0.0015 parts per million (ppm) of hafnium;

wherein a weight percent of the first, second or third ethylene copolymer is defined as a weight of the first, second or the third ethylene copolymer divided by a weight of a sum of (i) the first ethylene copolymer, (ii) the second ethylene copolymer and (iii) the third ethylene copolymer, multiplied by 100%.

56. The multilayer film structure according to claim 55 wherein the multilayer film structure has at least three film layers.

57. The multilayer film structure according to claim 55 wherein the multilayer film structure has at least five film layers.

58. The multilayer film structure according to claim 55 wherein the multilayer film structure has at least seven film layers.

59. The multilayer film structure according to claim 55 wherein the multilayer film structure has at least nine film layers.

60. The multilayer film structure according to claim 55 wherein the multilayer film structure has 9 layers.

* * * * *